(12) United States Patent
Hirsch et al.

(10) Patent No.: US 10,341,701 B2
(45) Date of Patent: *Jul. 2, 2019

(54) CLUSTERING AND ADJUDICATION TO DETERMINE A RECOMMENDATION OF MULTIMEDIA CONTENT

(71) Applicant: Edge2020 LLC, Herndon, VA (US)

(72) Inventors: Ronald Hirsch, Herndon, VA (US); Tell Allen Gates, Great Falls, VA (US)

(73) Assignee: Edge2020 LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,486

(22) Filed: Feb. 17, 2017

(65) Prior Publication Data

US 2017/0171580 A1 Jun. 15, 2017

Related U.S. Application Data

(63) Continuation-in-part of application No. 15/134,716, filed on Apr. 21, 2016, now Pat. No. 9,781,459.
(Continued)

(51) Int. Cl.
*H04N 21/25* (2011.01)
*H04N 21/258* (2011.01)
(Continued)

(52) U.S. Cl.
CPC ....... *H04N 21/252* (2013.01); *H04L 12/1492* (2013.01); *H04L 65/1089* (2013.01);
(Continued)

(58) Field of Classification Search
CPC .... H04L 65/1089; H04L 65/80; H04M 15/80; H04M 15/805; H04M 15/83
See application file for complete search history.

(56) References Cited

U.S. PATENT DOCUMENTS 7,756,342 B2 7/2010 Bachmann et al.
8,732,737 B1 * 5/2014 Kalmes ................. H04H 20/38
725/14
(Continued)

OTHER PUBLICATIONS

Charles M. Bachmann, "Improved Manifold Coordinate Representations of Hyperspectral Imagery", Jul. 2005, pp. 1-5, Naval Research Laboratory, U.S.

*Primary Examiner* — Mulugeta Mengesha
*Assistant Examiner* — Charles N Hicks
(74) *Attorney, Agent, or Firm* — The Watson IP Group, PLC; Dan Fiul

(57) ABSTRACT

A method and apparatus can include a system processor and a system controller. The system controller can retrieve data from at least one database, the data including information associated with at least one of subscribers, multimedia content, and subscriber interaction with customer premises equipment, and transmit, to a customer premises equipment of a subscriber, a recommendation of multimedia content. The system processor can formulate an input dataset from the retrieved data, perform nonlinear clustering on the input dataset to formulate subscriber and multimedia content clusters having similarities between elements therein, and determine the recommendation of multimedia content based on a metric distance between vector elements of the formulated subscriber and multimedia content clusters and the metric distance crossing a threshold.

30 Claims, 21 Drawing Sheets

Related U.S. Application Data

(60) Provisional application No. 62/150,829, filed on Apr. 21, 2015.

(51) Int. Cl.
| | | |
|---|---|---|
| H04N 21/482 | (2011.01) | |
| H04N 21/81 | (2011.01) | |
| H04L 29/08 | (2006.01) | |
| H04L 12/14 | (2006.01) | |
| H04L 29/06 | (2006.01) | |
| H04N 21/2543 | (2011.01) | |
| H04N 21/262 | (2011.01) | |
| H04N 21/2665 | (2011.01) | |
| H04N 21/44 | (2011.01) | |
| H04N 21/61 | (2011.01) | |
| H04M 15/00 | (2006.01) | |
| H04W 4/24 | (2018.01) | |

(52) U.S. Cl.
CPC ........ *H04L 65/4084* (2013.01); *H04L 65/604* (2013.01); *H04L 65/80* (2013.01); *H04L 67/325* (2013.01); *H04M 15/00* (2013.01); *H04M 15/80* (2013.01); *H04M 15/805* (2013.01); *H04M 15/83* (2013.01); *H04N 21/2543* (2013.01); *H04N 21/25841* (2013.01); *H04N 21/2665* (2013.01); *H04N 21/26216* (2013.01); *H04N 21/26225* (2013.01); *H04N 21/44016* (2013.01); *H04N 21/4826* (2013.01); *H04N 21/6125* (2013.01); *H04N 21/812* (2013.01); *H04W 4/24* (2013.01)

(56) References Cited

U.S. PATENT DOCUMENTS

| | | | |
|---|---|---|---|
| 9,129,227 B1* | 9/2015 | Yee | G06N 99/005 |
| 9,781,459 B2* | 10/2017 | Hirsch | H04N 21/2541 |
| 2011/0282169 A1 | 11/2011 | Zlatko et al. | |
| 2014/0269484 A1* | 9/2014 | Dankberg | H04L 12/18 |
| | | | 370/312 |
| 2016/0210321 A1* | 7/2016 | Gong | G06F 17/30345 |

* cited by examiner

CLUSTERING AND ADJUDICATION TO DETERMINE A RECOMMENDATION OF MULTIMEDIA CONTENT

This application is a continuation-in-part application of U.S. patent application Ser. No. 15/134,716, entitled "Nonlinear Manifold Clustering to Determine a Recommendation of Multimedia Content", filed on Apr. 21, 2016, to Hirsch et al., which claims priority to U.S. Provisional Patent Application No. 62/150,829, entitled "Enhanced Video and Advertising Aggregation and Distribution", filed on Apr. 21, 2015, to Hirsch et al., the entirety of all of which are expressly incorporated herein by reference.

BACKGROUND

1. Field

The present disclosure is directed to a method and apparatus for recommending multimedia content and advertising to subscribers via a customer premises equipment.

2. Introduction

Traditional television viewing is linear. With linear television viewing, a viewer must watch scheduled television programs at a particular time and on a particular channel. However, the entertainment industry is in transition and content consumers are moving to personalized programming or nonlinear television. Personalized programming allows the content consumer to control content selection and viewing time. True personalized programming allows content customers to view whatever they want, whenever they want, as often as they want, and in an order that the content consumers desire. However, present technology offers content consumers a limited personalized programming experience with restricted selection and/or high prices. Such present technology includes Over-The-Top (OTT) streaming, Internet Protocol Television (IPTV), and Video on Demand (VOD) capability.

OTT streaming is delivered over the Internet, but is unmanaged. Content delivery is plagued by "last mile" congestion. This problem is encountered with non-Quality of Service (QoS) streaming. As streaming has increased, especially during periods of peak demand or prime time, congestion impact has become worse. Such congestion occurs with any over utilized, unmanaged, data rate limited, network system. IPTV are multimedia services, such as television or video, delivered over managed IP based networks which provide the required level of Quality of Service (QoS) and experience, security, interactivity and reliability. From the consumer's viewpoint, IPTV has limited selection and is expensive.

Demand for content distribution with respect to available transport varies as a function of time, consisting of peaks and valleys. Traditionally, supply and demand issues have been addressed by applying the principles of microeconomics based on supply and demand pricing theory. However, applying such microeconomics has not solved problems associated with content delivery.

Stand Definition (SD), High Definition (HD), High Dynamic Range (HDR), Ultra High Definition (UHD or 4K), Augmented Reality (AR), and Virtual Reality (VR), or higher resolution formats present increasingly significant problems for existing network infrastructure and significantly higher price to content consumers. Such high resolution formats are limited because of data rate constraints and subscriber aggregate data limits. Even with the current relatively low percentage of streaming, peak time network congestion is causing video disruption, such as video pixilation, synchronization problems, freeze frames, slow start or buffering, etc. This video disruption will be furthered exacerbated as more content providers and households move to content streaming, higher resolution video, and as additional real-time services (for example, electronic gaming, Virtual Reality, Augmented Reality (AR) when used with live programming, etc.) are further employed.

Advertising can be used as a subsidized approach to both linear and personalized programming streaming. However with current advertising/content ratios, bandwidth required to additionally transmit advertising content is increased by as much as 50%. Other challenges that effect high impact advertising exist for both linear and personalized programming. Currently, advertisers have traditionally subsidized content production and distribution through advertisements (for example, commercials). This approach has a limited capability to target an audience segment. Advertisers are unable to target advertisements to individuals or cluster groups except by relying on associated program content. Currently, commercial selection and insertion is dependent on the targeted audience of the content rather than the targeted audience and value of that audience to the advertiser of the commercial. True, direct measures of advertisement effectiveness do not exist. Changing commercials on-the-fly to reflect changes in consumer content viewing habits is difficult. Also, it is extremely difficult to measure the impact of on-the-fly advertising on individual subscribers, cluster groups, and/or geographic areas based on selected advertising profiles.

Another issue with current changing landscape of video distribution, for example, large number of linear TV channels and thousands of streaming services that include ala carte and video on demand content, is a viewer being able to finding multimedia content that satisfies and expands their tastes. This problem becomes more difficult when the view desires to find acceptable content that matches multiple viewers, for example, family multimedia content viewing.

SUMMARY OF THE DISCLOSURE

The disclosure is directed to a method and apparatus that can include a system processor and a system controller. The system controller can retrieve data from at least one database, the data including information associated with at least one of subscribers, multimedia content, and subscriber interaction with customer premises equipment, and transmit, to a customer premises equipment of a subscriber, a recommendation of multimedia content. The system processor can formulate an input dataset from the retrieved data, perform nonlinear clustering on the input dataset to formulate subscriber and multimedia content clusters having similarities between elements therein, and determine the recommendation of multimedia content based on a metric distance between vector elements of the formulated subscriber and multimedia content clusters and the metric distance crossing a threshold.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Figure 1:
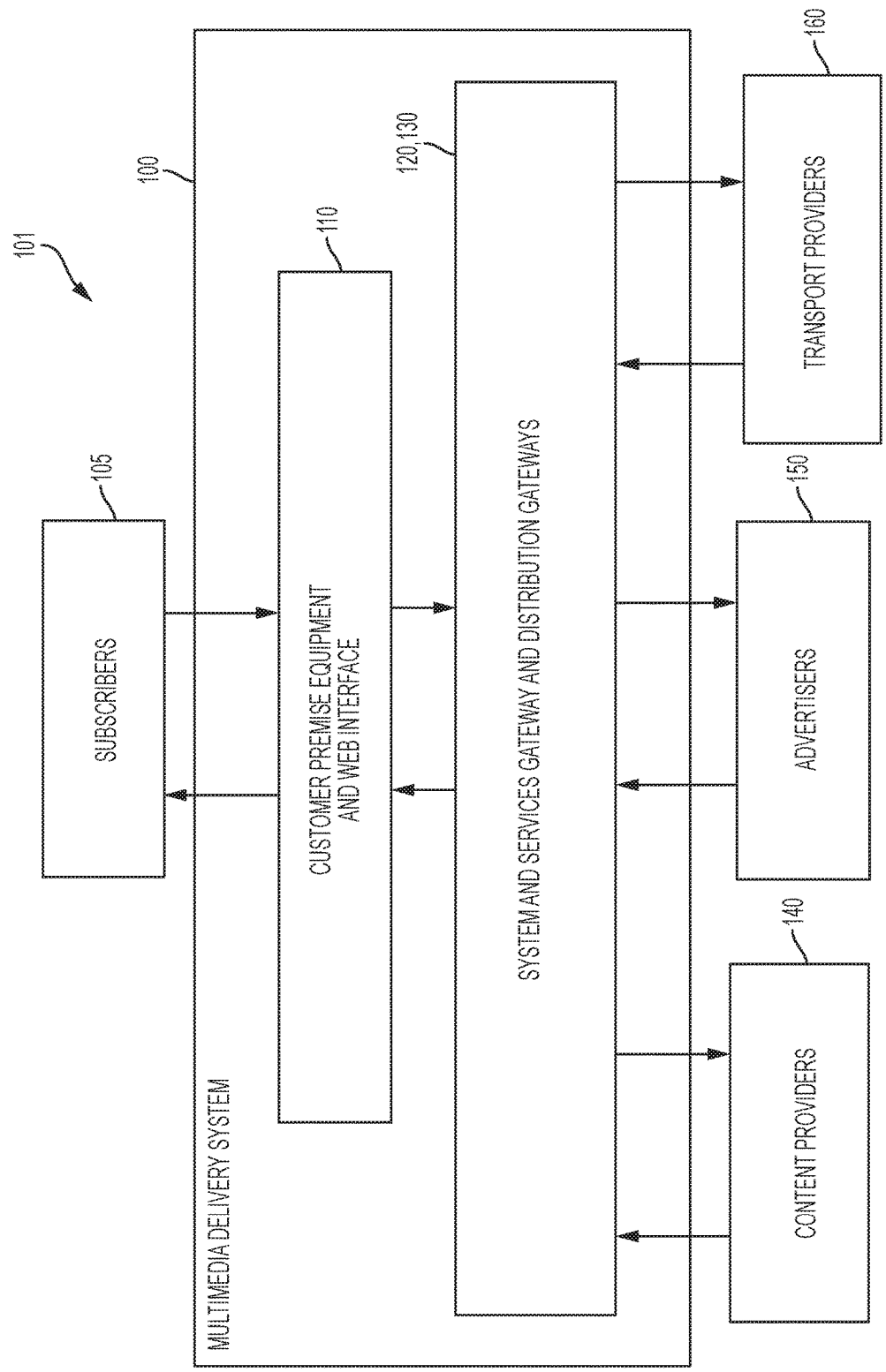
FIG. 1 illustrates an example multimedia system, in accordance with one or more possible embodiments.

A need exists for an efficient and effective use of transport resources to smooth out subscriber demand for multimedia content. A need also exists to subsidize the subscriber's multimedia content with on demand, changeable, subscriber-preferred targeted, non-targeted and/or requested advertisements without exacerbating bandwidth demands to deliver effective targeted and requested advertisements.

The embodiments described herein overcome the limitations discussed above, as well as expanding on capabilities of existing content distribution systems. The embodiments provide for apparatuses, systems, and methods that can establish one or more pricing models for advertising and subscriber selected multimedia content driven by 1) subscriber preferences, 2) content provider pricing, 3) advertiser pricing and subscriber and/or content cluster selection, and 4) transport pricing (broadcast and network) based on cost driven by the use of predicted excess capacity as determined by one or more pricing models of transport systems. The terms price and cost are used interchangeably herein throughout.

The embodiments can optimize bandwidth/data rate constrained transport systems, with 1) multimedia content selection, lead-time delivery and viewing time, 2) accepted amount of advertising, and 3) price under a subscriber's control. The computer-based methods, systems, and apparatuses can be used to construct a real-time pricing model for the optimal use of transport resources.

The computer-based methods, systems and apparatuses disclosed herein can provide for personalized multimedia programming that includes the consumer's selected multimedia content, specified resolution, viewing time, lead-time, and an accepted number and type of embedded advertisements. Advertisers' preferences can be incorporated for targeting selected individuals, cluster groups of individuals, and geographic areas. Traditional advertising can be targeted at specific multimedia content. The embodiments disclosed herein provide for advertising that can be targeted to a subscriber or cluster of the subscribers and/or to a specific subscriber or group of subscribers. The embodiments can analyze subscriber behavior and reward the subscriber for either existing or changing behavior that can result in lower operational costs for content providers, transport providers and/or advertisers.

The embodiments can limit a subscriber's specified maximum billing period cost (for example, a not-to-exceed price) based on the subscriber's desired multimedia content for viewing and can automatically adjust various subscriber parameters with respect to content providers', advertisers' and transporter(s)'s constraint(s).

The embodiments can further allow the subscriber to manually adjust their selected control preferences or parameters, including cost as an independent parameter, to the cost of viewing over a billing period through a web interface on a computer, the customer premises equipment (CPE), or other web accessible devices. The subscriber can also manually adjust their control parameters, including price, for individual content, content series, custom-tailored skinny bundles or selected subset of their desired personalized programming.

The computer-based methods, systems and apparatuses disclosed herein can also provide for the selection of cost-effective and resource-efficient methods of content distribution based on the use (in total or in part) of multiple broadcast and/or multiple network infrastructures, including, streaming, multicast, peer-to-peer and mesh architectures. A company implementing one or more of the embodiments disclosed herein can purchase, in bulk from an Internet Service Provider (ISP), blocks of data to supplement against the subscriber's data cap. This can be either in concert with the subscriber's existing data cap or executed as a completely separate transaction.

In addition, a highly accurate recommendation system can enhance the subscriber viewing experience and can assist in the navigation of a large and ever increasing quantity of worldwide multimedia content. A recommendation system using high dimensional input data (for example, defined in Tables 1-8) can perform this task and can be custom tailored for the individual subscriber/viewer.

FIG. 1 illustrates an example multimedia system 101, in accordance with one or more possible embodiments. The multimedia system 101 can include a multimedia delivery system 100 to electronically delivery multimedia content to subscribers 105. The multimedia delivery system 100 can include customer premises equipment (CPE) 110, a system and services gateway 120, and one or more distribution gateways 130. The customer premises equipment (CPE) 110 can be coupled to the system and services gateway 120 and the distribution gateways 130. The system and services gateway 120 and distribution gateways 130 can be coupled to content providers 140, advertisers 150, and transport providers 160. Subscribers 105 can interact with the customer premises equipment 110. In one or more example embodiments, the implementation of the distribution gateway(s) 130 or portions of the distribution gateway(s) 130 can be integrated with the system and services gateway(s) 120. In one or more example embodiments, some or all of the functions of system and services gateway(s) 120 and/or distribution gateway(s) 130 can be performed by other elements, for example the transport providers 160 and the content providers 140.

Within FIG. 1, the recommendation system can use the same interfaces between the subscribers 105, content providers 140, advertisers 150, and transport providers 160 to generate recommendations of multimedia content for subscribers 105, as well as analysis for content providers 140 and advertisers 150.

The computer-based methods, systems and apparatuses disclosed herein can use all available subscriber 105, content provider 140, content delivery pricing from transport providers 160, and advertiser 150 cluster information to automatically price multimedia content. The computer-based methods, systems and apparatuses disclosed herein can select the most cost-effective use of available electronic delivery infrastructure to satisfy the multimedia content, preferences and pricing requests from subscribers 105.

The computer-based methods, systems and apparatuses disclosed herein can incorporate advanced analytics techniques that can place advertising into subscriber 105 clusters, or direct placement to a specific subscriber 105 or group of subscribers 105 with prioritization (for example, Direct Marketing Areas (DMA)). This prioritization can be based on the value the subscriber 105 places on an advertising and/or the value of a subscriber 105 to an advertiser 150. This includes the placement of the advertising in the multimedia content for maximum impact.

The computer-based methods, systems and apparatuses can allow for content transmission at a predetermined time and/or adaptively as a function of the predictive and/or measured loading on network distribution (including backbone and last mile of network service). The approach to multimedia content distribution disclosed herein can select a most cost efficient transport method and transport provider 160 for electronic content delivery or transport, delivery and transport being used interchangeably herein. Contracts with ISPs or the transport providers 160 for the purchase of data transfers during periods of reduced demand or periods of excess capacity can be utilized to minimize costs associated with multimedia content electronic delivery. A lower network Quality of Service (QoS) can be acceptable for electronic delivery of non-live content (i.e., scheduled content delivery), resulting in lower transport cost with improved subscriber 105 experience. The computer-based methods, systems and apparatuses disclosed herein can tolerate lower network QoS to the CPE 110, with multimedia content and advertising being pre-stored on the CPE 110 before it is assembled for display for a subscriber 105. The computer-based methods, systems and apparatuses disclosed herein can allow for error detection and correction to address data dropouts.

The computer-based methods, systems and apparatuses disclosed herein can price preplanned multimedia content of the subscriber 105 in bandwidth/data rate constrained digital distribution systems. Digital multimedia content files or packets can be transmitted over one or more of network and broadcast infrastructures, including multicast, torrent and/or mesh architectures, to the CPEs 110 of the subscribers 105. When multiple network and broadcast infrastructures are utilized, the digital packets are stored locally within a CPE 110 of the subscriber 105 for re-assembly into a viewable stream by a selected display device or devices at a specified time.

The subscriber 105 can interact with the multimedia electronic delivery system 100 through a web interface contained in the CPE 110. The subscriber 105 can communicate content selection and operational preferences to the multimedia delivery system 100. In response to these selection and operational preferences (see Table 4) the multimedia delivery system 100 can price the content and make this information available to the subscriber 105 via the web interface in near real-time.

TABLE 1

CPE Profile

Unique Identification Hash
CPE Identification Number
Account Holder Name
Street Address
City
State
Zip Code
Country
GPS Location
IP Address
ISP
Congressional District
State Political Districts
Local Political Districts
Trace Route to CPE (for maintenance and guided expansion)

TABLE 2

Subscriber Account Profile

CPE Unique Identification
Account Identification Number
Account Privacy Preferences
Maximum cost for the overall billing period
Control parameters of individual subscriber profiles (Parental)
Password/PIN/Thumbprint/Voice Recognition/Face Recognition/Other
Credit Card Number (for Billing only)

TABLE 2-continued

Subscriber Account Profile

Expiration Date (for Billing only)
IP Address
ISP
Validation Number (for Billing only)
Subscriber Data Cap(s)
    Wired
    Cellular
    Satellite
    Wi-Fi
CPE Storage - Total and Available

TABLE 3

Individual Subscriber Profile(s)

Subscriber Account Unique Identification Link
Unique Identification Number
Personal Identification Number
Name
Preferences Table Link
Social Media Input and Connections
Main Subscriber (Parental) Control Limitation - Maturity Level of Content Allowed
Privacy Preferences (Individual Override - If over 18)
Subscriber Domain Shift - Changing viewing preferences and habits
Advertising Preferences (Non-targeted, Targeted, and Requested)
Maximum allowed spending controlled by the primary subscriber
Individual Subscriber Cost Limits - Profile 1
    Content Class
        Max Class Cost
        Ad Preference
        Lead-Time
        Viewing Delay
        Amount of Allowed Advertising
        Video Quality/Resolution
Individual Subscriber Cost Limits - Profile 2
. . .
Individual Subscriber Cost Limits - Profile N
Subscriber Type: Bronze, Silver, Gold, etc.*
Derived representation generated from the elements above**

*To simplify the user interface and enhance the subscriber 105 experience the degree of subscriber control of all subscriber parameter selections can be automatically and/or manually established based on the subscriber 105 service and/or type. The subscriber 105 type can consist of at least one or more of bronze, silver, gold, etc. For example, bronze can equate to a low spending threshold for a subscriber 105, silver can equate to a medium spending threshold for a subscriber 105, gold can equate to high spending threshold for a subscriber 105.
**A derived representation can be synthesized by combining weighted elements from Tables 1-8 such that the dimensionality of the input data is reduced when performing the clustering operations described herein. The weights can be controlled by the local and/or global adjudication described herein.

TABLE 4

Subscriber Preferences

History Reference Number
Time/Date Requested
Time/Date Viewed
Purchase Mode (Viewing window, Number of Times Allowed, Permanent)
Unique Identification Hash Link
Content Title #1
Content Season (if applicable)
Content Episode (if applicable)
Resolution/Quality/Service (Mobile Device, SD, HD, UHD, HDR, AR, VR, etc.)
Length of Planning Interval (Content Viewing Delay)/Prior to broadcast
Requested Commercials Per Unit Content
Internal Content Identification Number) ***
Date of Content Identification Number ***
IMDB Content Identification Number/Library of Congress Number/or other recognized multimedia Content Identification Number) ***
Social Media Connections
Privacy Preferences
Subscriber Internet Search Engine Preferences

TABLE 4-continued

Subscriber Preferences

Advertising Preferences (Non-targeted, Targeted, and Requested)
Derived representation generated from the elements above**

*** Appended in the system processor 128, the system controller 126, and in an example the system and services gateway 120

TABLE 5

Subscriber History

Unique Subscriber Identification Hash
History Reference Record Number - 0****
    Content Title ID
    Time/date content was requested or recommended
    Requested viewing system time/date
    Actual content viewing system start time/date
    Actual content viewing system stop time/date
    Content watched to completion
    Number of pauses
    Average length of pauses
    Fast Forward Operations
    Rewind Operations
    Method of transport
    Time/date the content was started for delivery to CPE
    Time/date the content delivery was completed
    Number of times the content was watched
    Time/date the content was deleted from the CPE local storage
    Amount and type of advertising accepted
    List advertisements inserted - advertising position number and time/date
    displayed, directed
    Advertising Skipped
    Price of content when selected
    Price of content when watched
    Purchase or lease mode
    Resolution/quality
    Display type
    Content Price Equation Type Used for Pricing Content
    Content Price Equation Descriptive Parameters (Coefficients, Slope, . . .)
    Cluster Content Statistical Moments
    Cluster Content Popularity Index
    Time/date of Transfer to Mobile Device
    Recommendation Thresholds
        First - Add to Recommended List
        Second - Push Content to CPE/Add to Recommended Available List
        Third - Push Content to CPE/Add to Calendar and Recommended
            Available List
        Fourth - Multicast Queue Recommendation
    Rejection Parameters
        Amount of content or series watched
        Time since last watched
        Time/date of overt rejection
    Content Encryption Keys
History Reference Record Number - 1
History Reference Record Number - 2
. . .
History Reference Record Number - N
Multimedia Content Search History Record - 0
. . .
Multimedia Content Search History Record - M
Multimedia Content Request Search History Record - 0
. . .
Multimedia Content Request Search History Record - P
Derived representation generated from the elements above**

****For each Content Item Requested or Recommended

TABLE 6

Multimedia Content Metadata

Unique Database Identification
Content Title

TABLE 6-continued

Multimedia Content Metadata

Title ID (Database Specific or Library of Congress Number)
Content Rating as a Function of Time from Release Date
Technical Specs (Running Time, Sound Mix, Color, Aspect Ratio, etc.)
Content Genre/Subgenre/Multiple Genres (Action, Crime, etc.)
Release Date
Content Director, Biography (ies), representation(s) and profile(s)
Content Writer(s), representation(s), and profile(s)
Content Actor(s), representation(s), and profile(s)
Related Content, representation(s), and profile(s)
Screenplay
Storyline
Plot Summary and Keywords
Tag Line(s)
Country of Origin
Filming Locations
Production Company(ies)/Network
Copyright Holder(s) Contact Data
User Reviews including social media sources
MPAA Rating
Curated Reviews
Professional Reviews (including spoken word to text conversion)
Content Season and Episode
Special Effects
Content Provider Sales Price or Licensing Agreement
Library of Congress Multimedia Content Metadata
Derived representation generated from the elements above**

Advertisers 150 can pay for the attention of the subscribers 105. Advertisers 150 can provide commercials, desired viewer cluster, and campaign objectives through the dedicated interfaces of the multimedia delivery system 100. The multimedia delivery system 100 can use such information together with sophisticated mathematical algorithms (for example, executed by a system processor 128 shown in FIG. 3) to match requested clusters to the subscribers 105, preferably not to multimedia content. This matching technique can provide advertisers 150 a more cost effective technique to reach their desired audience.

The transport providers 160 can provide, for example, the parameters shown in Table 8 to the system and services gateway 120, through dedicated interfaces. These parameters can be used to schedule and price excess capacity of a transport provider 160 to lower distribution price to customer premises equipment 110 of subscribers 105, as well as to make maximal use of a delivery network, particularly during a period when a delivery network is being underutilized, for example midnight to 6 A.M.

TABLE 7

Advertiser Request and Parameters

Unique Advertiser Identification
Unique Commercial Identifier
Advertising Category
Demographic Preferences
Geographic Preferences
Specific Instructions from Advertiser
Advertising Priority
Associated Advertising
Number of Times Advertising to be Shown
Minimum Time Interval to Repeat
Preferred Advertising Position Within Multimedia Content
Preferred Show or Content Type
Zip Code Assignment
Political Boundaries
Advertising QoS (AQoS)
Advertising Value of Advertiser to Subscriber
Advertising Value of Subscriber to Advertiser
Direct Advertising Insertion
Advertising Demographic Group ID TABLE 7-continued Advertiser Request and Parameters Redeemed Advertising Credit Coupon No. 1
Redeemed Advertising Credit Coupon No. 2
. . .
Redeemed Advertising Credit Coupon No. N
Advertising Impact QoS (AIQoS)
Call to Action Type*****
Derived representation generated from the elements above**

*****A call to action for the subscriber 105 can be an action and/or offer generated for the subscriber 105 and can be used to track the subscriber 105 response to a particular advertising to measure the effectiveness of the advertising. The subscriber 105 response can be determined through their interaction with the CPE 110. Examples of call to action include "Click Here" virtual button, "Join Now" virtual button, etc.

The content providers 140 can provide information that allows the multimedia delivery system 100 to delivery multimedia content to the subscribers 105. For example, the content providers 140 can provide content listing, licensing and pricing information, together with multimedia content to the multimedia delivery system 100 though dedicated interfaces.

Figure 2:
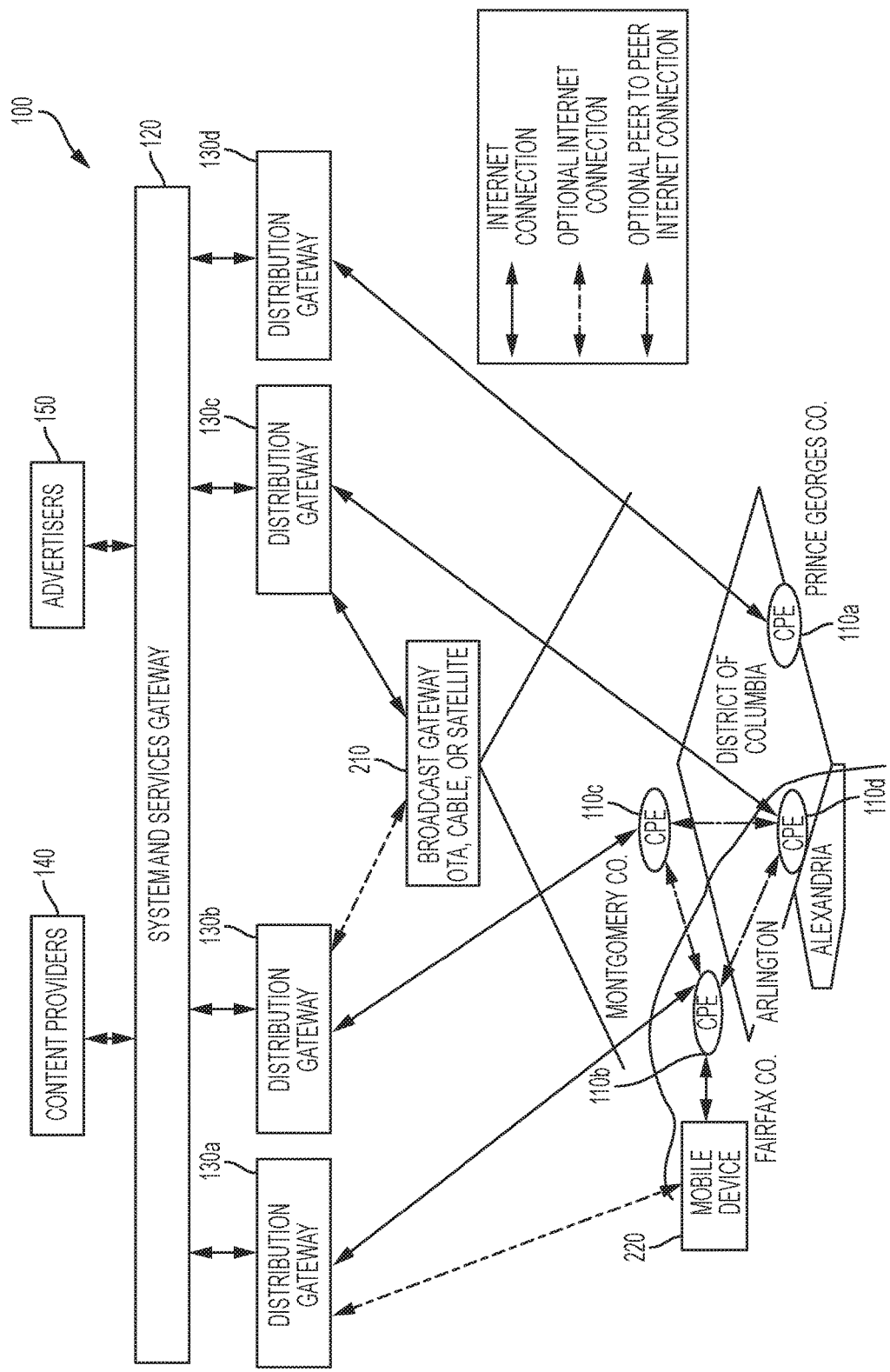
FIG. 2 illustrates example interoperability of components of a multimedia delivery system, according to one or more possible embodiments.

FIG. 2 illustrates example interoperability of components of the multimedia delivery system 100, according to one or more possible embodiments. The system and services gateway 120 can be coupled to content providers 140 and advertisers 150. The system and services gateway 120 can be further coupled to a plurality of distribution gateways 130a-d. One or more of the distribution gateways 130a-d can be coupled to a broadcast gateway 210. The broadcast gateway 210 can deliver multimedia content over broadcast infrastructure, such as over-the-air broadcast infrastructure, cable broadcast infrastructure, satellite broadcast infrastructure, and/or any other broadcast infrastructure. The distribution gateways 130a-d can allow for simultaneous, synchronous and asynchronous (not in time order) delivery of multimedia content to CPEs 110 of subscribers 105 over one or more of network and broadcast distribution infrastructures. The broadcast gateway 210 can determine what multimedia content is transmitted over each transmission infrastructure based on resource excess capacity, resource cost, and resource availability. The CPEs 110 can store such data from multiple sources and reconstructed the multimedia content in proper order for viewing with the CPE 110 of the subscriber 105. The CPE 110 can be at least partially implemented by a set top box, a internet service provider and/or television service supplied customer premise equipment, a digital video recorder, a video extender, a smart television, a streaming set top box, a personal computer, a tablet computer, a smart phone, with a software application ("app") implementation, and/or any other media device that can play the multimedia content.

Distribution gateway 130a can be coupled to CPE 110b via an Internet connection and optionally coupled to mobile device 220 via an Internet connection. Distribution gateway 130a can service a specific geographic region, for example CPE 110 devices within Fairfax County. Distribution gateway 130b can be coupled to CPE 110c via an Internet connection and optionally coupled to the broadcast gateway 210 via an Internet connection. Distribution gateway 130a can service a specific geographic region, for example CPE 110 devices within Montgomery County. Distribution gateway 130c can be coupled to the broadcast gateway 210 via an Internet connection and to CPE 110d via an Internet connection. Distribution gateway 130c can service a specific geographic region, for example CPE 110 devices within a region of the District of Columbia. Distribution gateway 130d can be coupled to CPE 110e via an Internet connection.

Distribution gateway 130d can service a specific geographic region, for example CPE 110 devices within a different region of the District of Columbia that those CPE 110 devices serviced by distribution gateway 130c. CPE 110b can be optionally coupled to CPE 110c and CPE 110d via a peer-to-peer Internet connection. CPE 110c and CPE 110d can be optionally coupled via a peer-to-peer Internet connection. The size of a specific geographic region that a particular distribution gateway 130 services can be a function of the location and density of CPEs 110 of subscribers 105 within a geographic region.

The system and services gateway 120 and the distribution gateways 130 can be implemented redundantly, and can work through individual failures, either in hardware of the multimedia delivery system 100 or Internet connectivity. A backup hot spare of the system and services gateway 120 can be maintained such that in the event of a failure, operations transition seamlessly to the backup hot spare.

The multimedia delivery system 100 can operate with many distribution gateways 130. In an event of a distribution gateway 130 failure, the operation of the failed distribution gateway 130 can be spread to several nearby distribution gateways 130 until the failure is corrected.

In one or more possible embodiments, there can be no redundant backup for an individual CPE 110, per se. However, a subscriber 105 can stream multimedia content using an alternate media CPE 110 device, for example, a digital video recorder, a set top box, a video extender, a smart television, a personal computer, a tablet computer, a smart phone, a software application (app) implementation, and/or any other media device that can play the multimedia content, in the event of a primary CPE 110 failure. Such streaming to an alternate media CPE 110 device can be performed at no additional cost to the subscriber 105.

The system and services gateway 120 can price subscriber's preplanned multimedia content in bandwidth/data rate constrained digital distribution systems. Digital multimedia content files or packets can be transmitted utilizing at least one of network and broadcast infrastructures, including multicast, torrent and mesh architectures, to the CPEs 110 of the subscribers 105. When multiple network and broadcast infrastructures are utilized, the digital packets are stored locally within the CPEs 110 for re-assembly into a viewable steam, preferably prior to release for viewing by a selected display device or devices at a specified time(s).

The system and services gateway 120 can transmit to the CPEs 110 a list of subscriber selected and recommended multimedia content, multimedia content that meets/does not meet subscriber cost constraints, and/or multimedia content that has/has not been downloaded to the CPE 110. The system processor 128 can perform multimedia content recommendation based on information from Tables 1 through 8 to discover the recommended multimedia content. The system processor 128 can determine the metric or distance and the variance of this metric to define a confidence region or a confidence interval between a subscriber or cluster of subscribers and multimedia content (and/or advertising) or clusters of multimedia content (and/or advertising). This confidence region confidence interval can be displayed for each of the subscriber 105 selected and recommended multimedia content, the confidence or confidence intervals indicating a likelihood that the multimedia content from the recommended multimedia content best matches preferred subscriber 105 multimedia content. The recommendation score can be derived from the confidence region or the confidence interval and can be arbitrarily scaled for presentation to the subscriber 105. For example, the arbitrary scale can be 1 to 100, where 1 is the lowest likelihood that the subscriber will like the content and 100 is the highest likelihood. This list can include subscriber 105 selections that include content that (1) has been both previously requested and previously recommended, and available for play from the local disk (available requested and available recommended, respectively) of the CPE 110, and/or (2) both scheduled requested and scheduled recommended that can be subsequently downloaded to the CPE 110, as well as (3) live and streaming content. The list can include the confidence regions, confidence intervals or the scores of the match of the content to the subscriber 105 based on cluster statistical moments (means, variances, skewness, kurtosis, etc.) and metric and/or inverse metric thresholds, respectively, and can be transmitted to the CPE(s) 110 for display to the subscriber(s) 105 via a user interface of the CPE(s) 110.

Figure 3:
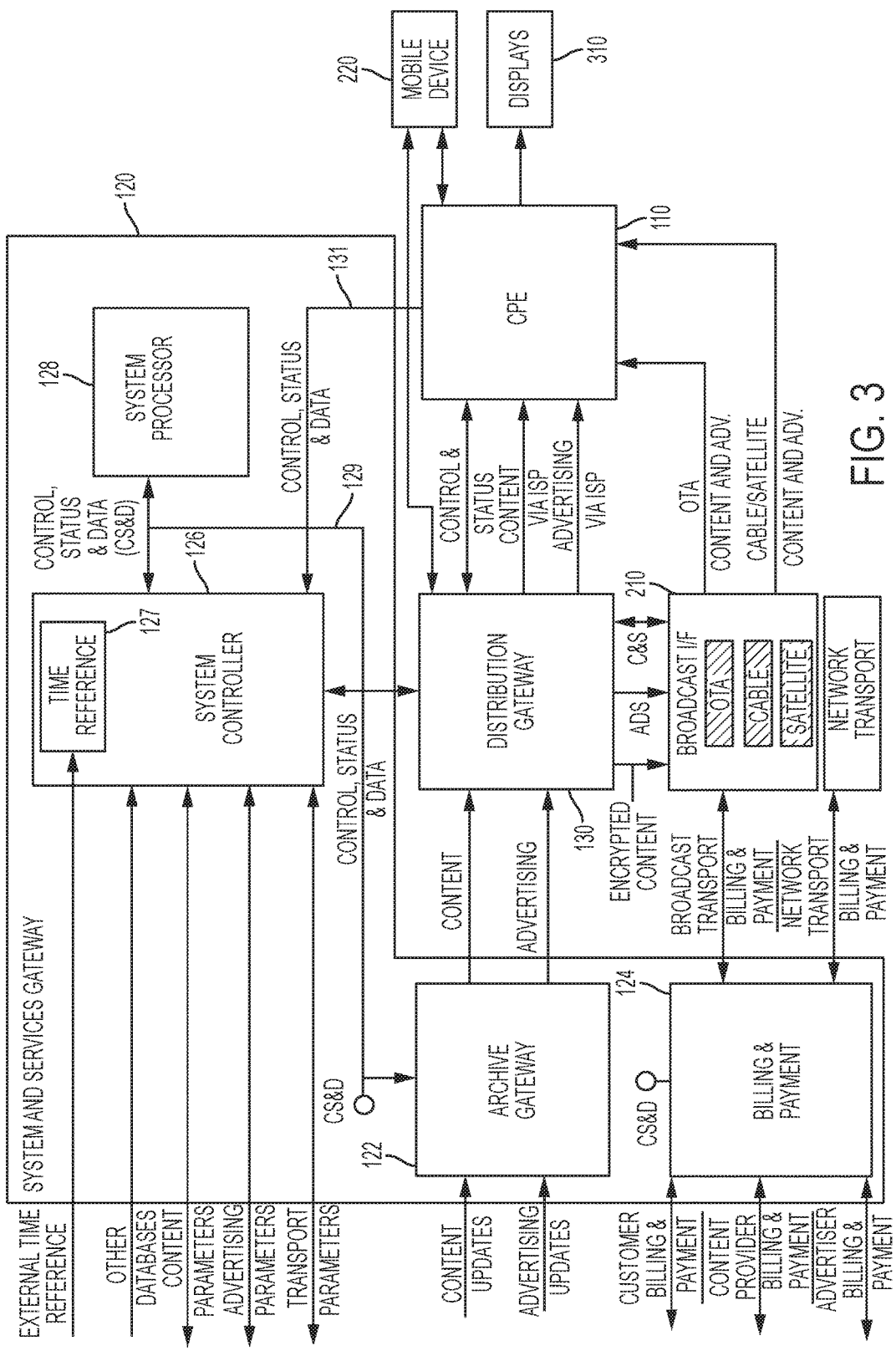
FIG. 3 illustrates an overall block diagram of the example multimedia delivery system, in accordance with one or more possible embodiments.

FIG. 3 illustrates an overall block diagram of the example multimedia delivery system 100, in accordance with one or more possible embodiments. The system and services gateway 120 can include an archive gateway 122, a billing & payment module 124, a system controller 126, and a system processor 128. In an example embodiment, the system controller 126, the system processor 128, and CPE 110 can be combined into a single device, for example as a tablet and/or smart television. The system controller 126 can include a time reference module 127. The archive gateway 122 can be coupled to the system controller 126 and the system processor 128 via a control, status & data bus 129. The distribution gateway 130 can be coupled to the broadcast infrastructure 210 for transmission of multimedia content and advertising. The broadcast infrastructure 210 can include such broadcasting infrastructure as over-the air broadcast infrastructure, cable broadcast infrastructure, satellite broadcast infrastructure, cellular, and/or any other broadcast network that allows multimedia content to be transmitted to the CPEs 110 of the subscribers 105. At least a portion of the system and services gateway 120 (for example, the system processor 128) can be partitioned and operated simultaneously in, one or more of the following environments: local computing, mobile computing, and distributed computing, cloud-computing, Field Programmable Gate Arrays (FPGA), Application Specific Integrated Circuits (ASIC), quantum computing, or any other processing environment that can implement at least a portion of the system and services gateway 120. In another embodiment, the system controller and system processor can operate as a software program or app integrated into other equipment. For example, the system processor 128 and/or the system controller 126 can operate as an app on a tablet or smart phone.

The archive gateway 122 can receive such information as multimedia content updates and advertising updates. The archive gateway 122 can transmit multimedia content and advertising to the distribution gateway 130. The multimedia delivery system 100 can store the multimedia content in the archive gateway 122 (or archive cloud) for transfer to the distribution gateway 130 for commonly viewed multimedia content and to CPEs 110 of the subscribers 105 under agreed licensing and pricing terms and conditions.

All data from external interfaces can be handled through the multimedia delivery system 100. In particular, such data from external interfaces can be sent and received by the system controller 126. This data can include subscriber 105 parameters provided by the subscribers 105, content provider 140 parameters provided by the content providers 140, advertiser parameters provided by the advertisers 150, and transport parameters provided by the transport providers 160, an external time reference 127, and other databases to be used to optimize the multimedia delivery system 100. The external time reference can be distributed throughout the multimedia delivery system 100. The external time reference can be used to maintain synchronization for deconstructing and constructing multimedia content and advertising, as well as token authorization and decryption. The system controller 126 can receive an external time reference 127 and information from other databases.

The distribution gateway 130 can send and receive information from the mobile device 220 operating as a CPE 110. The distribution gateway 130 can send and receive, to and from the CPE 110, such bidirectional information as control & status that can be either encrypted or unencrypted, and transmit such information as multimedia content via a transport provider 160 and advertising via a transport provider 160. The distribution gateway 130 can transmit to the broadcast infrastructure 210 such information as encrypted multimedia content and advertisements, and send and receive, to and from the broadcast infrastructure 210, such bidirectional information as control and status that can be either encrypted or unencrypted. The distribution gateway 130 can send multimedia content and advertising to the mobile device 220. In one or more possible embodiments, the CPE 110 can send multimedia content to the mobile device 220 to be viewed on one or more displays 310, either for storage or live streaming from the CPE 110.

The broadcast infrastructure 210 can transmit multimedia content and advertising over one or more of the over-the air broadcast infrastructure, cable broadcast infrastructure, and satellite broadcast infrastructure. One or more possible embodiments can maintain a multi-stage process for Internet delivery of multimedia content and advertising to a subscriber 105. All multimedia content and advertising, from their respective sources, can be initially transferred to a central repository, the archive gateway 122. The archive gateway 122 can provide for long term storage or the "permanent" storage of multimedia content. The functions performed by the archive gateway 122 can be distributed in the distribution gateways 130 and/or be performed in a cloud-computing environment.

Frequently selected multimedia content can be transferred from the archive gateway 122 to distribution gateways 130 for staging. The distribution gateways 130 can be located throughout the country to minimize the impact to the Internet and therefore transport price(s). The multimedia content maintained on the distribution gateway 130 can be regularly updated to reflect new popular multimedia content becoming available, with pruning being performed on least frequently selected multimedia content that is on the distribution gateway 130. The multimedia content selection maintained on a given distribution gateway 130 can be individually optimized and can be different from region to region. The multimedia content selection maintained on distribution gateways 130 can also be updated periodically and can reflect seasonal viewing preferences, for example, holiday multimedia content during holidays, horror multimedia content during Halloween, etc.

Infrequently selected multimedia content can be maintained only on the archive gateway 122. The infrequently selected content, upon a request from the subscriber 105, can be transferred to the distribution gateway 130 and placed in temporary storage of the distribution gateway 130. This buffered multimedia content can then be processed as frequently viewed multimedia content for delivery to a requesting CPE 110 of the subscriber 105, again minimizing the impact to delivery infrastructure (for example, the Internet) and price. The amount of storage maintained in the distribution gateway 130 can be optimized to minimize the overall capital expenditure and operational costs, trading off the cost for adding and maintaining disk storage vs. the Internet backbone impact and cost of delivering infrequently selected content that can be maintained on the archive gateway 122. The optimized storage maintained on the distribution gateways 130 can be different from region to region.

Staged content on the distribution gateway 130 can be transferred to the CPE 110 of the subscriber 105 upon a request from the subscriber 105. Since one or more of the embodiments encourage, via economic incentives, to have subscribers 105 preplan their content selection, the delivery of multimedia content to the CPE 110 can be performed to minimize delivery infrastructure (for example, the Internet) transport charge(s).

The system processor 128 can analyze the multimedia content stored on each archive gateway 122 and each distribution gateway 130. This analysis can use the information contained in subscriber 105 preferences shown in Table 4 and subscriber 105 viewing history data, multimedia content request history, and multimedia content search history shown in Table 5. In one or more example embodiments, the multimedia content search history can be provided by a third party, for example, an Internet search engine provider. Using this analysis, the system processor 128 can rank multimedia content by popularity, longevity, and cost to maintain the multimedia content in the repository of the archive gateway 122 to determine what multimedia content is stored and when it's purged from the repository of the archive gateway 122. Purged multimedia content can be stored in offline storage. This process can be adjusted for seasonal and regional viewing preferences. This information and instructions are passed to the system controller 126 for distribution to the archive gateway 122 and subsequently to the distribution gateway 130.

The system processor 128 can use information contained in CPE profile data shown in Table 1, subscriber 105 account profile shown in Table 2, individual subscriber 105 profile shown in Table 3, subscriber 105 preferences data show in Table 4, subscriber 105 history data shown in Table 5, and multimedia content metadata from external databases shown in Table 6 to discover multimedia content to recommend to the subscribers 105. Such information can be used to create a community of subscribers 105 with common viewing interests and build a subscriber 105 social network. This community can provide discussion groups (similar to a book club), forums, subscriber-written reviews, and lists of curated content for and by subscribers 105. These communities build subscriber 105 affinity and cohesiveness, which can create subscriber 105 "stickiness". This stickiness translates into attention and can create added value for the advertisers 150. Advertisers 150 can use this increased attention to add value to their commercials. Existing social networks (e.g., Facebook) can be integrated into the multimedia delivery system 100.

The price for multimedia content may be determined by the system processor 128 as an exponential decay as a function of time as follows:

$$\text{Content Provider Price}_{i,j}(t) = (\text{Start Price}_{i,j} - \text{Tail Price}_{i,j}) * \exp[-\beta_i * (t - \text{Start Time}_j)] + \text{Tail Price}_{i,j}$$

where t is a function of any instantaneous time, i identifies the specific content, j identifies content resolution, and $\beta_i$ identifies the decay rate of the specific multimedia content. More complex models can be instantiated within the system processor 128.

The system processor 128 can calculate the Advertising Quality of Service (AQoS) and prioritize advertising to achieve a specified AQoS. The AQoS can include a minimum percentage of distinct subscribers 105 that have a specified advertisement displayed a minimum number of times for the multimedia system 101 or advertiser 150 specified cluster. This process can use the information contained Tables 1, 2 and 3, subscriber 105 viewing histories, external databases (for example, advertiser supplied databases) and advertiser 150 demographics of interest. Advertisers 150 can also purchase exclusivity or limited exclusivity during the viewing of a specified multimedia content by their selected or multimedia system 101 selected cluster profiles. In at least one embodiment, the subscriber 105 can be given a credit coupon by a product seller when associated advertising is viewed and the product is purchased to reduce the out-of-pocket expenses of the subscriber 105 to maintain services and multimedia content provided by the multimedia system 101. The feedback of advertising to a purchase, AQoS, type of advertising (targeted, non-targeted, and subscriber requested), and subscriber 105 interaction with the CPE 110 can be used by the system processor 128 to measure an Advertising Impact Quality of Service (AIQoS). This can be performed for both national and regional advertisers 150.

Placement of an advertisement within content is based on maximum value to an advertiser 150. The system processor 128 can determine such value and priority using subscriber 105 profiles, subscriber 105 viewing history, subscriber 105 account profile, individual subscriber 105 profiles, subscriber 105 preferences, advertiser requests and parameters, interactions of the subscriber 105 with the CPE 110, and/or one or more of factors show in tables 1-6. The system processor 128 can transmit results of such a determination to the CPE 110 for assembly of an advertisement within multimedia content. These factors can include: cluster-specific and individual-specific subscriber 105 profiles, type of advertisement (generic cluster-specific, advertiser-specific, and subscriber-requested), time and date of a start request, value and cycle (i.e., selection of a next advertisement in a value-ordered list of advertisements can be sent to a CPE 110 of a subscriber 105 to be inserted in the multimedia content.

The system controller 126 can transmit this list to the CPE 110. The CPE 110 can maintain and update this ordered list through a prioritized list of advertisements assignments for each available commercial slot, tracking of a number of times a particular advertisement is viewed within a given time interval, a last time a particular advertisement was shown to a subscriber 105 of the CPE 110 to determine when such an advertisement should be shown again to cluster-specific and individual-specific subscribers 105, subscriber 105 demographic profile (used by advertisement insertion instruction module of the CPE 110 (not shown)), type of advertising accepted or requested by a subscriber 105 via the CPE 110, a predetermined value of a cluster-specific and individual-specific subscriber 105 to an advertiser 150 in its processing, decreasing value of an advertisement with the passage of time or repeated viewings within a specified time interval to a cluster-specific or individual-specific subscriber 105, and repeated viewings of multimedia content can have different advertisements inserted for each viewing of the multimedia content by cluster-specific and individual-specific subscribers 105. These factors can further include an advertisement or advertising campaign as specified by an advertiser 150 to be inserted within multimedia content based on one or more of cluster-exclusivity, limited cluster-exclusivity, content-specific insertion for selected cluster subscriber 105-profiles, individual-subscriber 105 profiles, advertiser 150 specified minimum number of times an advertisement is displayed, a minimum number of repetitions within a time interval an advertisement can be shown to a subscriber-cluster or individual subscriber 105, advertiser 150 specified demographic-seeding instructions to perform more focused clustering for products and services, advertiser 150 specified regional and national insertion and display of an advertisement, advertiser 150 specified advertisement play time of when the advertisement is presented to a subscriber 105 within the multimedia content relative to the start of the multimedia content, content position (cluster-specific and individual-specific) of advertising insertion times, an advertisement actual play time within a specific multimedia content, position of the advertisement, and content checked (against the specified advertisement play time, content and position) for AQoS and AIQoS validation.

The system and services gateway 120 can limit a subscriber 105 specified maximum price for a billing period (for example, bi-weekly, monthly, quarterly, semi-annually, yearly, and/or any other billing period selected by a subscriber 105) based on the subscriber's 105 desired multimedia content for viewing. The system and services gateway 120 can automatically adjust various subscriber parameters with respect to constraints of the content providers 140, advertisers 150, and transport provider(s) 160. The system and services gateway 120 can automatically adjust preferences of the subscriber 105 to meet a subscriber 105 set price limit for a billing period based on selected multimedia content. The system processor 128 of the system and services gateway 120 can perform pricing that includes automatic design-to-price of personalized multimedia content programming of the subscribers 105 based on a willingness of the subscribers 105 to modify viewing choices and preferences. For example, the CPE 110 can allow a subscriber 105 to select and control modification of a preference including at least one of an allowed amount of advertising to be inserted in the multimedia content, the lead-time of electronic delivery, a multimedia content delayed viewing period, a multimedia content resolution, and targeted, non-targeted, and subscriber requested advertising types to meet the maximum price for the billing period. Such selection and modification can be based on the subscriber 105, via the CPE 110, selecting at least one of multimedia content for viewing, selecting a different time/date for viewing of the multimedia content, and modifying at least one of the subscriber selected preferences different from the at least one of the subscriber selected preferences modified to meet the maximum price for the billing period.

In an alternate example embodiment, the system controller 126 can communicate directly with the CPE 110 via a control, status & data bus 131, such communications can include control, status, and data information, such as multimedia content, advertising, and any recommendations determined by the system processor 128. In another alternate example embodiment, the multimedia content and advertising recommendation can be implemented as a standalone system operating with its own system controller 126 and system processor 128. For example, the CPE 110 can implement the system controller 126 and system processor 128 therein to determine recommended multimedia content and advertising using the information from Table 1-8.

Figure 4:
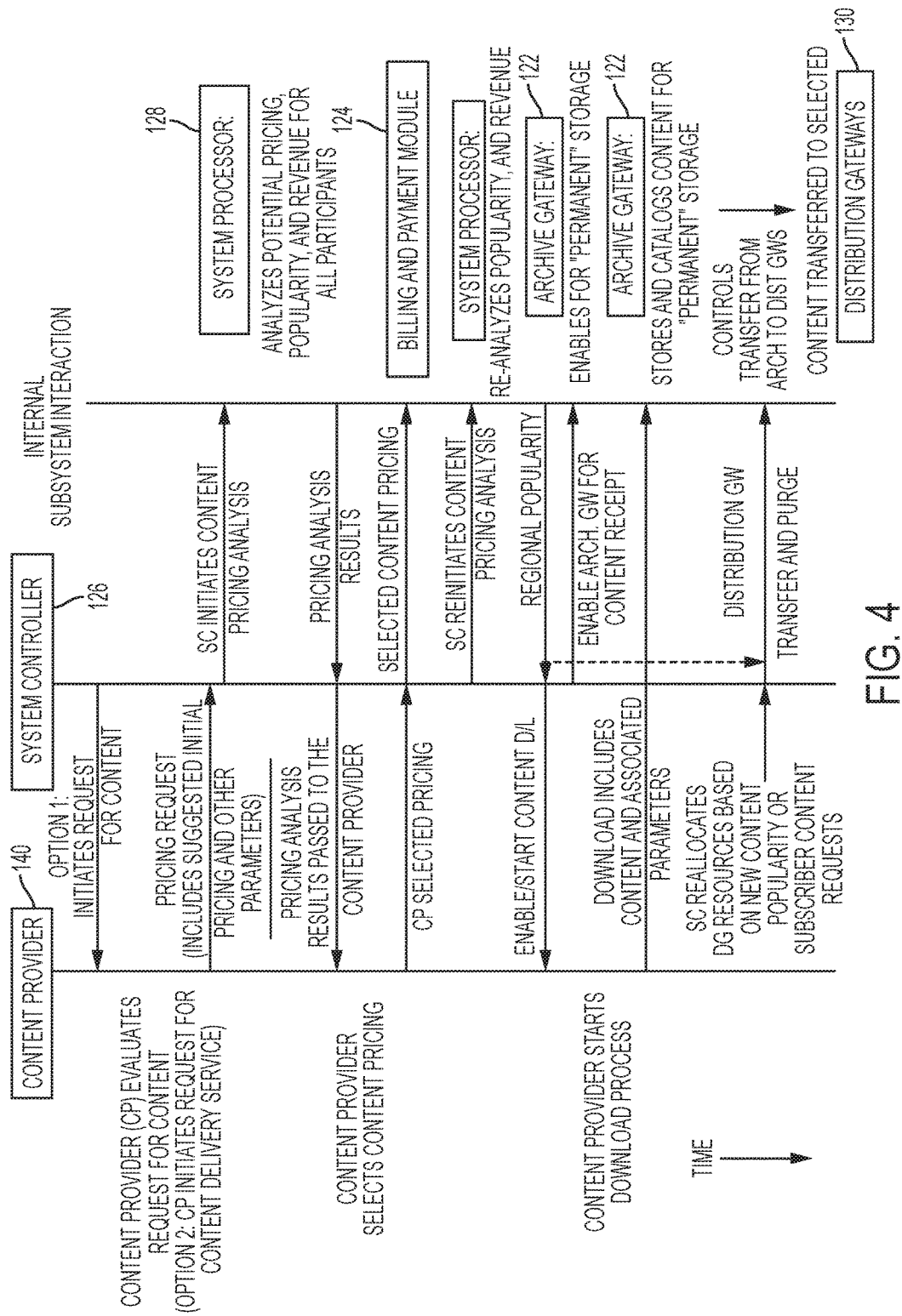
FIG. 4 illustrates an example interaction between a content provider and an SSG-system controller, and interaction between the system controller and internal subsystems of the multimedia delivery system, in accordance with one or more possible embodiments.

FIG. 4 illustrates an example interaction between the content provider 140 and the system controller 126, and interaction between the system controller 126 and internal subsystems of the multimedia delivery system 100, in accordance with one or more possible embodiments. Either the system controller 126 (Option 1) or a content provider 140 (Option 2) can initiate a request for content delivery to the multimedia delivery system 100. The content provider 140 can respond to Option 1 or Option 2 with a pricing request. This pricing request can include an identification number of the content provider 140, a unique multimedia content identification number, a suggested multimedia content price, and other parameters (for example, content screenplay, available content resolution(s), content file size(s), content runtime(s), and other multimedia content descriptive information). This information can be sent to the system controller 126 through a Virtual Private Network (VPN). The system controller 126 then can send this information to the system processor 128.

The system processor 128 can analyze data of the multimedia content, including advanced analytics to analyze the screenplay for plot, and other production choices, for example actors, directors. This analysis can be used in conjunction with subscriber 105 cluster interests. The system processor 128 can provide, based on this analysis, potential content pricing, popularity, and expected content provider 140 revenue. This processing can take into account a domain shift associated with changing subscriber 105 viewing preferences and habits. The system processor 128 can then pass this information back to the system controller 126 which passes the information back to the content provider 140. The information returned to the content provider 140 from the system processor 128, via the system controller 126, can include: 1) the potential subscriber 105 demand for the multimedia content at as a function of price, 2) the predicted popularity of the multimedia content (for example, from clustering analysis performed in the system processor 128) and 3) expected revenue generated by the multimedia content as a function of time. The system processor 128 can analyze and optimize the multimedia content pricing and recommendation, advertising pricing and transport pricing functions either independently or all functions simultaneously/globally through the use of local and global adjudication.

The system controller 126 can calculate an optimum price together with a table that provides the expected demand, expected popularity and expected revenue as a function of a multimedia content price curve. This information can then be passed to a content provider 140 as a basis to select a multimedia content price. The content provider 140 can choose to select the optimum price for the multimedia content determined by the system and services gateway 120 or set a different price. The final selected price is sent by content provider 140 back to the system controller 126. If the content provider 140 selects a multimedia content price that differs from the optimum price determined by the system and services gateway 120, the system controller 126 can forward the new information to the system processor 128 for revaluation. The system processor 128 can reevaluate the popularity and revenue model for internal use by the multimedia delivery system 100. However, even if the content provider 140 selects a suboptimum price, the multimedia delivery system 100 will use that price. The system controller 126 can forward this multimedia content pricing to the billing and payment module 124. The interaction and operation between the system controller 126, the system processor 128, external interfaces (with content providers 140, advertisers 150, and content broadcast and network transport), the archive gateways 122, and the distribution gateways 130 can be controlled by the system controller 126.

The reevaluation of multimedia content popularity as a function of time can be necessary to maintain the archive gateways 122 and the distribution gateways 130. The maintenance can purge less popular multimedia content, thereby freeing up storage for more popular multimedia content. Whenever new multimedia content is added to the archive gateways 122 or distribution gateways 130, the system controller 126 can task the system processor 128 to perform a multimedia content popularity analysis to make storage available. As shown in FIG. 4, the system controller 126 can perform this purging process before enabling multimedia content (or advertising) transfer from a content provider 140 (or an Advertiser 150) to the archive gateways 122. Also, the system controller 126 can perform this purging process before enabling multimedia content (or advertising) transfer from an archive gateway 122 to one or more regional distribution gateways 130.

The distribution gateway 130 can be coupled (for example, contain) to one or more of solid state and/or disk-based storage. Periodically, the system controller 126 can task the system processor 128 to analyze subscriber 105 multimedia content requests. Based on the received analysis, the system controller 126 can reallocate existing distribution gateway 130 multimedia content between solid state and disk-based storage to achieve lower operating cost and faster multimedia content retrieval.

Figure 5:
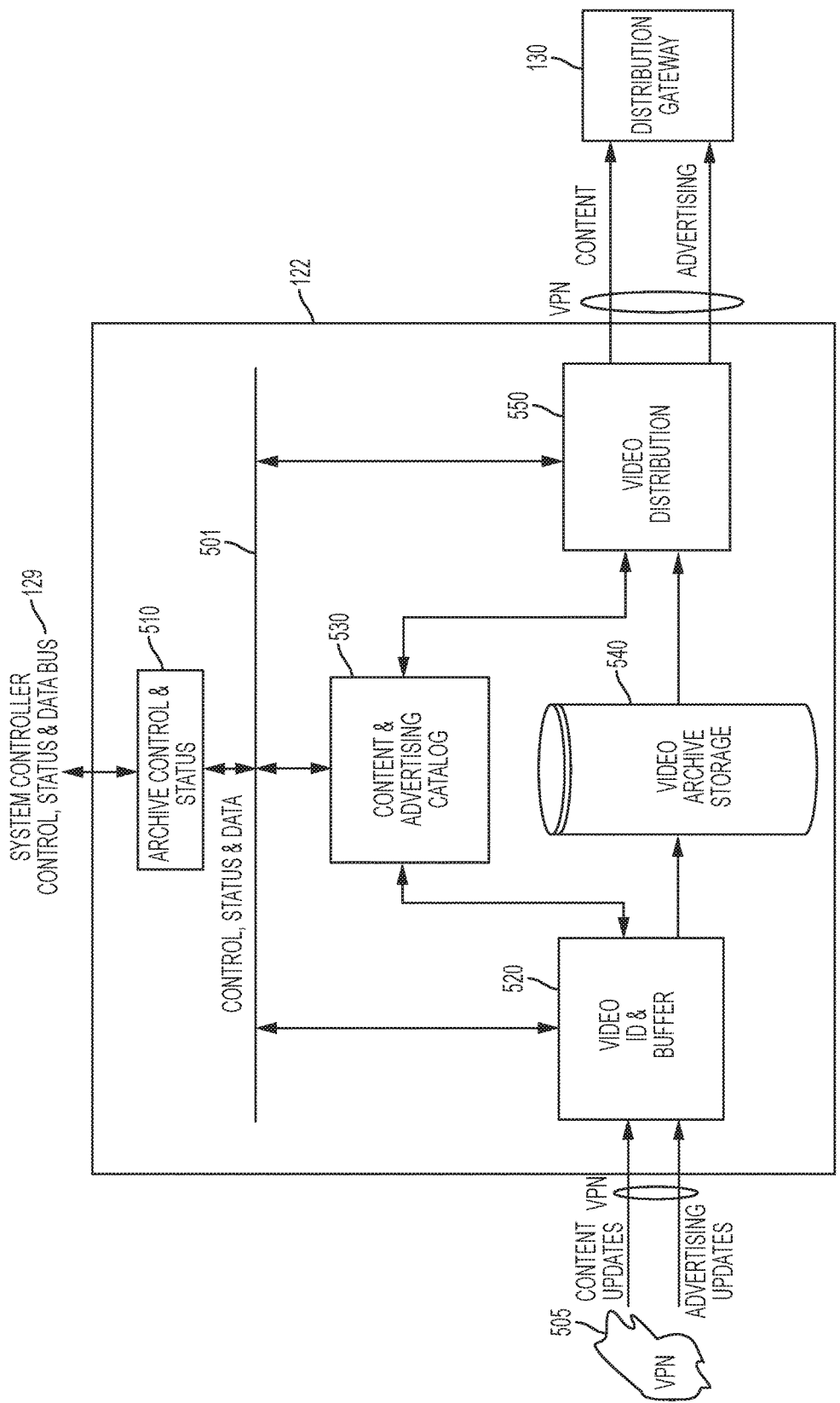
FIG. 5 illustrates a block diagram of an example archive gateway, in accordance with one or more possible embodiments.

FIG. 5 illustrates a block diagram of an example archive gateway 122, in accordance with one or more possible embodiments. The archive gateway 122 can include an archive control & status module 510, a video ID & buffer module 520, a content & advertising catalog 530, video archive storage 540, and a video distribution module 550. The archive control & status module 510 can be coupled to the control, status & data bus 129 and a control, status & data bus 501 within the archive gateway 122. The video ID & buffer module 520 can be coupled to a Virtual Private Network (VPN) 505, the control, status & data bus 501, the content & advertising catalog 530, and the video archive storage 540. The content & advertising catalog 530 can be coupled to the control, status & data bus 501 and the video distribution module 550. The video archive storage 540 can further be coupled to the video distribution module 550. The video distribution module 550 can further be coupled to the control, status & data bus 501 and the distribution gateway 130.

The archive gateway 122 can store all active multimedia content and advertising that may be accessed in the multimedia delivery system 100. This includes licensed multimedia content and active advertising. All new multimedia content and advertising can be received via the VPN 505 from their respective sources, the content providers 140 and the advertisers 150. The video data can be buffered for conversion into a format used by the multimedia delivery system 100 and cataloged. Once this process is complete, the multimedia delivery system 100 formatted multimedia content can be transferred to the video archive storage 540. The content & advertising catalog 530 can maintain an index for all multimedia content and advertising stored in the video archive storage 540.

The video distribution module 550 can control transfer of multimedia content and advertising to the distribution gateway 130. Commonly requested multimedia content (new and perennial favorites) can be stored and serviced directly from the distribution gateway 130 to minimize traffic on distribution infrastructure (for example, the Internet backbone). Infrequently accessed multimedia content can be serviced from the archive gateway 122 for delivery through the distribution gateway 130. The system processor 128 of the distribution gateway 130 can regularly evaluate operations of the multimedia delivery system 100 to optimize storage of the distribution gateway 130. Optimizing storage of the distribution gateway 130 can minimize overall costs by trading off storage of the distribution gateway 130 for distribution infrastructure transportation costs.

Figure 6:
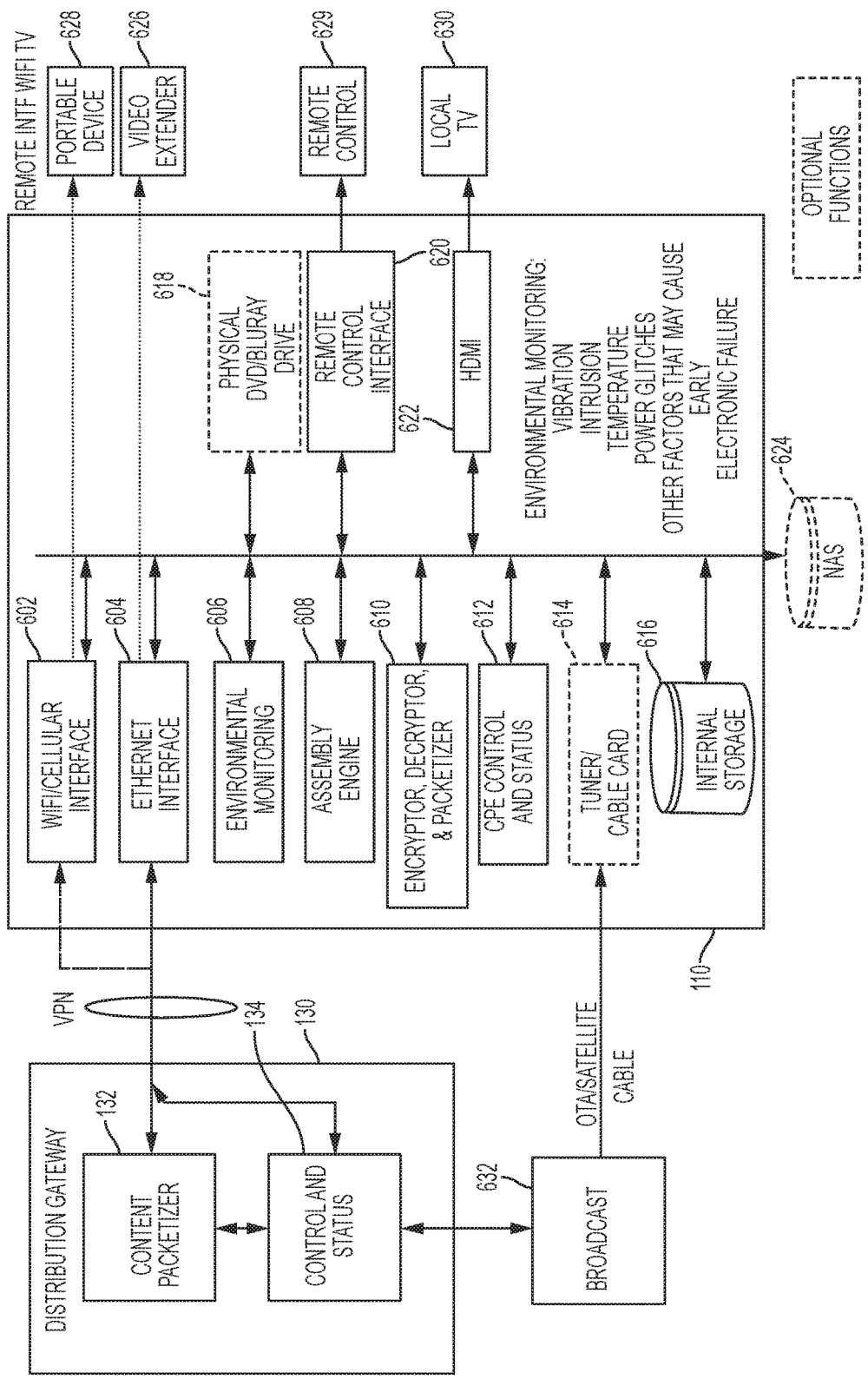
FIG. 6 illustrates a block diagram of an example CPE, in accordance with one or more possible embodiments.

FIG. 6 illustrates a block diagram of an example CPE 110, in accordance with one or more possible embodiments. In particular, the CPE 110 can include a Wi-Fi/Cellular interface 602, an Ethernet interface 604, an environmental monitoring module 606, an assembly engine 608, an encryptor, decryptor, & packetizer 610, a CPE control and status module 612, a tuner (for example, over-the-air tuner)/cable card (for example, satellite and/or cable) module 614, and internal storage 616. The CPE 110 can further include a DVD/Blu-ray drive 618, a remote control interface 620, and an HDMI interface 622. All of the components of the CPE 110 can be inter-coupled with one another. The CPE 110 can be coupled to an external network attached storage (NAS) device 624. The remote control interface 620 can communicate with a remote control 629. The HDMI interface 622 can be coupled to a local television 630. The assembly engine 608 can retrieve at least one of multimedia content and advertisements from the internal storage 616 and/or the NAS device 624 and output the at least one of multimedia content and advertisements to a display device, such as local television 630, for viewing by the subscriber 105.

The CPE 110 can be a "set-top" box that can provide a mechanism to store and display multimedia content (and advertisements) across a variety of devices, shown in FIG. 6. The CPE 110 can interact with the distribution gateway 130 and the subscriber 105 to coordinate the viewing of multimedia content. Although the multimedia delivery system 100 can stream multimedia content, the primary mode of operation is to display multimedia content that has been pre-stored on the CPE 110. An advantage of pre-storing multimedia content on the CPE 110 is to reduce peak distribution infrastructure bandwidth requirements and eliminate susceptibility to momentary glitches in network delivery of the multimedia content.

The CPE 110 can have a primary CPE 110 account for bill paying, overall price control, and parental controls, as well as defining underlying individual profiles for viewing preferences and selections. In addition, an individual CPE 110 can have multiple primary accounts that can allow for separate billing.

The CPE 110 can store all preloaded multimedia content in an encrypted state until the CPE 110 receives a subscriber 105 requested to display the multimedia content. After viewing, any unencrypted buffered multimedia content can be purged, again leaving only the encrypted multimedia content resident on the CPE 110. The CPE 110 can accept broadcast delivery via tuner/cable card module 614 from one or more broadcast infrastructure 632 (for example, over-the-air, satellite, and/or cable). In addition, the CPE 110 can be preloaded for general resale with popular current multimedia content so the subscriber 105 can start using the CPE 110 immediately without needing to stream and/or download the multimedia content prior to viewing. The preloaded multimedia content can also include a variety of promotional videos or content.

The WiFi/cellular interface 602 and Ethernet interface 604 can provide network interfaces to the distribution gateway 130 via the service provider 160 of the subscriber 105. In addition, these interfaces can be used to connect to a video extender 626 and one or more portable devices 628 to the CPE 110. The video extender 626 can be a stripped down CPE 110 that allows the CPE 110 to transfer video content to multiple televisions, simultaneously. The CPE 110 can directly transfer and store multimedia content on portable devices 628 for subsequent display of the multimedia content. The environmental monitoring module 606 can monitor for vibration, intrusion, temperature, power glitches, and any other factors that may cause an electronic failure with the CPE 110.

The CPE 110 can use, for a multicast or any one-to-many multimedia content and/or advertisements delivery system, a unique encryption key and a common or general decryption key to decrypt multimedia and/or advertising content, if required. Once the CPE 110 receives the unique encryption key and the general decryption key, the CPE 110 can decrypt the multimedia and/or advertising content with the general decryption key and re-encrypt the multimedia and/or advertising content with the unique encryption key prior to placing the multimedia content in the internal storage 616 or the external NAS 624 device. The distribution gateway 130 can transmit to the CPE 110 information required to perform the multicast decryption and unique re-encryption per CPE 110 prior to placing the multimedia content and/or advertisements in storage. In response to a subscriber 105 request to play the multimedia content with the CPE 110, the distribution gateway 120 can transmit a unique decryption key to the CPE 110 that permits the CPE 110 to decrypt and play the multimedia content on the CPE 110.

The subscriber 105 can initiate actions at any time during viewing of selected multimedia content with the CPE 110. These actions can include Pause/Resume, Fast Forward, Rewind and AdSkip. Each action modifies assembly instruction differently subject to a set of predetermined, programmable rules. In addition, the subscriber 105 can vote on individual advertisements with the potential to receive subsidies to offset the price of the multimedia content.

In each subscriber-initiated action, the CPE 110 can save the multimedia content state and capture the Time of Day (ToD) and the elapsed time from start of multimedia content viewing Tcs. At the start of multimedia content, Tcs can equal the current ToD and at the end of content Tce can equal the then current ToD. The ToD can include the time stamp of the day count (can be referenced to Jan. 1, 2015) and time (referenced from 0000 hours) and can be locked to an external, system time reference such as the NIST Time Server. Any subscriber 105 initiated action can carry both a ToD and a value relative to the Tcs. The ToD can include a day count starting at a multimedia system 101 defined point (can be referenced to Jan. 1, 2015).

Pause/Resume can allow the subscriber 105 to pause multimedia content and/or advertisement viewing and then resume multimedia content viewing when ready. Fast Forward can allow the subscriber 105 to fast forward the multimedia content and/or advertisement to a selected point and resume viewing. Associated with the Fast Forward action is a visual and/or timing (using the Tcs) cues to allow the subscriber 105 to find the desired point within the multimedia content and/or advertisement and resume viewing from that point. Rewind allows the subscriber 105 to find and replay a previously viewed point in the multimedia content and/or advertisement. Again, associated with the Rewind action is a visual and/or timing (using the Tcs) cues to allow the subscriber 105 to find the desired point and replay the multimedia content and/or advertisement.

AdSkip allows the subscriber 105 to skip a selected advertisement. Since the subscriber 105 can select the number of advertisements inserted into any given multimedia content, this feature is preferably limited. AdSkip can impact the potential advertiser 150 subsidy, and therefore the subscriber 105 costs within the multimedia system 101. The CPE 110 can provide an Advertisement Skip Button for particularly undesirable advertising. This feature can be implemented as permanent commercial skipping for the particular advertisement. This information can be transmitted back to the advertiser 150. If insufficient advertising subsidy remains to meet the subscriber's 105 requested subsidy, the CPE 110 can flash up on a display the cost impact of the commercial skip, indicate that additional advertisements might be needed to be viewed to make up for the skipped advertisement, or a combination of the two.

The Pause/Resume action can be implemented with the CPE 110. When the subscriber 105 presses and activates the Pause/Resume button on a remote of the CPE 110 (using a remote control), the CPE 110 can immediately pause the multimedia content and/or advertisement at that point, and capture and saves the content state (including the ToD and Tcs). The time of action Ta is the content elapsed time from Tcs (when the content was paused). Additionally, a ToD can be assigned to the time of action. If the Ta of the resume minus the Ta of the pause is less than or equal to a maximum allowed pause interval, then the subscriber 105 can resume the viewing of the multimedia content and/or advertisement. If the Ta of the resume minus the Ta of the pause is greater than this maximum allowed pause interval, then the resume functionality causes a new token to be issued by the distribution gateway 150 and the viewing of the multimedia content and/or advertisement resumes from the exact point of the pause. If the current ToD minus the Tcs exceeds the subscriber's 105 purchased viewing window, a new token purchase can be required. This decision can be provided as an option from the content provider 140. The subscriber actions, including play, pause, resume, fast forward, rewind, and ad-skip, can be reported to the system processor 128 of the system and services gateway 120 based on the time of action. The CPE 110 can capture and report actual multimedia content and advertisement viewing statistics in real-time and/or near real-time for use by the system processor 128 of the system and services gateway 120. In addition, all interactions with the subscriber web interface can be reported to the system processor 128.

The distribution gateway 130 can include a content packetizer 132 and a control and status module 134. The distribution gateway 130 can monitor and manage, e.g., subscriber 105 usage of multimedia content and data per CPE 110, billing data per CPE 110, key(s)/token(s) to enable individual CPEs 110 to record and display content, and changes in a CPE 110 router IP address as dynamic addresses changes. In addition, the distribution gateway 130 can supply a subscriber 105 web interface. The web interface can allow the subscriber 105 to select multimedia content and set preferences, to control overall monthly charges, generate advertisement insertion instructions, and provide a VPN bank to service the associated CPEs 110. The content packetizer 132 can deliver encrypted multimedia content and advertising (either encrypted or un-encrypted) to the CPE 110. In addition, the subscriber 105 may access the subscriber 105 web interface via the CPE 110 to request content play, request multimedia content recommendations, etc.

The distribution gateway 130 can have a large front end storage to hold several million hours, or more, of frequently accessed multimedia content and current advertising. In addition, the front end storage can be used to buffer archived multimedia content, from the archive gateway 122, that is less frequently accessed. This approach can be done to allow all encrypted multimedia content transfers to be handled identically, whether current or archived. The actual sizing of the front end storage is an on-going process and can regularly be calculated in the system processor 128 to trade off and optimize cost for local storage vs. transportation infrastructure delivery prices to minimize expenses for archived or "infrequent" multimedia content access. This process can add, delete, and move multimedia content between the archive gateway 122 and the distribution gateway 130.

The control and status module 134 can provide the overall coordination of the distribution gateway 130. The control and status module 130 can ensure that a subscriber 105 data use monitor, a local audit function, usage tracking and billing function, a token/Key manager, the subscriber web interface, advertising control, the VPN bank, and the content packetizer 132 all operate together without problems.

In another example embodiment, the control and status module 612 can perform the content recommendation functions described herein. For example, the functionality of the system processor 128 and the system controller 126 can be performed by the control and status module 612 to determine recommended multimedia content and advertising.

Figure 7:
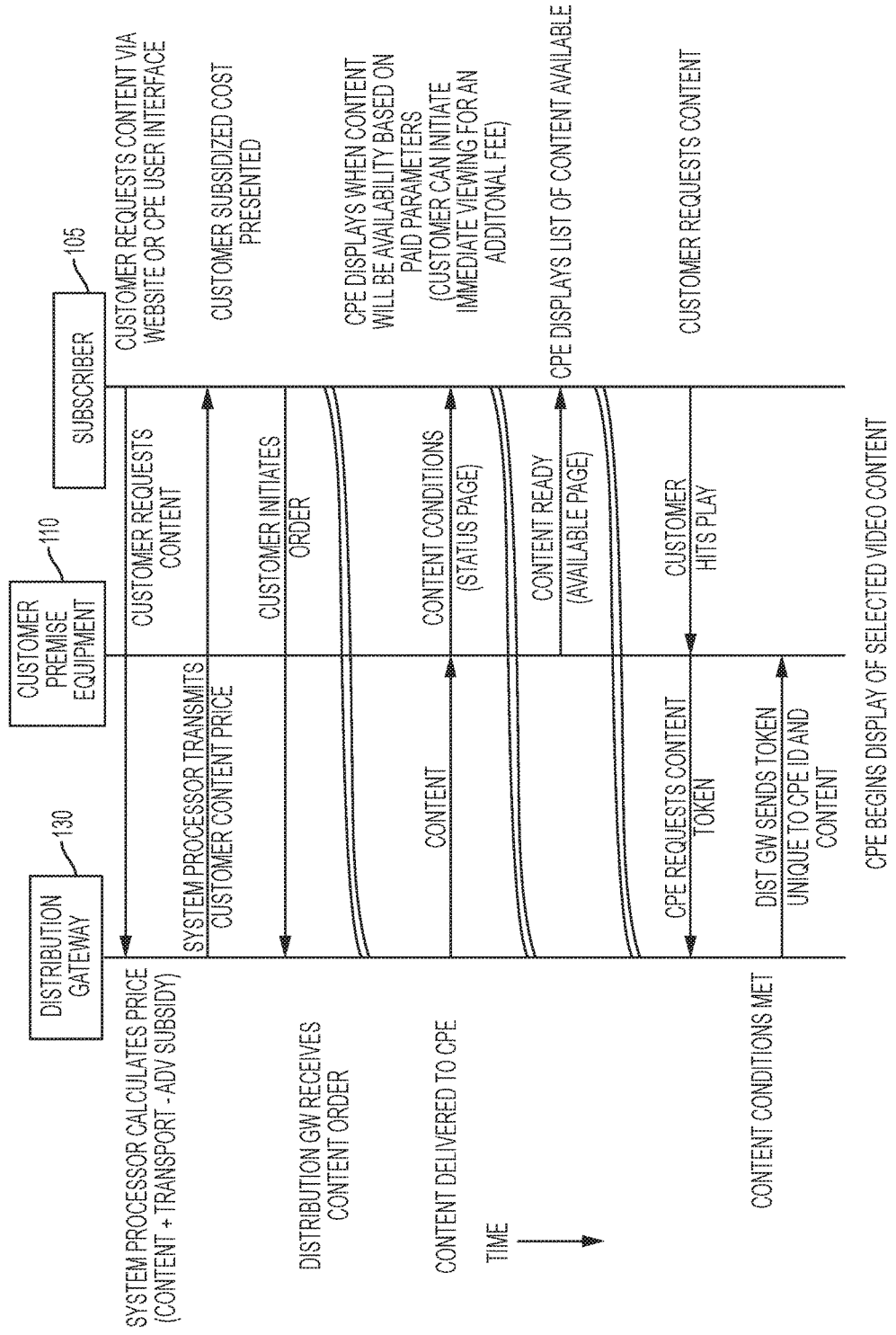
FIG. 7 illustrates an example interactive, bidirectional-exchange of information between the CPE and a distribution gateway, and between the CPE and a subscriber, in accordance with one or more possible embodiments.

FIG. 7 illustrates an example interactive, bidirectional-exchange of information between the CPE 110 and the distribution gateway 130, and between the CPE 110 and the subscriber 105, in accordance with one or more possible embodiments.

All aspects of pricing can be handled outside of the CPE 110. The CPE 110, if requested, can display the current and projected monthly billing cycle charges. In addition, a front panel LED can be set to display different colors based on used and projected multimedia content charges set against a selected threshold of the subscriber 105. As an example, green might indicate less than 75% of the selected dollar threshold utilized, yellow might indicate 76 to 100% of the selected dollar threshold utilized, and red may indicate over 100% of the selected dollar threshold utilized.

The distribution gateway 130 can receive, via the CPE 110, a subscriber 105 request for multimedia content. The subscriber 105 can send a request for multimedia content via a website or a user interface of the CPE 110. In response to such a request, the distribution gateway 130 can transmit to the subscriber 105, via the CPE 110, a plurality of prices associated with delivery of the requested multimedia content. The plurality of prices associated with the delivery can be based on a content provider 140 price for the multimedia content, an amount of lead-time of electronic delivery of the multimedia content, a time/date the multimedia content is viewed or scheduled to be viewed with the CPE 110, resolution of the multimedia content and/or a quality of the multimedia content. The plurality of prices can include any subsidies (for example, advertisements) that the subscriber 105 may receive when ordering the multimedia content. In one or more example embodiments, system processor 128 can apply an additional subsidy to the subscriber content price based upon a demonstrated proof of a product purchase after the subscriber 105 viewed an associated advertising. A value of the additional subsidy can be based on whether the associated advertising is at least one of targeted, non-targeted, subscriber 105 requested, associated with a subscriber 105 identified cluster, and associated with an individual subscriber 105.

The subscriber 105 can initiate an order, via the CPE 110, to schedule delivery of the multimedia content by transmitting an "order" including selection of a price for delivery from the plurality of available prices. In response to the distribution gateway 130 receiving the order for multimedia content, the distribution gateway 130 can transmit the ordered multimedia content to the CPE 110 during a period when a delivery network of one or more of the transport providers 160 is being underutilized, for example midnight to 6 A.M. The CPE 110 can display a multimedia content conditions status page for the subscriber 105. The CPE 110 can display when multimedia content will be available for viewing based on paid parameters. The CPE 110 can display an option for the subscriber 105 to initiate immediate viewing of the multimedia content, instead of waiting until the previously scheduled view time, for an additional fee.

The CPE 110 can inform the subscriber 105 that multimedia content is ready for viewing on a display page listing available multimedia content. The subscriber 105 can request to the view the multimedia content by sending a request to the CPE 110. In one or more possible embodiments, the subscriber 105 can hit play on the remote control 629 of the CPE 110. In response to the subscriber 105 requesting to view the multimedia content, the CPE 110 can send a request to the distribution gateway 130 for a content token. As long as multimedia content viewing conditions are met, the distribution gateway 130 can respond to such a request by sending a token unique to a requesting particular CPE 110 identifier and the particular multimedia content about to be viewed by the subscriber 105. The CPE 110 can receive such a unique token and begin display of selected multimedia content.

The multimedia system 101 can provide for interactive, bidirectional-exchange of control information between the subscriber's CPE 110 and the distribution gateway 130, for example within the VPN 505 network infrastructure, as shown in FIG. 5. From a perspective of the subscriber 105, this control can include downloaded multimedia content identification, subscriber viewing choices and preferences (general and content-specific), and additional control parameters that flow from the CPE 110 to the distribution gateway 130. From the perspective of the distribution gateway 130, this control can include pricing based on subscriber 105 choices and alternate pricing strategies, which can lower the price of multimedia content. Additional information (for example, billing) can also pass through the VPN 505.

In another example embodiment, the multimedia content can be downloaded (pushed) to the CPE 110 based on a distance metric between the subscriber and the multimedia content exceeding a threshold with the process for the pricing, subscriber selection and multimedia content authorization interaction operating essentially the same as the original interaction highlighted in FIG. 7.

Figure 8:
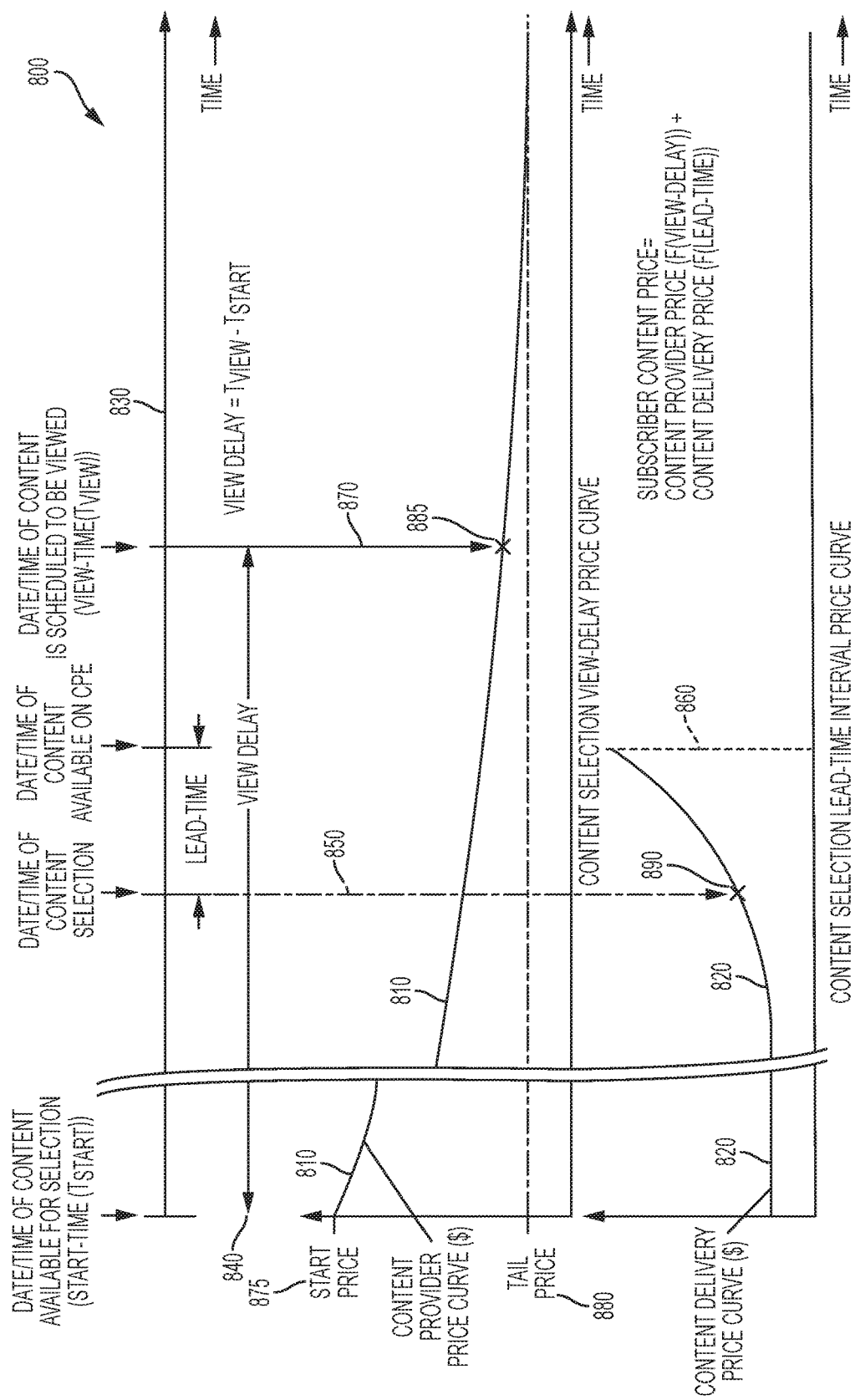
FIG. 8 illustrates an example of subscriber content price timing, in accordance with one or more possible embodiments.

FIG. 8 illustrates an example of subscriber 105 multimedia content price timing 800, in accordance with one or more possible embodiments. The subscriber 105 multimedia content price timing 800 illustrates a timeline 830 showing timing for events from an earlier time to a later time comprising: a date/time of multimedia content is available for selection (start-time) 840, a date/time that multimedia content selection 850, a date/time that multimedia content is available 860 for viewing on the CPE 110, and a date/time that multimedia content is scheduled to be viewed (view-time) 870 on the CPE 110.

The subscriber content price sequence 800 can include a multimedia content provider 140 price curve 810 and a content delivery price curve 820. The content provider 140 price curve 810 can decrease as a function of the length of time from a date/time of multimedia content is available for selection (start-time) 840. The content provider 140 price curve 810 can decrease from a start price 875 that can be established at a time the multimedia content is made available for selection 840. The content delivery price, as shown with curve 820, can increase or decrease as function of lead-time (the length of time between the date/time of multimedia content selection 850 and the date/time of multimedia content is required to be available 860 on the CPE 110).

The system processor 128 can determine a lead-time by taking a difference between the time of the date/time of multimedia content being available 860 and the date/time of multimedia content selection 850. The content delivery price 890 can be determined at any instantaneous time on the content delivery price curve 820 that intersects with the date/time of multimedia content selection 850. In accordance with the principles disclosed herein, the system processor 128 can determine the lead-time and delivery time(s) that will result in the lowest price to deliver the multimedia content to the CPE 110. The system processor 128 can determine the lead-time as hours, days, a week, two-weeks, a month, quarterly for a year, and/or any other period of time that can optimize the delivery price of the multimedia content and as an outcome of this, optimizes the bandwidth of the delivery infrastructure provided by one or more transport providers 160. The multimedia content can be delivered all at once or in segmented portions to the CPE 110. The multimedia content can be delivered throughout the lead-time period to be reassembled at the CPE 110 upon completion of the delivery to the CPE 110. The CPE 110 can receive multimedia content delivered within the subscriber 105 selected lead-time and receive streaming content (for example, news, sports, award programs, and/or any programming that can contain mixed live and/or prerecorded content).

The system processor 128 can determine a view-delay by taking a difference between the date/time of multimedia content is planned to be viewed (view-time) 870 and the date/time of multimedia content is available for selection (start-time) 840. The multimedia content price 885 can be determined at any instantaneous time on the content provider 140 price curve 810 that intersects with the date/time of multimedia content is planned to be viewed (view-time) 870. The system processor 128 can determine a subscriber 105 content price by adding a content provider 140 price and a content delivery price for transporting the multimedia content via one or more transport providers 160. The content provider 140 price is a function of a time at which the multimedia content is scheduled to be viewed and the actual start time for the multimedia content. The content delivery price can be a function of the lead-time of delivery via the transport provider 160 to the CPE 110.

Figure 9:
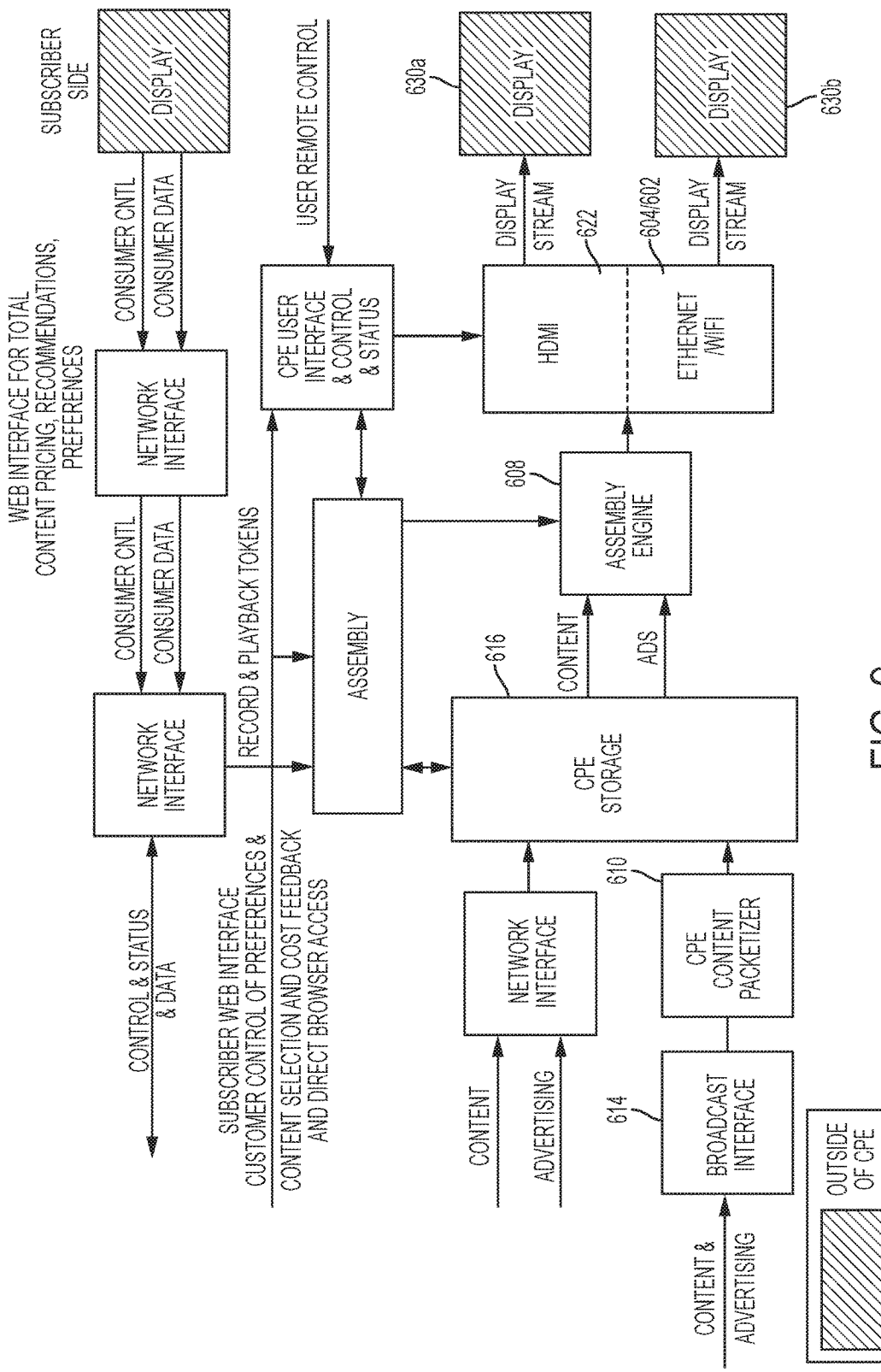
FIG. 9 illustrates a functional block diagram of the example CPE, in accordance with one or more possible embodiments.

FIG. 9 illustrates a functional block diagram of the example CPE 110, in accordance with one or more possible embodiments. The top half of FIG. 9 illustrates the control, status, and data interaction with the subscriber 105 and distribution gateway 130. This interaction (listed in Tables 1 through 4) can include a subscriber web interface for setting up subscriber preferences, request multimedia content recommendations and selection(s), and billing. The distribution gateway 130 interface controls the preloading of content and advertising to the CPE 110, the control of content playback and advertising insertion, and CPE 110 usage for customer billing. The lower left hand side of FIG. 9 illustrates the interfaces that can load content and advertising into the CPE storage 616 via the delivery infrastructure (for example, the Internet and/or broadcast infrastructure). The lower right hand of FIG. 9 illustrates the playback control and assembly of video streams to multiple displays responding to subscriber 105 requests.

The CPE 110 can encrypt all information passing through external display interfaces to increase the security of the CPE 110. An external interface encryption key can be unique to each CPE 110 and particular multimedia content. The CPE 110 can be manufactured with a special epoxy or other adhesive to prevent integrated circuit (IC) delidding that could allow the internal decryption keys to be read.

The CPE 110 can maintain a log of all CPE 110 events to provide viewing historical feedback about/for the subscriber 105. This can include a list of all content advertising viewed, graphical representation of cost/price as a function of time, price or program rating histograms, or other useful feedback. This historical feedback can be on a per profile basis or as a profile summary for the CPE 110.

Figure 10:
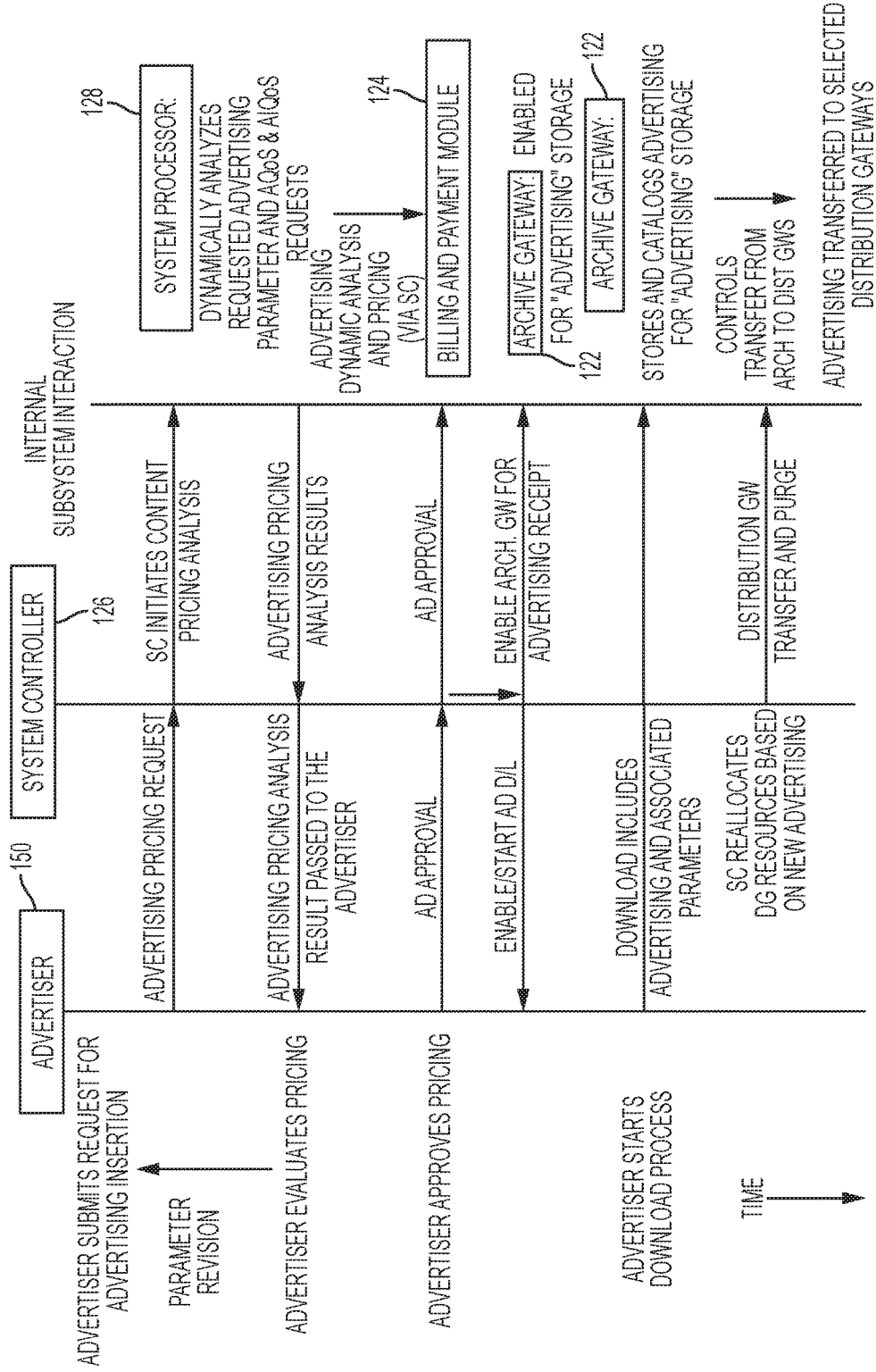
FIG. 10 illustrates example interaction between an advertiser and the system controller, and between the system controller and internal subsystems of a system and services gateway, in accordance with one or more possible embodiments.

FIG. 10 illustrates example interaction between the advertiser 150 and the system controller 126, and between the system controller 126 and internal subsystems of the system and services gateway 120, in accordance with one or more possible embodiments.

The advertiser 150 can transmit an advertising pricing request to the system controller 126. In response to such a request, the system controller 126 can pass such information to the system processor 128 to initiate an advertising pricing analysis. The system processor 128 can analyze requested advertising parameter(s), AQoS request, and AIQoS. The system processor 128 can transmit advertising pricing analysis results to the system controller 126. The system controller 126 can transmit the advertising pricing analysis results to the advertiser 150. The advertiser 150 can approve pricing for advertising by transmitting approval to the system controller 126. The system controller 126 can transmit such an approval to the billing and payment module 124.

The system controller 126 can transmit a request to the advertiser 150 to enable/start an advertising download. The system controller 126 can enable the archive gateway 122 to receive the advertising for storage. The advertiser 150 can transmit the advertising and associated parameters to the archive gateway 122 via the system controller 126. The system controller 126 can reallocate distribution gateway 130 resources based on new advertising. The system controller 126 can transfer the advertising from the archive gateway 122 to selected distribution gateway(s) 210 and send instructions to the distribution gateway(s) 210 to purge any advertisements that are no longer being used by the advertisers 150.

Figure 11:
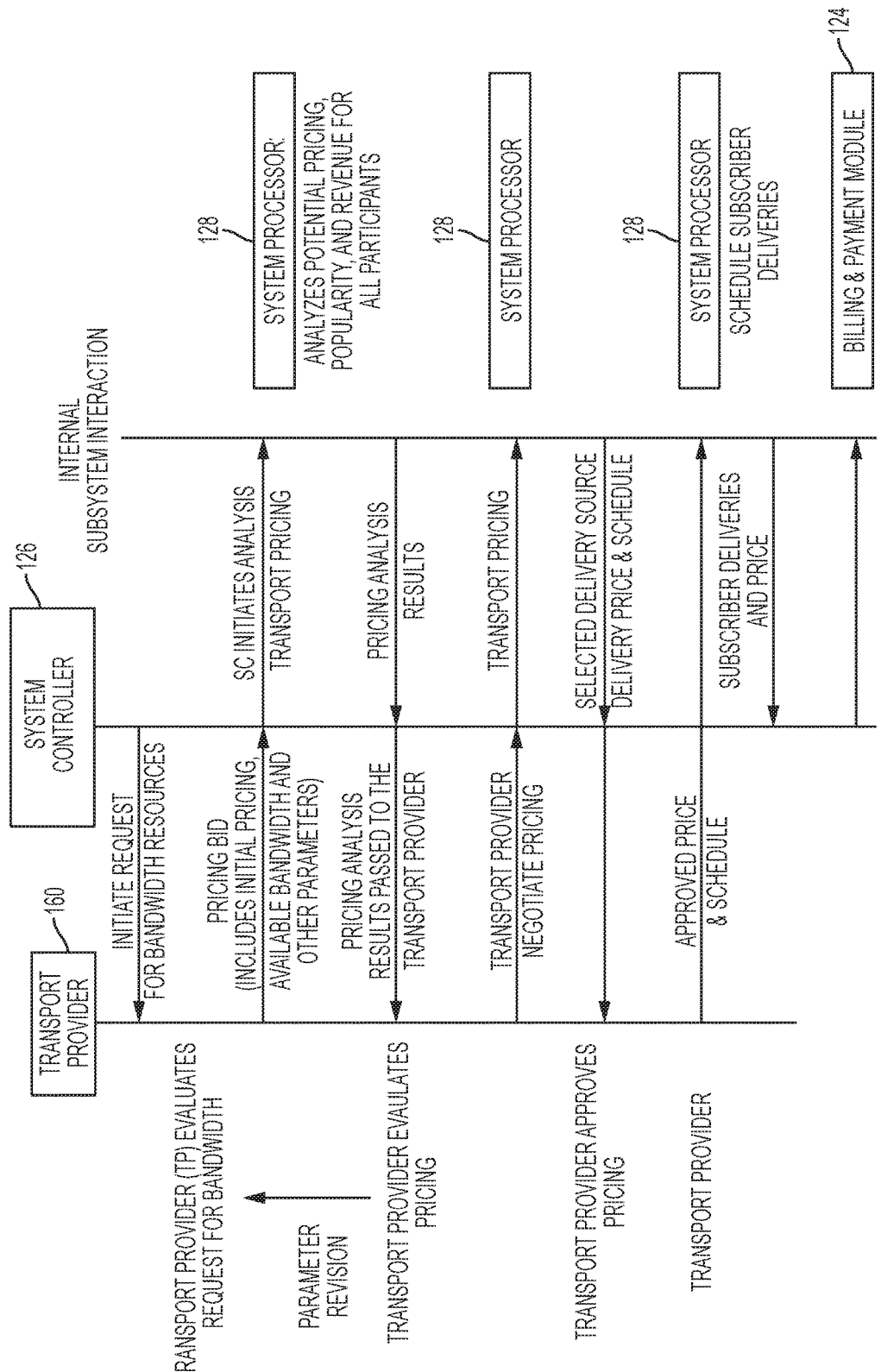
FIG. 11 illustrates an example interaction between a transport provider and the system controller, and between the system controller and internal subsystems of the system and services gateway, in accordance with one or more possible embodiments.

FIG. 11 illustrates an example interaction between the transport provider 160 and the system controller 126, and between the system controller 126 and internal subsystems of the system and services gateway 120, in accordance with one or more possible embodiments.

The transport provider 160 can receive a request for bandwidth resources from the system controller 126. The transport provider 160 can evaluate the request for bandwidth and respond with a pricing bid to the system controller 126. The pricing bid can include initial pricing of the bandwidth requested, available bandwidth, and any other parameters required to satisfy the request for bandwidth resources. The system controller 126 can initiate an analysis of delivery pricing by transmitting the delivery pricing bid to the system processor 128. The system processor 128 can analyze potential pricing, popularity, and revenue for all participants, content providers, transport providers, and advertisers, individually and jointly. The system processor 128 can send results of the delivery pricing analysis to the system controller 126.

The system controller 126 can transmit the pricing analysis results to the transport provider 160. The transport provider 160 can evaluate the electronic delivery pricing analysis and respond to the system controller 126 with negotiated transport pricing. The system controller 126 can pass the negotiated delivery pricing to the system processor 128. The system processor 128 can select a transport provider 160, a delivery price, and a delivery schedule. The system processor 128 can pass the transport provider 160, the delivery price, and the delivery schedule to the system controller 126 which transmits such information to a particular transport provider 160. The particular transport provider 160 can respond to such information by transmitting, to the system processor 128 via the system controller 126, an approval of the delivery price and the delivery schedule. The system processor 128 can schedule multimedia content delivery and pass the scheduled multimedia content delivery to the system controller 126. The system controller 126 can pass the ultimate delivery pricing to the billing and payment module 124.

Figure 12:
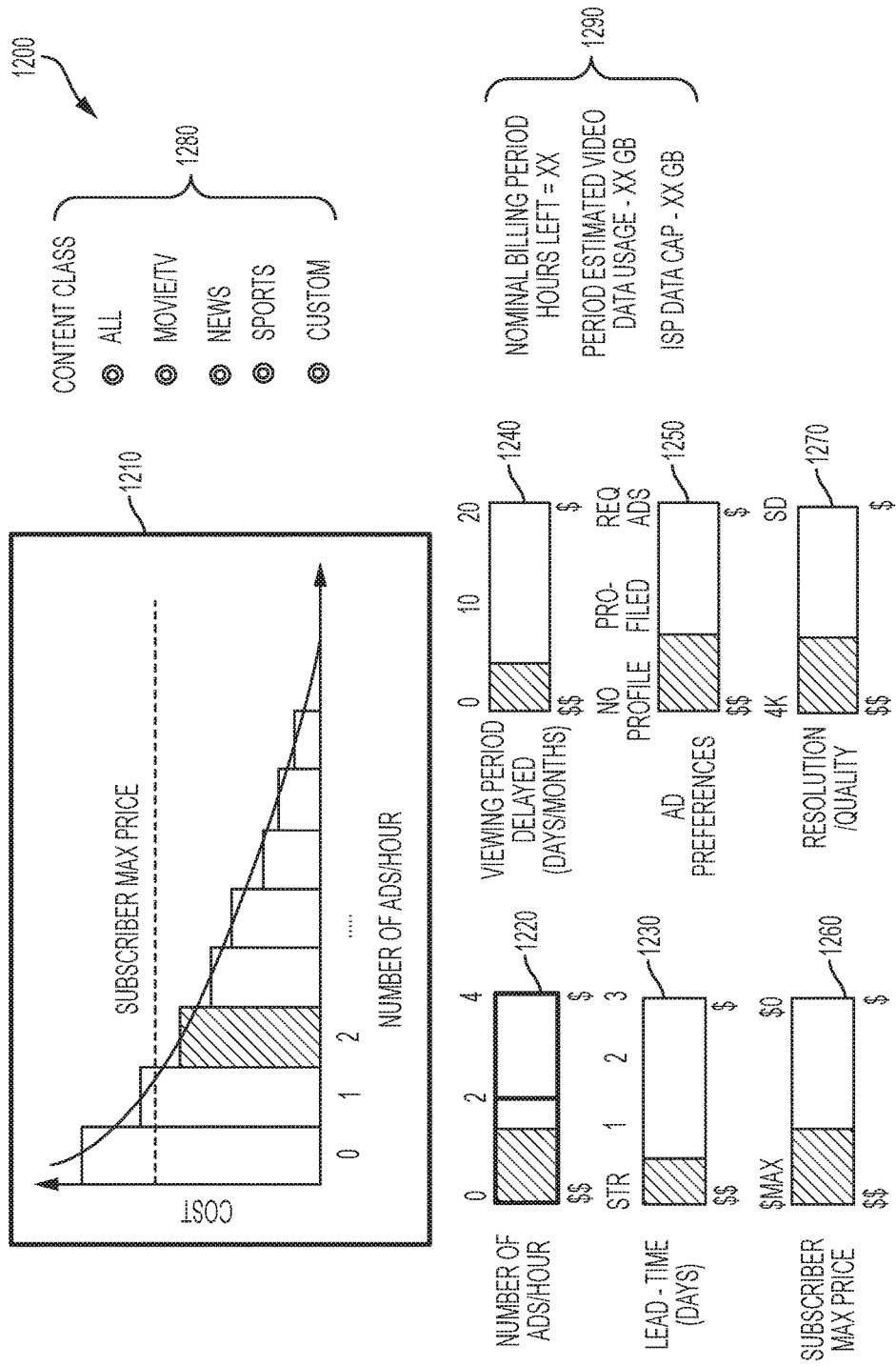
FIG. 12 illustrates an example subscriber web interface displaying preference/cost impact, in accordance with one or more possible embodiments.

FIG. 12 illustrates an example subscriber web interface 1200 displaying preference/price impact, in accordance with one or more possible embodiments.

The subscriber web interface 1200 can display monthly billing cost as a function of a number of ads per hour, lead-time, content viewing delay, and advertisement preferences. Each variable can be independently displayed showing the cost/price impact of the preference selection by the subscriber 105. Preferences can be set for all content, desired groupings of multimedia content, particular multimedia content for the subscriber 105 account, or can be further subdivided by individual profile. The subscriber 105 can also adjust price as an independent variable. The subscriber web interface 1200 can include an advertisement subsidy box 1210, an advertisement slide control 1220, a lead-time slide control 1230, a delayed viewing period since release slide control 1240, an advertisement preferences slide control 1250, a subscriber maximum cost slide control 1260, and a resolution and/or quality slide control 1270. The subscriber 105 can change any of the slide controls 1220, 1230, 1240, 1250, 1260, and 1270 and view a price result of such changes.

The subscriber web interface 1200 can further include subscriber selectable groupings. For example, the content class buttons 1280 can allow a subscriber 105 to set the groupings of multimedia content. The groupings can include classes of what particular multimedia content the subscriber 105 would make selections from. System defined content classes (for example, a default content class) can include selections for all, movie/TV, news, sports, and custom. As an example, subscriber 105 defined content class could include Movie/TV which would override the All Class setting for Movie/TV content. In addition, an individual multimedia content class would set a custom setting for a particular TV series which would override the Movie/TV settings for that particular series. The subscriber 105 web interface 1200 can further include account information 1290 for the subscriber 105, such as nominal billing period hours left information, period estimated data usage information, and ISP data cap information.

The advertisement subsidy box 1210 can display, for the subscriber 105, a maximum cost/price set by the subscriber 105. The advertisement subsidy box 1210 can display a cost/price for particular multimedia content as a function of a number of advertisements that the subscriber 105 accepts to be viewed while watching the multimedia content. The advertisement slide control 1220 can allow the subscriber 105 to set a number of advertisements to be viewed within a given period of time (for example, per hour). Changes made to the advertisement slide control 1220 can be viewed in the advertisement subsidy box 1210.

The lead-time slide control 1230 can allow the subscriber 105 to control a maximum amount of delay (lead-time) before multimedia content is to be sent to the CPE 110. The delayed viewing period since release slide control 1240 can allow the subscriber 105 to control a number of days/months until the CPE 110 allows the subscriber 105 to view particular multimedia content. Advertisement preferences slide control 1250 can allow the subscriber 105 to control a number of advertisements that are inserted into the multimedia content and presented to the subscriber 1250 when viewing particular multimedia content. The subscriber max cost slide control 1260 can allow the subscriber 105 to adjust a maximum cost that the subscriber 105 will accept for a given billing period. The subscriber web interface 1200 can include the resolution and/or quality slide control 1270 to allow the subscriber 105 to select a resolution and/or quality for particular multimedia content. The lead-time slide control 1230 is illustrated as allowing a subscriber 105 to set the lead-time as an exemplary maximum of 3 days. However, the maximum lead-time that the lead-time slide control 1230 can allow the subscriber 105 to set can be any number of days that provides adequate flexibility to the subscriber 105. For example, the lead-time slide control 1230 can allow the subscriber 105 to set the lead-time to a week, two-weeks, a month, quarterly for a year, and/or any other period of time that can optimize the delivery price of the multimedia content for the subscriber 105. The subscriber 105 can also manually adjust their control parameters, including cost, for specific subscriber 105 or system defined classes of content for their viewing experience. These classes can be defined for individual pieces of multimedia content, a content series, or selected subset of content that can include, as examples, books and other printed media, newer television, older television, live sports, movies, etc. and/or can provide further refinements of class such as movie, action, etc. In an example embodiment, the multimedia content includes advertising content, with the system processor 128 determining recommendations for the advertising content.

TABLE 8

Transport Parameters

Unique Transport Identification(or transport identifications, if more than one)
Methods of Transport (Cable, Satellite, Cellular, Wireless, DSL, Hybrid*, etc.)
Excess Capacity as a Function of Time (Hour, Day, Week, Year)
Cost as a Function of Time (Hour, Day, Week, Year)
Subscriber Data Caps
Transport Data Rates
Network Reliability
ISP (or ISPs, if more than one)
Service Area
Dynamic/Static IP
Optional QoS
Unique Subscriber Identifier
Block of IP Addresses TABLE 8-continued Transport Parameters List of Subscribers using this delivery method
Multicast groupings
Clear or Encrypted
External Timing Reference Source
Time Zone
Capacity for Streaming
Cost to Maintain Equipment in Central Office (or equivalent)
Cellular Number (If applicable) or Transport Provider Account No.
Derived representation generated from the elements above**

A hybrid transport can include a combination of two more transport providers 160 that complement each other. As an example, a hybrid of a combination of a satellite provider and a cellular provider. A hybrid transport when used with intelligent aggregation (defined below), multicast capable transport systems, pushed requested multimedia content, and/or pushed recommended multimedia content (defined below) can increase the total number of subscribers 105 that can be serviced and/or increase the responsiveness of the multimedia system 101 to the subscriber 105, i.e., decrease a maximum lead-time required to receive new multimedia content.

Figure 13:
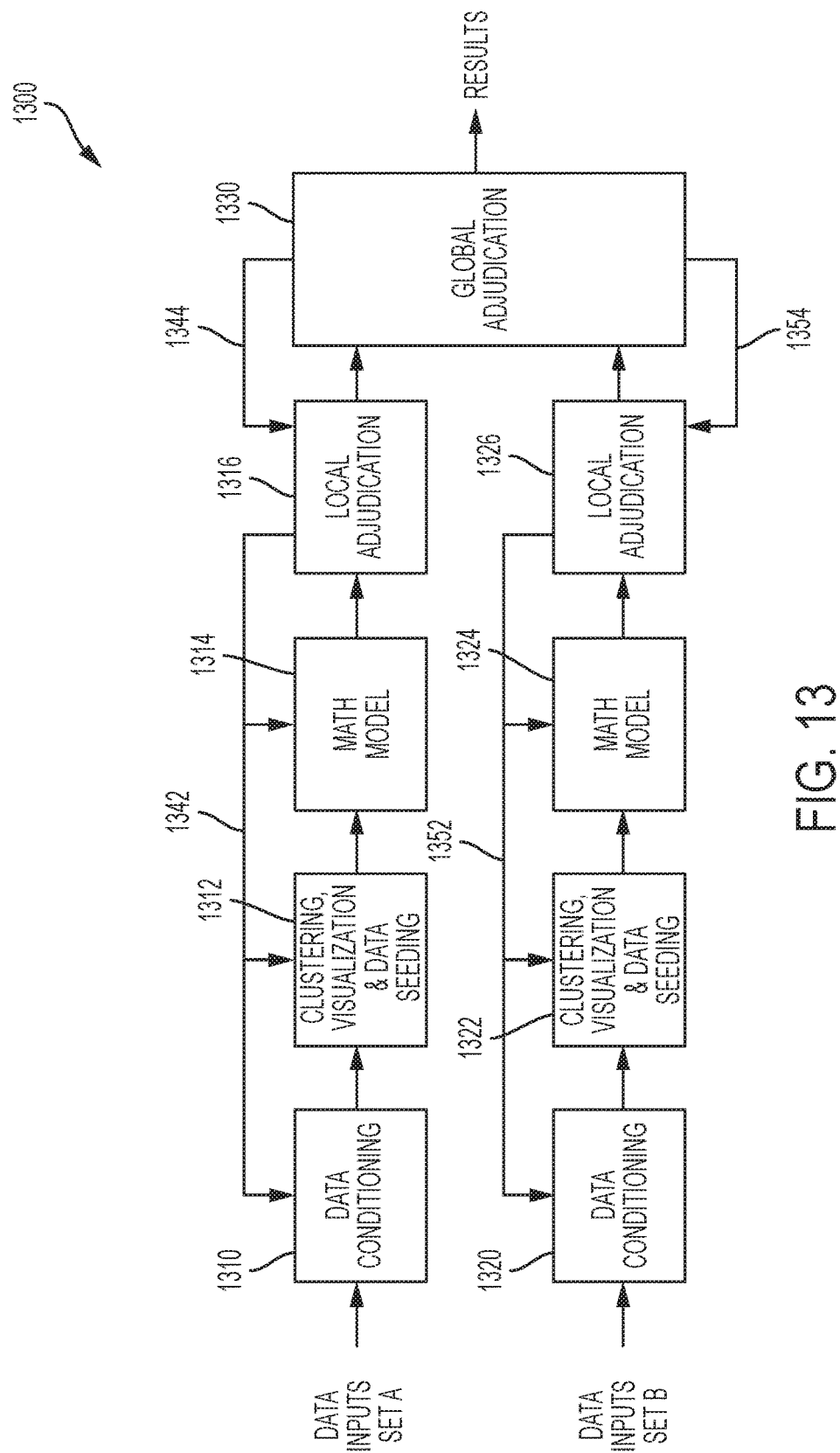
FIG. 13 illustrates an example advanced analytics method, in accordance with one or more possible embodiments.

FIG. 13 illustrates an example advanced analytics method 1300, in accordance with one or more possible embodiments. The advanced analytics method 1300 can include data conditioning modules 1310 and 1320, clustering, visualization & data seeding modules 1312 and 1322, math model modules 1314 and 1324, local adjudication modules 1316 and 1326, and global adjudication module 1330.

The data conditioning modules 1310 and 1320 can accept analytics inputs data sets A and B, respectively where data sets A and B can share the same data. The data conditioning modules 1310 and 1320 can perform data conditioning on the analytics inputs data sets A and B, respectively, and output conditioned data to clustering, visualization & data seeding modules 1312 and 1322. The clustering, visualization & data seeding modules 1312 and 1322 can perform clustering, visualization & data seeding to the data received from the data conditioning modules 1310 and 1320, respectively, and output processed data to the math model modules 1314 and 1324, respectively. The math model modules 1314 and 1324 can perform predictive analysis on the data received from the clustering, visualization & data seeding modules 1312 and 1322. The math module modules 1314 and 1324 can adaptively control the formation of linear and nonlinear clustering performed by the clustering, visualization & data seeding modules 1312 and 1322. The math model modules 1314 and 1324 can output processed data to the local adjudication modules 1316 and 1326, respectively. The local adjudication modules 1316 and 1326 can output locally adjudicated data to the global adjudication module 1330. In an example, the nonlinear clustering can include Nonlinear Manifold (NLM) clustering which is a subset of nonlinear clustering.

The local adjudication modules 1316 and 1326 can also perform a feedback functions in which results are fed back to previous modules within the advanced analytics method 1300. The local adjudication modules 1316 and 1326 can feedback data to the data conditioning modules 1310 and 1320, the clustering, visualization & data seeding modules 1312 and 1322, the math model modules 1314 and 1324, respectively. The local adjudication modules 1316 and 1326 can automatically control cluster formation of the NLM. The global adjudication module 1330 can also perform a feedback function in which results are fed back to the previous local adjudication modules 1316 and 1326.

The system processor 128 can accept as input data from one or more databases detailing information associated with subscribers 105, multimedia content, and customer premises equipment 110. The data can include, but is not limited to customer premises equipment 110 profiles, multimedia content metadata, subscriber 105 account profiles, subscriber 105 preferences, subscriber's 105 viewing history, subscriber's 105 CPE 110 interaction history, content provider's 140 request & parameters, advertiser's 150 requests and parameters, as well as demographics of interest (DOIs), and transport providers 160 parameters that can include a link to specific subscribers 105. In at least one embodiment, the input data can include text data that has been speech-to-text converted from an audio source that includes, for example, the multimedia content dialog, TV reviews, YouTube reviews, video blog reviews, audio blog reviews, Internet radio reviews, etc. In addition, the audio portion of the multimedia content can be analyzed for descriptive interpretation and used in the processing, for example, explosions, car crashes, gunshots, specific types of dialog or interactions, etc. All input data can be received from the system controller 126. The system processor 128 can output results to the system controller 126. The system processor 128 can be coupled to the system processor control, status, and data bus 1430 which allows the system processor 128 to communicate with system processor storage 1440 and the system controller 126 via the control, status and data bus 129.

The system processor 128 can uncover powerful, multi-factor, connections among disparate datasets to support analysis, prediction and decisions. This methodology can also discern critical patterns and relationships within multiple disparate datasets. The system processor 128 can use an ensemble of techniques which work together synergistically. The system processor 128 can use all available data and data subsets for pricing of subscriber 105 multimedia content, including the prices of content providers 140 and transport providers 160, and pricing of advertiser 150 subsidy. The system processor 128 can perform content recommendations for subscribers 105, either advertisements or multimedia content. These operations can be performed independently or conjunction with one another in one or more components of the system processor 128.

The system processor 128 can use advanced analytics and predictive analysis. Advanced analytics is the grouping and synergistic use of techniques to improve domain understanding and predict future outcomes. These techniques can be categorized into four primary groups: data conditioning, clustering and visualization, mathematical modeling, and adjudication. In accordance with one or more example embodiments, these techniques can be applied to the pricing of multimedia content, pricing of advertising subsidy, and pricing transport of multimedia content presented to the subscriber 105 and for content recommendation. The advanced analytics performed by the system processor 128 includes improvements to existing techniques and algorithms.

The processing flow, shown in FIG. 13, can be performed and controlled by the system processor 128. The individual elements of the system processor 128 can be partitioned between and operate simultaneously in, one or more of the following environments: local computing, mobile computing, distributed computing, cloud-computing, Field Programmable Gate Arrays (FPGA), Application Specific Integrated Circuits (ASIC), quantum computing, as a software program or "app", or another other environment that allows for simultaneous operation of individual elements of the system processor 128. For example, the system processor 128 and/or the system controller 126 can operate as an "app" on a tablet or smart phone. The architecture of the system processor 128 can allow a tightly coupled, synergistic application of all processes and the interfaces between the processes performed in system processor 128 array. The use of this tight coupling of processes together with both local and global adjudication processes performed by the local adjudication modules 1316 and 1326, and global adjudication module 1330, respectively, provide several advantages. This coupling can produce a tractable representation to support analysis that makes the best use and optimization of all data. The approach uses a collection of methods that are optimized for detection, characterization, and exploitation of patterns in data.

The implementation and architecture of the system processor 128 is easily extensible and highly scalable through parallelization and can allow all customer proprietary data/information to be segregated from other competitor data/information within the system processor 128. The customer proprietary data/information can be purged after processing by the system processor 128 without affecting any other data and/or information. Data seeding can be performed during the clustering process performed by the clustering, visualization & data seeding modules 1312 and 1322. Data seeding forces the multi-dimensional-clustering around designated regions (for example, advertisers' demographics of interest). Data entering the system processor 128 can be conditioned in the data conditioning modules 1310 and 1320, shown in FIG. 13. This conditioning is beneficial to performance and subsequent operation of the system processor 128. Since not all data can be in a numeric format, any alphanumeric or other input data types can be re-encoded into a numeric representation. Other processes that can be performed during data conditioning include, but are not limited to, data consistency or conformance, data alignment, and any corrections, modifications, repairs or replacements of data, including missing or out-of-bounds data. Also, the data conditioning modules 1310 and 1320, can perform dimensionality reduction without destroying any information contained in the data.

The conditioning performed by the system processor 128 and applied to the input data can include, but is not limited to techniques from statistics, information theory, and pattern recognition, as well as other approaches for filtering imperfect data. The conditioning is extensible and highly scalable within the system processor 128. The conditioning can be implemented in a highly parallel array architecture, such that any and/or all of these conditioning techniques may be performed automatically and simultaneously in parallel on any individual data set, any group of selected data sets and all data sets in any combination. The result of data conditioning flows into both clustering, visualization & data seeding modules 1312 and 1322 and the local adjudication modules 1316 and 1326. The global adjudicator 1330 can feedback into the local adjudication modules 1316 and 1326. The combination of local adjudication 1316 and 1326 addressing the branches and operating in conjunction or separately with the global adjudication 1330 is referred to the Adjudication Process throughout this document.

Based on the input data, the data conditioning performed by the data conditioning modules 1310 and 1320 can be selected and controlled by the adjudication modules 1316, 1326, and 1330. This interaction, feedback and control among modules performed with the system processor 128 are an important implementation of the advanced analytics method 1300. The interfaces between these hardware and/or software modules and the data flow among them are critical to the successful operation of the system processor 128.

After the conditioning performed by the data conditioning modules 1310 and 1320, data flows into clustering process performed by the clustering, visualization & data seeding modules 1312 and 1322. Although other public domain clustering methods can be used, this disclosure addresses the application of linear, nonlinear, and/or nonlinear manifold clustering with the potential to use other methods including nearest neighbor, K-means, and fuzzy clustering for the advanced analytics method 1300. The linear, nonlinear, and/or nonlinear manifold (NLM) clustering can be used to discover and/or recommend multimedia content and advertising content for subscribers 105. The linear, nonlinear, and/or NLM clustering can be data driven. The NLM clustering can improve the probability of detection of the similarities and differences within a given data set while reducing the probability of false alarm by locally linearizing high-dimensional spaces that are connected via a nonlinear manifold. That is, NLM clustering allows for a reduction of a highly nonlinear problem to a set of linear decision regions. The clustering, visualization & data seeding modules 1312 and 1322 can utilize Graphic Processing Units (GPUs) which can be optimized to perform linear, nonlinear, and/or nonlinear manifold clustering.

The advanced analytics method 1300 can use a recursive formulation of the linear, nonlinear, and/or NLM clustering where the conditioned data together with control and information feedback from the mathematical model performed by the math model modules 1314 and 1324 and the adjudication process performed by the local adjudication modules 1316 and 1326 automatically controls the linear, nonlinear, and/or NLM's cluster formation. This feedback from each of these processes can be dependent on the output of the linear, nonlinear, and/or NLM clustering and the selection and application of error minimization and cluster assignment techniques. These techniques will simultaneously and automatically minimize errors while maximizing the detection process within the sub-process and cluster assignment. Thus, the best processing methods are selected and applied automatically to the data and problems of pricing of multimedia content, advertising, delivery, and multimedia content recommendation. The mathematical models performed by the math model modules 1314 and 1324 can be tightly coupled to the adjudication process performed by the local adjudication modules 1316 and 1326, to prune the branches of the linear, nonlinear, and/or NLM clustering. The pruning can be accomplished through feedback and control from the mathematical model performed by the math model modules 1314 and 1324. Results can be selected by the adjudication process performed by the local adjudication modules 1316 and 1326 and the global adjudication module 1330 via the local adjudication modules 1316 and 1326, and flow into the linear, nonlinear, and/or NLM clustering performed by the clustering, visualization & data seeding modules 1312 and 1322 and the data conditioning performed by the data conditioning modules 1310 and 1320. This innovative and synergistic approach allows the linear, nonlinear, and/or NLM clustering to focus on high-payoff regions and adaptively and automatically dedicate processing resources to the most important regions of the high-dimensional linear, nonlinear, and/or NLM clusters.

Providing data conditioning, in general, and feature extraction, in particular, can limit the dimensionality required of the linear, nonlinear, and/or NLM clusters. This technique improves the speed of performance of the linear, nonlinear, and/or NLM clustering. For example, data conditioning can include TF.IDF. Such TF.IDF can be used for dimensionality reduction prior to clustering. TF.IDF is subsequently discussed herein. Dimensionality reduction can improve the speed of performance of the linear, nonlinear, and/or NLM clustering. This performance improvement is accomplished by the application of control and information feedback techniques discussed previously. The system processor 128 can provide for incremental learning as the math model performed by the math model modules 1314 and 1324 and the adjudication process performed by the local adjudication modules 1316 and 1326 and the global adjudication module 1330 observe the linear, nonlinear, and/or NLM cluster development.

The system processor 128 executing the advanced analytics method 1300 can monitor the linear, nonlinear, and/or NLM clustering development as additional data sources and data types are added to and pruned from the inputs to the linear, nonlinear, and/or NLM clustering processes. Data seeding (together with multiple math models performed by the math model modules 1314 and 1324 and the adjudication process performed by the local adjudication modules 1316 and 1326 and global adjudication module 1330 allow the application of pricing to a highly dependent system, as well as multimedia content recommendation. The math model performed by the math model modules 1314 and 1324 and the adjudication process performed by the local adjudication modules 1316 and 1326 and global adjudication module 1330 with the linear, nonlinear, and/or NLM clustering to further prune the linear, nonlinear, and/or NLM clustering that can lead to nonproductive regions of multi-dimensional spaces. A highly extensible and highly scalable implementation of the linear, nonlinear, and/or NLM clustering can be implemented in a highly parallel, array architecture of the system processor 128. And through the use of a tightly coupled data conditioning, mathematical modeling performed by the math model modules 1314 and 1324 and adjudication process performed by the local adjudication modules 1316 and 1326 and global adjudication module 1330 can eliminate nonproductive regions of the multidimensional linear, nonlinear, and/or NLM clustering using the control and feedback techniques discussed previously. Using a visualization process performed by the visualization & data seeding modules 1312 and 1322 can allow for a domain expert to view the results of the linear, nonlinear, and/or NLM cluster's development in real-time or near real-time, allowing the domain expert to make adjustments or tuning the cluster formation process (for example, domain information, as data) to test certain hypotheses. Forced seeding forces the multi-dimensional-clustering around designated regions (for example, particular advertisers' demographics of interest or subscriber's multimedia content of interest). Also, the advanced analytics method 1300 disclosed uses data seeding within the clustering process performed by clustering, visualization & data seeding modules 1312 and 1322 to map other data onto generated clusters. Examples of other data include demographic information from advertisers and information from other databases for use in advertising pricing, content pricing and recommendation, (for example, International Movie Database (IDBM), Rotten Tomatoes, social media, content reviews, Library of Congress meta data and curations).

A metric is defined by a distance between each pair of elements of all elements in the set. All subscribers 105, advertisers/advertising and/or all multimedia content can be clustered using linear, nonlinear, and/or nonlinear manifold techniques. The metric can be applied to determine all multidimensional vectors distance measurements, including linear distances, nonlinear distances, and/or distances on the nonlinear manifold. The metric can be formed between each of the following entities or groups of entities: subscribers 105, advertisers/advertising, multimedia content and/or subsets/supersets thereof. Some examples of metrics are a norm of a vector difference and a norm of a weighted vector difference. For example, the distance between subscribers 105, between multimedia content and between subscriber 105 and multimedia content can be expressed as a norm of (subscriber 1, subscriber 2), a norm of (multimedia content 1, multimedia content 2), and a norm of (subscriber1, multimedia content 2), respectively. If required, the math model modules 1314 and 1324 can calculate all angles between multidimensional vectors between all entities or groups of entities.

Individual dimensions within resultant linear, nonlinear, and/or NLM clusters can be weighted to accentuate or diminish the importance of selected features. In addition, inter-cluster or inter-element vector distances can be weighted to accentuate or diminish the relative sameness or difference of the clusters or elements. Furthermore, the NLM clustering process disclosed herein can increase the effective data signal-to-noise-ratio (DSNR) to improve detection of weak correlations between subscribers 105 and multimedia content whose aggregate of subscribers 105 and multimedia content may be important to the process of determining the recommended content. The advanced analytics method 1300 can apply error minimization and linear, nonlinear, and/or NLM cluster assignment techniques to achieve noise reduction. More specifically, these techniques will simultaneously and automatically minimize errors while maximizing the detection process within the subprocess and cluster assignment.

The mathematical model performed by the math model modules 1314 and 1324 can use multiple models to focus on the high pay-off regions within the linear, nonlinear, and/or nonlinear manifold clustering processes. Output from each math model can be input into the adjudication process performed by the local adjudication modules 1316 and 1326 and the global adjudication module 1330 and selected output can be used for content pricing and recommendation. The advanced analytics method 1300 can use multiple models, statistical models and deterministic models. Math models performed by the math model modules 1314 and 1324 can operate simultaneously and in parallel on the same data. All implementations of the math models are modular. These models can be applied to one or more of the embodiments disclosed.

Associated with each statistical model is a confidence region or confidence interval. The adjudication process performed by the local adjudication modules 1316 and 1326 and the global adjudication module 1330 can use the confidence interval is a function of the average distance and variance of distance between linear and nonlinear clusters, and along the nonlinear manifold between two entities (these entities can be either points on the nonlinear manifold or clusters of points on the nonlinear manifold) to automatically select the most important regions of a cluster, and the sensitivity of each process or region to parameter variation. The confidence interval and sensitivity can be used in the pricing of multimedia content, advertising, and delivery, and content recommendation.

The adjudication process performed by the local adjudication modules 1316 and 1326 and the global adjudication module 1330 can use confidence regions to construct a sensitivity matrix. This sensitivity matrix can be used to model the sensitivity of quantities to variations in parameters. Many math modeling paradigms are available for use with the disclosed embodiments. There can be no formal method for selecting the modeling methods used for the construction of a math model performed by math model modules 1314 and 1324. The architecture of the system processor 128 can allow for many methods to be made interoperable, so that the strengths of one cover the weaknesses of another. The problem is then intelligently segmented into regions, and an optimized model against is fielded for each region. These multiple engines feed their decisions to the global adjudication module 1330, which renders the final model prediction based upon the "advice" of all those modules that precede it.

The ensemble modeling process disclosed herein can be automated such that math modeling applications having many separate internal models can be defined, implemented, and validated rapidly and in parallel to provide a "divide and conquer" approach to math modeling. The advanced analytics method 1300 disclosed herein uses both local adjudication and global adjudication performed by the local adjudication modules 1316 and 1326 and the global adjudication module 1330, respectively. The synergistic use of these adjudication processes allows a highly parallel architecture that allows multiple datasets and/or multiple groups of dataset to be processes simultaneously to achieve optimal results.

The advanced analytics method 1300 can use an adjudication process performed by the local adjudication modules 1316 and 1326 and the global adjudication module 1330 to automatically select the best results produced by modules that precede them. Such adjudication may be applied locally and/or globally. The adjudication process allows the objective application of mathematics and knowledge to render a summary assessment by fusing information from multiple inputs. In the later stages of data fusion processing, the prediction performed by math model modules 1314 and 1324 can merge the findings of several automated systems to produce a final result. If these recommendations are in complete agreement, adjudication is trivial. Otherwise, the adjudicator ingests recommendations, applies principled analytic techniques and knowledge, and produces a fused product that is generally "better" than any of the single inputs alone. Further, since the adjudication performed by the local adjudication modules 1316 and 1326 and the global adjudication module 1330 can have available all the facts from all the inputs, the system processor 128 is able to refine estimates of accuracy, and produce reports giving insight into the reasoning behind the system's final conclusions.

Besides mitigating the complexity of analysis and refining its results, the local adjudication modules 1316 and 1326, and global adjudication module 1330 can offer some other process benefits, such as for example automating time-consuming aspects of correlation, a combinatorial problem, consideration of complex interactions among data sources that may be difficult to perceive, being adaptive, providing decisions which are objective and repeatable: always "treating the same evidence in the same way", and being able to be copied and made available everywhere. In another embodiment, the local adjudication modules 1316 and 1326 and the global adjudication module 1330 use the linear, nonlinear, and/or NLM cluster formations in their processing.

The two branch architecture presented in FIG. 13 can include one or more local adjudication modules 1316 and 1326, one for each branch. The local adjudication module 1316 can control at least one of the previous processing modules and the input data to be processed via the feedback path 1342. Results of the feedback described herein can be calculated in the math model modules 1314 and 1324. The calculations that can be preformed in these math model modules 1314 and 1324 are disclosed as being used elsewhere in this application. Examples of these calculations include regression analysis, Kalman Filtering, Maximum Likelihood Estimation, all statistical calculations, all metric distance and all angle calculations, all vector and tensor operations and the pruning of nonproductive cluster branches, as well as, error analysis, confidence intervals and regions. These calculations can be used in a set of rules, as examples, to control the processing (feedback) for the data conditioning and dimensionality reduction techniques, add or subtract data input sets into the clustering algorithm, controlling decision thresholds, control the type of clustering, as described herein, the use of Euclidian, Riemann Manifold, other Nonlinear Manifold distances, the use of the measurement, e.g. vector and/or tensor technique, as disclosed herein. The operations performed by the data conditioning modules 1310 and 1320 are disclosed as being used elsewhere in this application. The operations performed in the clustering, visualization & seeding modules 1312 and 1322 are also disclosed as being used elsewhere in this application.

The process of local adjudication module 1316 and 1326 can select the best result, for example, the result with the lowest error, and can minimizing the error based upon the selected data processed by the data conditioning modules 1310 and 1320, clustering, visualization & data seeding modules 1312 and 1322, and math model modules 1314 and 1324. The process of global adjudication module 1330 can select the local adjudication module 1316 and 1326 result(s) to minimize the resultant error and can combine weighted individual local adjudication results to generate an overall minimum error result. The global adjudication module 1330 can direct different processing techniques in various regions of the multidimensional space.

Figure 14:
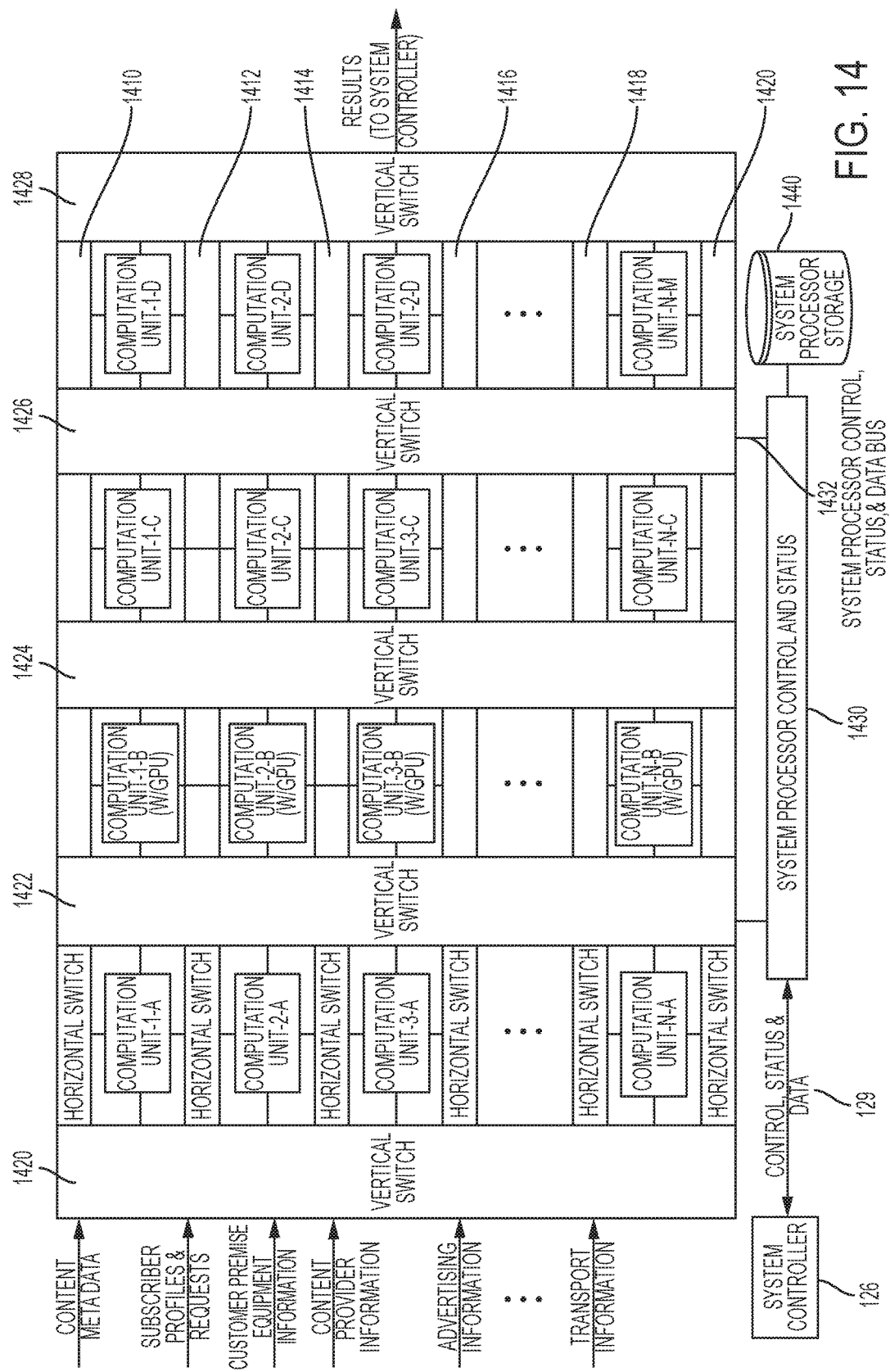
FIG. 14 illustrates an example system processor, in accordance with one or more possible embodiments.

FIG. 14 includes an example embodiment of a parallel multi branch architecture that includes vertical crossbar switches 1420, 1422, 1424, 1426, and 1428. These switches can be controlled via a set of rules from at least one or more local adjudication modules 1316 and 1326 and at least one or more global adjudication modules 1330 in the multi branch parallel architecture shown. In the two branch case shown in FIG. 13, the vertical crossbar switch is not shown for simplicity of description.

One or more branches of local adjudication modules 1316 and 1326 can be fed into the global adjudication module 1330. And, in an example at least one or more global adjudication modules 1330 can exist and connect to a super global adjudication module (not shown). This hierarchy of adjudication can be used with more complex problems and datasets.

The two branch parallel architecture shown in FIG. 13 also includes a global adjudication module 1330 connected to local adjudication modules 1316 and 1326 via bidirectional feedback control buses 1344 and 1354. The use of the combined and functions of the local adjudication modules 1316 and 1326 and the global adjudication module 1330 is disclosed as being used elsewhere in this application.

The adjudication performed by the local adjudication modules 1316 and 1326 and the global adjudication module 1330 can consist of multiple algorithms which are each automatically selected from a pool of analytic techniques for a given data source and/or problem space. This implementation is repeated within several processes in the system processor 128. An ensemble of analytical techniques can each be selected automatically for a given data source and/or problem space based on the weighted results of other processing elements within the system processor 128. This feedback is beneficial for the automated control of the system processor 128. And, the parallel implementation of the system processor 128 can allow all analytics to be performed simultaneously. The adjudication performed by the local adjudication modules 1316 and 1326 and the global adjudication module 1330 can allow the strengths of one component of the process to compensate for weaknesses of others. A result of such adjudication allows for best use of all available data/information. In addition, the adjudication performed by the local adjudication modules 1316 and 1326 and the global adjudication module 1330 can construct the optimum solution for a given problem and associated datasets.

The system processor 128 can use local adjudication and global adjudication performed by the local adjudication modules 1316 and 1326 and the global adjudication module 1330. The synergistic use of these adjudication processes can allow for a highly parallel architecture of the system processor 128 that allows multiple datasets and/or multiple groups of dataset to be processed simultaneously to achieve optimal results. The use of at least one of local and global adjudication performed by the local adjudication modules 1316 and 1326 and the global adjudication module 1330 to formulate an input dataset, discussed below in more detail, can ensure best use of all available data/information to optimize the recommendation of multimedia content determined by the system processor 128 based on data retrieved from at least one database, for example from Tables 1-8). FIG. 14 illustrates a general parallel implantation of the system processor 128. In another embodiment all calculation can be performed serially and interim calculation results can be stored in random accesses memory (RAM) and/or on disk for use in subsequent operations.

A subset of the advanced analytic tools of the advanced analytics method 1300 can be provided to advertisers 150, content providers 140, transport providers 160, and subscribers 105. Advertisers 150 can use these tools to better define their targeted demographic. Content providers 140 can use these tools to price their multimedia content, as well as price their multimedia content as a function of time. Transport providers 160 can use these tools to improve and maximize their return on network capital expenditures and more effectively use those existing network resources. Subscribers 105 can use these tools to improve multimedia content recommendation, cost effectiveness, and user experience.

The advanced analytics method 1300 performed by the system processor 128 can generate an array of N-dimensional visualization engines that allow domain experts to view, manipulate, and analyze sets of discrete data points in high dimensionality, simultaneously. These visualization engines can make use of one or more of color encoding, position encoding, cluster and neighborhood encoding, and time encoding using frame-by-frame capturing of information in a video format. Visualizing time and the clustering of disparate data in this way allows the viewing of the temporal formation, evolution and disintegration of data features. This information is useful for content and advertising focus groups, development of advertiser filters based on customer and subscriber 105 demographics and the impact of advertisements and their placement, and determining an impact of utilization and price for transport loading. Content providers 140, advertisers 150, and transport providers 160 can use the results of these types of data visualization to make costing/pricing decisions. On screen commands can allow selection of any number of sets or subsets of the data contained in Tables 1 through 8 by attributes, in various ways (Select Capability). A mouse can be used to select subsets of data right on the screen by enclosing them in a rectangle (Lasso Capability). Data subsets can be merged to create new subsets (Combine Capability); subsets can be disbanded (Clear Aggregates Capability). The domain expert can sub-sample the population (Sampling Capability) and mask out undesired data fields (Feature Projection Capability). These manipulations need only be done in early training and stored for future reference as domain expert preferences, after which the advanced analytics method 1300 can be automated based on the stored domain expert preferences. These training techniques can be a subset of machine learning. The system controller 126 can be used to retrieve the data any of Tables 1 through 8. Thereafter, the system processor 128 can use the retrieved data to formulate an input dataset as a basis for performing non-linear clustering.

The N-Dimensional visualization engine can compute descriptive statistics for the data, for example, minimum, maximum, range, standard deviation, mean, and/or histograms for population subsets designated by the domain expert. Automatic clustering (Autocluster Capability) may be selected to automatically group data into a domain expert-determined number of clusters based upon the relative distribution of data. The N-Dimensional visualization engine can be extensible by the addition of analytic tools such as a Feature Analyzer (Bayesian), Principal component Analysis (PCA) (Karhunen-Loeve), classifiers (Likelihood ratio, expert system, Radial Basis Function, Multi-Layer Perceptrons, rule inducers).

The system processor 128 training can use an adaptive, multi-mode, math model. Multiple views of the data space can enter a trainer, typically located in the local adjudicator 1316 and 1326, which can use an adaptive algorithm to infer modeling parameters. These constitute a collection of candidate solutions to the modeling problem which are assessed and calibrated to create a hybrid application for performing adjudication.

The system controller 126 can retrieve data from at least one database, including information associated with at least one of subscribers 105, multimedia content, advertising content, subscriber 105 interaction with the CPE 110, and/or subscriber 105 behavior. For example, the system controller 126 can retrieve data that includes any of the information from Tables 1-8. The system processor 128 can formulate a unified input dataset from the retrieved data. The data conditioning modules 1310 and 1320 can process, tag, and encode unstructured text prior to appending other data for input to the linear and/or nonlinear clustering performed by the clustering, visualization & data seeding modules 1312 and 1322. The clustering, visualization & data seeding modules 1312 and 1322 can perform linear and/or nonlinear clustering on this unified input dataset, as well as formulate a nonlinear manifold cluster. The clustering, visualization & data seeding modules 1312 and 1322 can form clusters of subscribers 105, multimedia content, advertising content, and subscriber 105 interactions with the CPE 110, or any combination thereof. The math model modules 1314 and 1324 can determine a linear metric or distance, a nonlinear metric or distance, and/or a metric or distance on the nonlinear manifold between elements of the unified dataset, which includes the subscribers 105, multimedia content, advertising content, and subscriber 105 interaction with CPE 110, or any combination thereof. A metric can also be measured for clusters of subscribers 105, multimedia content, advertising content, and subscriber 105 interactions with the CPE 110 and between clusters of subscribers 105, multimedia content, advertising content, and subscriber 105 interactions with the CPE 110, or any combination thereof.

The local adjudicators 1316 and 1326 can make decisions using the output of the linear, nonlinear metrics and/or nonlinear manifold and metric calculations for the purpose of determining recommendation of at least one of multimedia content, advertising content, multimedia content pricing, advertising content pricing/subsidy, multimedia and advertising content delivery and subscriber 105 viewing schedule, etc., for delivery to the CPE 110. The local adjudicators 1316 and 1326 can provide an optimized information framework within which can efficiently, and with high fidelity, use the linear, nonlinear, and nonlinear manifold clustering. This unified information framework can provide a rich and natural information landscape for making best use of input data that can be of high dimensionality, high volume, and/or disparate.

The adjudication process, performed by the local adjudication modules 1316 and 1326 and the global adjudication module 1330, can include supervised and unsupervised training and learning. This training and learning can further refine and optimize the disclosed recommendation, scheduling and delivery, and pricing.

For determination of a recommendation of multimedia content, the local adjudication modules 1316 and 1326 and the global adjudication module 1330 can use the cluster (linear, nonlinear, and nonlinear manifold) metrics to formulate a list of multimedia content (i.e., recommendations) likely to be of interest to the subscriber 105. These recommendations are numerically assessed specifically for each subscriber 105 and/or each cluster of subscribers 105, so that recommendations can be personalized based upon expressed interests provided through interaction of the subscriber 105 with the CPE 110 (such as genre, director, actors, etc.), as well as subscriber 105 viewing history, viewing history of subscribers 105 similar to a requesting subscriber 105 (i.e., collaborative filtering), and information products describing the multimedia content (e.g., online data bases, social media content, published reviews, curated lists by subscribers 105 and/or expert reviewers etc.). The global adjudication module 1330 can arbitrate between various content recommendations using multiple clustering methods and/or classifiers, a non exhaustive list can include linear classifier, nonlinear clustering, nonlinear manifold clustering, nearest neighbor classifier, fuzzy clustering, K-means clustering, K-profile clustering, neural networks and Nonlinear Dimension Reduction (NLDR) methods, etc. NLDR methods can be used in Riemannian manifold learning. In addition, the global adjudication module 1330 can arbitrate between various content recommendations using multiple semantic processing including distributional semantics, latent semantic indexing, text mining, statistical semantics, Principal Component Analysis, and Factor, histogram generation, and neural network processing, etc.

Among other operations, the system processor 128 (within the data conditioning modules 1310 and 1320) can unify multimedia content, subscribers 105, and advertising content by associating unstructured text information for each. By using a common term space for these entities, unification can produces a congruent representation for subscribers 105, multimedia content, and advertising content.

Multimedia content text features (i.e., metadata) associated with multimedia content can include those drawn from bulk text in online data bases, published reviews, wiki's, blogs, social media content, etc. Specific persons, such as directors, actors, producers, screenwriters, screenplays etc. also have a supporting textual corpus (body of work) consisting of published biographies, interviews, wiki's, blogs, tweets, social media, and/or any other supporting textual corpus sources as shown in the Tables 1 through 8. For subscribers 105, multimedia content listed in their preferences, viewing history, requested and recommended multimedia content not viewed (unwatched) history, recommended history watched, requested history watched, and the histories of subscribers 105 similar to them (collaborative filtering) can be used in their linear, nonlinear, and nonlinear manifold clustering unification. Information can be drawn from these sources to enrich the representation of persons (for example, directors, actors, screenwriters, producers/production companies and subscribers 105), content genre, favorite content (that is, often-watched, repeatedly-watched and/or periodically-watched) and disliked content, which can be retrieved from the CPE 110 of the subscriber 105 (that is, content watched and rejected, content available but never-watched, content partially-watched and never finished, content infrequently-watched, etc.) to form the input to the linear, nonlinear, and/or nonlinear manifold clusters. In the case of advertising, published advertising copy, product reviews, wiki's, blogs, and social media content can be unified in similar fashion, and can be included in the clustering input data sets.

The local adjudication modules 1316 and 1326 and the global adjudication module 1330 can perform adjudication by applying business rules, such as how many content recommendations to make to a CPE 110, the relative mix of multimedia content and advertising types to recommend, consideration of multimedia content already viewed by subscribers 105 (to avoid redundant recommendations), sorting and winnowing a list of recommendations of multimedia content for a CPE 110 based upon multimedia content and advertising metric scores and determination of which multimedia content and advertising content will be pushed to and stored on the CPE 110 without subscriber 105 intervention. In addition, the local adjudication modules 1316 and 1326 and the global adjudication module 1330 can establish and set thresholds for the display, scheduling, delivery, and cost determination of the recommendation of multimedia content to the subscriber 105 or groups of subscribers 105.

The data conditioning modules 1310 and 1320 can use semantic processing methods. One embodiment uses Term Frequency, Inverse Document Frequency (TF.IDF) methodology, and multiple pairwise Cosine Distances between documents to extract numerically encoded text features from bulk, unstructured text of the input dataset. Note, the Cosine Distance or Cosine similarity is a measure of similarity between two text feature vectors that measures the cosine of the angle between them. Using these methods, recommendations can be found within the context of any applicable documents.

TF.IDF is an information-theoretic metric that assigns numerical values to unstructured text. TF.IDF also can use a vector dot product (or cosine distance) on text feature vectors to measure the distance and relationship between the text feature vectors and can use the most salient text feature vectors (both weighted and un-weighted) to pre-process the unstructured text data used in the formation of the linear, nonlinear, and/or nonlinear manifold clustering. The data conditioning modules 1310 and 1320 can perform TF.IDF processing and pairwise cosine distance measurement prior to and independently of the process performed by the clustering, visualization & data seeding modules 1312 and 1322. Other semantic processing methods can also be employed. In one embodiment, semantic processing names are not used explicitly but rather semantic context can be used to implicitly define meaning.

A text feature vector can be a multidimensional vector of numeric features that represent a text element or group of text elements, for example, a collection of attributes and/or groups of attributes such as soccer moms, millennials, etc. For multimedia content, a text feature vector can include non-zero text elements comprised of, for example, genre, title, actors, director, producer/production company, synopsis, screenplay, language, etc. These text elements/attributes can be numerically encoded using the TF.IDF. Other techniques can also be used to numerically encode such text elements, such as distributional semantics, latent semantic indexing, text mining, statistical semantics, Principal Component Analysis, Factor, histogram generation, neural network processing, etc., when used in conjunction with nonlinear clustering techniques and in particular when used with linear, nonlinear, and/or nonlinear manifold clustering these techniques provide a powerful approach to content recommendation or discovery.

For example, the TF.IDF can define "Tom Cruise." TF.IDF can reduce the dimensionality of "Tom Cruise-ness" and not only includes Tom Cruise, but also can include actors, directors, and producers that are similar (that is, close) to or fit the profile of Tom Cruise. This similarity of profiles and/or attributes can be defined by biographies, reviews, film genre, directors, etc. Therefore, if a subscriber 105 has a high likelihood of enjoying a Tom Cruise movie, but has seen all Tom Cruise's multimedia content (as determined by the subscriber 105 history and masking previously viewed multimedia content, the system processor 128 can determine a recommendation of multimedia content for an alternative actor (that is, one which fits the Tom Cruise actor profile and/or attributes) the subscriber 105 may enjoy. An individual can be defined as one or more of an actor, director, producer, etc. For example, "Tom Cruise" can be considered as one or more of actor, director and producer, etc. each of which can be represented by a unique set of text feature vectors and/or attributes.

TF.IDF can represent common text elements/attributes of one or more of the subscribers 105, multimedia content, advertising content, and/or any subset or combination thereof as a unified dataset. Other information can be appended to the TF.IDF text feature vectors to form a feature vector. This appended information can include subscriber 105 information and/or attributes, and/or derived information and/or attributes (for example, representing viewing history, requested content, recommended content viewed or not viewed, subscriber 105 ZIP code, age, gender, representative group, etc.), information contained in Tables 1-8, and the subscriber 105 interaction with the CPE 110, prior to formation by the clustering, visualization & data seeding modules 1312 and 1322. This appended information can be conditioned using other methods and techniques previously discussed in this disclosure or can be used as is.

Alphanumerical tags can be associated with each feature vector and can provide a map to the original information content source. Linear clustering, nonlinear clustering, and manifold clustering process can be performed and tags can be used to access the original information associated with the tags. These tags can be numeric, alphabetic, and/or alphanumeric tags. These tags can preserve all information and sources during the linear, nonlinear, and/or nonlinear manifold cluster formation. Thus, the tags can allow the text feature vectors to be traced back to their original information source. The linear, nonlinear, and/or nonlinear manifold clustering process can be implemented to not affect the tags. The information source associated with the tags can be used to present recommended content to the subscriber 105 in the recommendation method disclosed herein.

In an example embodiment, the use of computational linguistics, that is, TF.IDF and clustering, linear, nonlinear, and/or nonlinear manifold, can be applied to querying the available multimedia content and/or advertising content databases by the subscriber 105. This querying can be performed using natural language. A query or group of queries can be treated as a document and processed using the TF.IDF and the linear, nonlinear, and/or nonlinear manifold clustering. The subscriber 105 can generate complex queries, which can be included with subscriber 105 information and subscriber 105 viewing histories, etc. These complex queries can be input by the subscriber 105 via voice or keyboard entry at the CPE 110. These subscriber 105 generated, complex queries can be augmented and enhanced by existing analysis performed on all documents, as well as queries performed by other subscribers 105. For example, if a subscriber 105 requests a particular actor and/or a particular film, the subscriber 105 can be provided with multiple actors and films, which satisfy (that is, are similar to) their original query. More complex queries can be constructed. For example, "show me all French language, Tom Cruise like films not seen before." The subscriber can be provided with a rank ordered list of French, Tom Cruise like films represented by a French equivalent genre, actor, director, etc. of Tom Cruise like films. Note, complex genres like action-adventure, with science fiction, and with light romance can be represented. Also, directors can be represented by their signature film characteristics and styles. For example, film attributes like violent and gory with light comedic overtones can produce a list of Tarantino style films directed by Tarantino-like directors (that can include Tarantino) in a requested language, etc. This information can be used by content providers to construct new multimedia content and minimize production costs. Using the concept of "nearness", or a small metric distance between vector elements (also referred to herein as affinity, similarity, and closeness), new screenplays can be identified, new actors can be identified, new directors can be identified, etc. These identified elements can be used to create new content (with more cost effective elements) which will be more likely accepted and enjoyed by subscribers 105. The concept of "distant" (also referred to herein as dissimilar, not like, and other antonyms of distant) can also be used to mean content not likely to be accepted and enjoyed by subscribers 105.

In addition, the subscriber 105 can provide their viewing mood via voice or keyboard to the CPE 110 and receive a ranked ordered list of recommendations. For example, "I'm in the mood for something light and/or funny." In addition, the subscriber mood can be discovered using biometric and physiological sensors contained in smart watches or clothing, as well as other sensors installed in a room or furniture, iris and facial feedback, and/or voice analysis.

The system processor 128 can process both complex and compound queries. In addition the system processor 128 can respond with both complex and compound recommendations based on subscriber 105 behavior (e.g., interaction with the CPE 110), profile, viewing history and/or the subscriber 105 cluster behavior (e.g., interaction with the CPE 110), profile, viewing history. The system processor 128 recommendations can work for any mode of multimedia delivery including lead-time delivery, streaming, streaming video on demand (SVoD), video on demand (VoD), etc.

Once the text feature vectors have been selected, extracted, encoded by the data conditioning module 1310 and 1320, they can be used for multiple purposes, such as construction of the linear, nonlinear, and/or nonlinear manifold clustering, determination of recommendations of multimedia content for subscribers 105, optimization of matching advertising content with subscribers 105 and multimedia content, and/or jointly clustering any subset and/or combination of subscriber 105, multimedia content, and advertising content.

A cosine distance, using the TF.IDF method, can be a measure, performed by the system processor 128, of similarity between documents and/or entities retrieved by the system controller 126. This metric can be treated as a measure of distance between the entities and/or documents being described. For example, if the filmography of two directors are "near" each other in terms of space defined by TF.IDF, the directors are more likely to be similar than dissimilar. This is useful when other information sources (e.g., a new subscriber's viewing history) are insufficient for producing a high fidelity match between a particular subscriber 105 and a first director, with the system processor 128 instead being able to produce a match between the particular subscriber 105 and the first and second directors.

The text sources for the input dataset can be, e.g., newspapers, magazines, social media, wiki's, blogs, multimedia content reviews, and/or any other text source that allows for formulation of the recommendation of multimedia content. For example, text feature and/or attribute information about any combination of multimedia content (for example, its genre, directors, producers, actors, plot summary, screenplay, etc.) can be extracted from review articles, news releases, online wiki's, social media (for example, fan blogs, tweets, Facebook posts), interview transcripts, and/or any other text source that allows for formulation of the recommendation of multimedia content. All of this information can be unified to create an enriched feature and/or attribute set for a determination of a recommendation of multimedia content and/or selection of advertising content, and a subset and/or combination thereof for a subscriber 105.

TF.IDF can be grammar and/or language agnostic, and can be applied to text in any language, without requiring that the text be translated. This is accomplished by adding the terms used for TF.IDF calculation of $D^2$ (i,j) below to include a section for terms in each language used. The construction of TF.IDF scores and structures, for example, $D^2$ (i,j), can be the same for all text in any written language, whether alphabetic (e.g., American English) or iconographic (e.g., Traditional Chinese). Even artificial term spaces, such as Chat Speak ("lol", etc.), Hash Tags (#prom), and Emoticons (e.g., smiley face) can be unified with the TF.IDF.

In an example embodiment, text descriptors, for example different actors' biographies, Descriptor i and Descriptor j can characterize some combination of information associated with subscribers 105 and multimedia content. Such descriptors can be used, for example, as a basis for a determination of a recommendation of multimedia content. In one embodiment, an affinity between Descriptor i and Descriptor j can include the set:

TF.IDF (i, k)=TF.IDF score of term k within Descriptor i
TF.IDF (j, k)=TF.IDF score of term k within Descriptor j
$\tau(i)$=average word count of the posts within Descriptor i
$\tau(j)$=average word count of the posts within Descriptor j υ(i)=average nuance of the terms within Descriptor i
υ(j)=average nuance of the terms within Descriptor j The affinity between Descriptor i and Descriptor j can be defined by the exemplary equation as follows:

$$D^2(i, j) = \left\{ \sum_{k=1}^{Terms} [TF \cdot IDF(i, k) - TF \cdot IDF(j, k)]^2 \right\} + \{\tau(i) - \tau(j)\}^2 + \{v(i) - v(j)\}^2$$

(Information Theoretic Term) + (Syntactic Term) + (Semantic Term)

with the affinity between two descriptors being represented by at least one of an Information-Theoretic term, a Syntactic term and a Semantic term (each term being added together, respectively) to form $D^2(i,j)$.

As discussed above, TF.IDF is an information-theoretic metric that assigns numerical values to unstructured text. That is, TF.IDF can transform a term space to an information space, and subsequently, from an information space to a text feature vector. Also, TF.IDF can use feature masking or weighting to either include a particular feature in the recommendation determination or eliminate a feature in the recommendation determination. Feature masking can be accomplished by weighting a feature vector. A weight of zero completely masks a feature and a weight of one includes the feature in the recommendation determination as performed by the linear, nonlinear, and/or nonlinear manifold cluster formation and subsequent metric determination. Note, weighting coefficients can include any value between and including zero and one, inclusive. In addition, seeding can be performed to promote cluster formation in certain locations within the multidimensional space. The seeding can be either weighted or unweighted. Similarly, masking can be used to filter elements from an existing cluster.

All weights can be varied (or tuned) for subscribers/content or clusters of subscribers/content to provide subscriber-centric recommendations for subscribers or clusters of subscribers. Multimedia content and advertising content can be considered "content" which all techniques discussed in this specification and can be applied to, both types of content, or subsets and/or combinations thereof.

Normally, raw text features (the components of vectors representing unprocessed text) are not inserted directly into the linear, nonlinear, and/or nonlinear manifold clusters, since the number of terms in the term space can be quite large (e.g., tens of thousands of components). Since the term space is expected to be quite large, loading all text components for a particular piece of multimedia content, and/or an individual subscriber 105, will produce a "raw" sparse vector (that is, most components equal to 0).

Overlapping text features vectors can be used when available (that is, text feature vectors with non-zero components) as a basis to perform a match. Non-overlapping text features vectors may be eliminated from use for matching. Text feature vectors can contain many dimensions. The adjudication module 1316 and 1326 can select the embedding space of the linear, nonlinear, and/or nonlinear manifold clustering and correspondingly the number of dimensions used and/or the dimensionality of the output. Additional decisions based on the linear, nonlinear, and/or nonlinear manifold cluster outputs and subsequent math modeling performed in the math model modules 1314 and 1324 illustrated in FIG. 13 can also be made in the adjudication modules 1316 and 1326.

To facilitate dimension reduction and feature synthesis, each raw sparse vector of terms can be segmented into syntactic blocks (groups of terms having similar form [e.g., tables] or type [e.g., different languages, emoji's, chat-speak]), and/or into semantic blocks: groups of terms having similar function or meaning [e.g., emotive terms, technical terms, etc.]. Each of the raw text vector segments can be synthesized/encoded into a relatively small number of numeric scores. A TF.IDF score for a term can be a numeric measure of how specific and sensitive that term will be as a keyword for documents on topics associated with the term. The embedded "period" in the name is a reminder that this is the product of TF and IDF. The synthesis into a relatively small number of numeric scores can be done in various ways, for example, using a combination of TF.IDF score and semantic synonym tables that can ensure that different representations of the same concept or qualifier are given the same value (e.g., look-ups for assigning numeric scores to specific terms, which are then combined or added numerically). The scores synthesized from the raw text vector segments can be fewer than the number of raw terms in the initial term space, providing complexity savings through dimensionality reduction. These scores can be appended to subscriber 105 profiles, viewing histories including subscriber 105-CPE 110 interactions and subscriber 105 request variables of genre, director, actor, screenwriter, screenplay, synopsis, etc. already collected. The lower dimensional vector of synthesized text features can be used in the formation of the linear clustering, nonlinear clustering and/or nonlinear manifold clustering.

TF.IDF can be pre-computed for every term in a document (for example content review, actor's biography, screenplay, genre, etc.) by counting terms and performing brief calculations. These calculations can include computing TF.IDF scores for keywords occurring in a document and/or histograms of keywords or terms contained in a document, and then determining log-normalized ratios for computing the TF.IDF score. This can be done efficiently and quickly even for large, dynamic collections of documents. When documents are added or removed from the collection, updating the term scores can be accomplished by adjusting the frequencies for the affected terms. Because TF.IDF computation is carried out as part of document representation for the linear, nonlinear, and/or nonlinear manifold cluster construction process, content and advertising matching can be performed without the CPE 110 having to provide "weights", "thresholds", or name specific titles. Matching can be performed using keywords from subscriber 105 queries, subscriber 105 profiles/demographics, subscriber-to-subscriber, subscriber-to-subscriber cluster, and subscribe cluster-to subscriber cluster 105 matching (also called collaborative filtering) where similar subscribers 105 tend to behave in a similar way (for example, watch the same or similar multimedia content, are interested in the same products, live in the same zip code, or have the same/similar profiles/demographics), and keywords from the subscriber 105 viewing history. These can be used to prepare a selection of salient keywords, which can then be TF.IDF weighted and encoded by the system processor 128.

The system processor 128 need not use all the words in multimedia content or advertisement content description to determine a match value or score. By sorting the TF.IDF term scores within a document, the system processor 128 can perform a match on only the "best" keywords within each multimedia content description or advertising content, that is those having the highest TF.IDF values. These best keywords will be the most sensitive and discriminating terms in that document, thus giving both high sensitivity and high precision to recommendations. In an embodiment, the matching process to determine a recommendation of multimedia content can be accelerated by applying Synonym Annotation and other stop wording, that is, certain words that are of little value in the process such as articles, adverbs, conjunctions, interjections, etc., to all multimedia and advertising content documents prior to or as a first step in TF.IDF processing.

To make use of text features in the clustering performed by the clustering, visualization & data seeding modules 1312 and 1322, the text features can be coded in numeric form. Statistics derived from the frequency of occurrence of their terms can be used to code segments of text numerically. In particular, numeric measures of distance between segments of text can be determined, with these distances being used to assess the similarity of the concepts of different segments of text described. D={d1, d2, . . . , dM} can be a collection of text segments (herein referred to as documents), with each document $d_j$ being a textual description of the recommended content, such as a piece of movie content, or a product being advertised. Each document dj is composed of space-delimited character strings, herein referred to as terms. Most terms will be words, but some can be numbers, names, or more complex symbols. Measuring the similarity of any combination of at least one of two or more documents, two or more customer's viewing histories, two or more sets of documents, and two or more sets of viewing histories based upon a list of match terms, herein referred to as keywords, which can be done in several ways as discussed below. It is important to note that some terms in a document will be more informative than others, i.e., contain more information than other terms.

A commonly used set of strategies for measuring the power of keywords can include document distance and similarly which disregards grammar, instead regarding each document as a collection of terms. These collections are routinely called "Bags of Words", and the strategies "Bag of Word" strategies. Examples of such strategies can include:

| | |
|---|---|
| Strategy 1 | Documents i and j are similar if, and only if they both contain all of the terms from a given keyword list. |
| Strategy 2 | Documents i and j are similar if each contains at least N of the terms in a given keyword list, where N is an adjustable parameter. |

The stringent match criterion of Strategy 1 will generally give few false alarms, but will also miss many similar documents. Strategy 1 is specific, but not sensitive. The looser match criterion of Strategy 2 will generally recognize similar documents (along with generating many false alarms). Strategy 2 is sensitive, but not specific. A keyword is "good" for characterizing document content if that document uses the keyword multiple times. This is because a term that a document uses frequently is likely to be related to what the document is actually about. This makes the match more sensitive to those documents most likely to be relevant.

A keyword can also be "good" for characterizing document content if it occurs in most documents that are relevant to that content, but it does not occur in documents concerning unrelated topics. This will enable the keyword to be used to detect and ignore irrelevant documents, making the match more specific. The perfect keyword for characterizing a document would occur many times in that document, and nowhere else. This is achieved by combining two sub-metrics: one for Sensitivity, and one for Specificity.

As discussed above, an entire collection of documents can be represented by the equation D={$d_1$, $d_2$, . . . , $d_M$}. A set of all terms that occur anywhere in any document can be represented by the equation W={$w_1$, $w_2$, . . . , $w_L$}, with $T_i$($w_j$) being equal to a number of times term $w_j$ occurs in document i. From this, the system processor 128 can determine the total number of times a term occurs, counting multiplicities, in the entire collection D by adding the occurrences in each document:

A good match term $w_j$ for a document $d_i$ will have a large TF and a small DF. TF and DF can be combined into a single metric by taking a ratio where the "large=good" sub-metric TF is in the numerator, and the "small=good" sub-metric DF is in the denominator. To avoid carrying around a complex quotient of fractions, the quotient can be a product of TF with the reciprocal of DF, referred to herein as the Inverse Document Frequency (IDF). A term's IDF value can be quite a bit larger than its TF values.

$$\text{Total count of occurrences of term } w_i = \sum_{k=1}^{M} T_k(w_i)$$

is larger than its TF values. Because of this, the logarithm of DF can be taken as an alternate approach to control its magnitude so that it doesn't "overwhelm" TF, resulting in the equation as follows:

$$\log(IDF) = \log\left(\frac{M}{DocCount(w_j)}\right)$$

Since there is no need to compute DF for terms that do not occur in any document in D, DocCount($w_j$) will always be at least 1.

Combining the Sensitivity enhancing TF sub-metric with the Specificity enhancing sub-metric log(IDF), can result in the equation as follows:

$$TF \cdot IDF = \left(TF(w_j, d_i)(IDF(w_j))\right) = TF(w_j, d_i)\log\left(\frac{M}{DocCount(w_j)}\right)$$

To measure a keyword's sensitivity to a specific document, the system processor 128 can proportion all occurrences of a term that are in that one document. This can be referred to as the Term Frequency (TF) for that term and document and is defined below. The Term Frequency for term j in document i can be:

$$TF_{ij} = \frac{T_i(w_j)}{\sum_{k=1}^{M} T_k(w_j)}$$

In other words, $TF_{ij}$=# of times $w_j$ appears in document i/# of times $w_j$ appears in all documents.

The Term Frequency is a real number between 0 and 1 inclusive, and is zero for documents in which the term does not occur. If there are lots of documents, TF will be a very small number for most terms and a larger number for rare terms. If a term occurs in only one document, its TF will be 1 for that document, and 0 for all other documents.

To incorporate a metric component that will keep precision high, a measure can be made of how "common" a term is across an entire set of documents. Terms that occur in many documents will not be very discriminating for any particular topic. This is the reason that certain parts of speech are poor stand-alone match terms, for example:

| Parts of speech that are usually poor choices as match terms | |
| --- | --- |
| Part of Speech | Examples |
| Adverbs | quickly, as |
| Articles | a, an, the |
| Conjunctions | and, but, however |
| Interjections | hooray, ouch |
| Prepositions | on, over, beside |
| Pronouns | she, you, us |

These are related to the notion of "stop-words", in other words poor stand-alone search terms.

The Specificity of a matching term for a corpus D of documents measures whether the occurrence of that term is concentrated in a small percentage of the documents, or found in many of the documents. The Specificity can be computed as the proportion of all documents that contain the term.

Specificity can be represented as follows:

$A(w_j, d_i) = 1$ if term $w_j$ occurs in document $d_i$, 0 if it does not

The total number of documents among the M documents in $D = \{d_1, d_2, \ldots, d_M\}$ that contain term $w_j$ is then given by:

$$DocCount(w_j) = \sum_{k=1}^{M} A(w_j, d_i)$$

Then, the proportion of all documents that contain the term is given by the Document Frequency (DF) for $w_j$:

$$DF(w_j) = \frac{DocCount(w_j)}{M}$$

The Document Frequency is a real number between 0 and 1, inclusive. If the Document Frequency is one, the term occurs in every document. It will be smaller number (that is less than 1) for terms that occur in few documents. If a term occurs in NO document, its DF will be 0 for all documents.

There can be multiple implementations for forming the linear, nonlinear, and/or nonlinear manifold clusters that can include tensor analysis, vector analysis, differential geometry, and spectral analysis. For example, in one embodiment vector analysis can be employed. In accordance with the principles disclosed herein, any approach can be employed to form the linear, nonlinear, and/or nonlinear manifold clusters to be used for determining the recommendation of multimedia content, advertising, and pricing of multimedia content and advertising, and delivery and scheduling to subscriber 105.

The system processor 128 can derive a set of conformed (that is, mathematically well behaved), unified feature vectors in an N-dimensional Euclidean space (which can be viewed as a Hilbert Space) called the embedding space, from the multimedia content, advertising content, subscriber 105 databases and any subset and/or combination thereof. Within the embedding space, each point represents a particular subscriber 105 or a particular multimedia content, genres, actors, directors, screenwriters, etc. and a particular advertising content and a cluster of points represent an aggregation of subscribers 105, multimedia content, genres, actors, directors, screenwriters, etc., advertising content, and/or an aggregation of all. Feature vectors can be clustered to the linear, nonlinear, and/or nonlinear manifold clusters in the embedding space where the linear, nonlinear, and/or nonlinear manifold clusters can have any dimension of N or less than N.

Feature vectors used in the clustering performed by the clustering, visualization & data seeding modules 1312 and 1322 can include text feature vectors from the TF.IDF analysis and/or other semantic processing performed in the data conditioning module 1310 and 1320 and other non-TF.IDF processed data which can be appended to the text feature vectors (for example, subscriber ZIP Code, gender, age) to form feature vectors, which is input into the clustering, visualization & data seeding modules 1312 and 1322

In the embodiments included herein, feature vectors can be comprised of multimedia content, advertising content, subscriber 105 information (including profile, preferences, viewing history, viewing selections, viewing rejections, often-watched content and associated time interval, periodically-watched content and associated time intervals, re-watched content and associated time interval, and/or the priority with which the multimedia content is watched with respect to other multimedia content, and interaction of a subscriber 105 with their CPE 110), and/or any combination thereof. Overlapping features, when available, can be used for matching within the clustering process. Non-overlapping feature vectors can be eliminated from use for matching. Feature vectors with thousands of dimensions are possible. However, system processor 128 can select the dimensionality of the embedding space, the number of dimensions input and/or the number of dimensions output, as a basis for trading accuracy for computational efficiency within the clustering performed by the clustering, visualization & data seeding modules 1312 and 1322.

The linear, nonlinear, and/or nonlinear manifold clustering can be performed with the clustering, visualization & data seeding modules 1312 and 1322 to form a set of local metrics for the multimedia content-subscriber 105 analysis, the advertising content-subscriber 105 analysis, and/or the multimedia content-advertising content-subscriber 105 analysis problems facilitating the use of many, tools and methods. In particular, weighted metrics and differential geometry can be utilized by the clustering, visualization & data seeding modules 1312 and 1322 as one such tool to develop subscriber 105 multimedia and advertising content recommendations. Other tools can include spectral theory and functional analysis. The weighted metrics can indicate a formal metric and/or a pseudo metric. The formal metric can satisfy Euclidean geometry. The pseudo metric can approximately satisfy conditions for the metric since the recommendation solution can be a numerical result. The weight selection for the metric can be determined by the information content and/or importance of each feature, for example actor, genre, director, producers, screenwriters, screenplay, etc. for multimedia content and advertising content, subscriber 105 value to an advertiser 150, the value of an advertisement to a subscriber 105, the type of advertisement, etc. The weights can be determined during the process of solving the partial differential equation, as described, constructed, and illustrated below.

$\mathcal{F}$ can be a collection of finite length character strings or text feature vectors (e.g., based on title, director, genre, or any other information such as screenplay, content descriptive keywords, director style and/or subscriber information and/or viewing history):

$$\mathcal{F} = \{A_j\} = \{A_1, A_2, \ldots, A_M\}$$

$d_{ij}(A_i, A_j) = d_{ij}$ can be the metric on $\mathcal{F}$. A distance matrix can be formed as follows:

$$D(A_i, A_j) = [d_{ij}], i,j = 1,2 \ldots M$$

This distance matrix is symmetric, zero diagonal, non-negative
where:

$$S = \{\vec{\alpha}_j\} = \{\vec{\alpha}_1, \vec{\alpha}_2, \ldots, \vec{\alpha}_M\} \in \mathbb{R}^N$$

can be a (hypothetical) set of vectors having distance matrix D. Regarding the $\vec{\alpha}_j$ as a field source, we can define a discrete scalar potential $\wp$ on $S$ by:

$$\wp(\vec{\alpha}_i) = \mathcal{G} \sum_{j=1}^{M} (\|\vec{\alpha}_i - \vec{\alpha}_j\| - d_{ij})^2 \quad (*)$$

where $\mathcal{G}$ can be a weighting or multiplier on affinity and is a non-negative constant that can be chosen arbitrarily to facilitate specific anticipated applications of the theory (e.g., sensitivity analysis to determine a value of subscribers 105 to advertisers and advertising to subscribers 105, determine the optimum multimedia content price, determine and optimize delivery and viewing schedule of multimedia content). The field can allow both the attraction and repulsion of content and subscribers 105 in the field, and their positions/distances relative to one another, based on similarities and dissimilarities, respectively. The field can allow the non-linear manifold to be constructed and allow for measurement of metrics and subsequent determination of recommendation(s) of for subscriber(s) 105. The field and its construction are described below.

In general, the existence of such an $S$ for a given D is not guaranteed; in particular, D might not exist for N=1, but exist for N=2. Also, because $S$ is informed only by the distances between the $\vec{\alpha}_j$, any rigid placement of a solution is also a solution. Therefore, a solution can be registered in $\mathcal{F}^N$ for convenience. An approximate solution $S$ for (*) can be found by various methods that include, for example, Singular Value Decomposition, Gradient Descent, and/or Monte-Carlo.

A Formal Gradient:

$$\wp(\vec{\alpha}_1) = C(\vec{\alpha}_1)$$

can define a vector field on, and that is precisely the set of zeros of the Laplacian of (which is to be expected). The field equations can give rise to a radially symmetric scalar potential that are used to drive the cluster formation. For example, the clusters can include feature vectors representing multimedia content and advertising attributes and subscriber 105 attributes. The cluster formation can be governed by the multimedia content, advertising content and subscriber 105 attributes (including subscriber interaction with the CPE 110) data using the field equation. The closeness of multimedia content and/or clusters of multimedia content and subscriber 105 and/or clusters of subscriber 105 tastes can provide recommendations for the subscriber 105 and/or cluster of subscribers 105. The details of this process are described below.

During the clustering process, the linear clustering, nonlinear clustering, and/or nonlinear manifold clustering can be performed. In addition, the linear and nonlinear clustering can be mapped onto the nonlinear manifold with the clustering, visualization & data seeding modules 1312 and 1322. The nonlinear manifold distance or metric is the relative distance between feature vectors on the nonlinear manifold. The metric provides the relative affinity between feature vectors in the linear, nonlinear, and/or nonlinear manifold spaces. The feature tags can then be used to reference the encoded feature vectors (subscribers 105, content, etc.) back to the source input. The reference metric can be used to indicate the affinity between the various elements described herein, such as subscribers 105 and content (multimedia content and advertising content), etc.

A field has value(s) for each point (for example, feature vectors) it contains. Adding and/or subtracting points (that is, feature vectors) to and/or from the field can be changed or modified either locally (within a region) and/or globally (over an entire field). The field can be defined to behave as physical phenomenon (for example, gravitational, electromagnetics, etc.). Also, fields can be based on multidimensional feature vectors that can be arbitrarily defined. The field can consist of many dimensions and can change with time. The field can be classified as scalar, vector, tensor, statistical (many body), etc. The field can have well-defined properties which can be useful in content recommendation.

The "field" can govern the cluster formation used for generating the linear clustering, nonlinear clustering, and/or nonlinear manifold clustering. The field controls the placement of feature vectors (data from at least one database, including information of at least one subscriber 105, multimedia content, advertising content, and subscriber 105 interaction with their CPE 110) into the linear, nonlinear, and/or nonlinear manifold cluster formation. In addition, the placement of additional data elements in an existing field can modify that field. The feature vectors can both attract/repel other feature vectors within the clustering process based on the defined field. The field can satisfy the superposition principle, so additional content (e.g., subscriber 105 data, multimedia content, advertising content, and subscriber 105 interaction with the CPE 110) can be directly placed in an embedded space. The field can be conservative. In particular, the field can be path-independent, not needing to retain the history of a subscriber 105 or particular content to understand their immediate effect on the field. The resulting linear clustering, nonlinear clustering, and/or nonlinear manifold clustering, produced by the system processor 128, can be embedded in a Hilbert Space of appropriate dimension that creates coordinates in a natural way using unsupervised machine learning. The Delta Rule is a first-order gradient descent method. When the Delta Rule is written as a distance minimization expression, the Delta Rule can be a differential equation describing a vector field. A gradient descent solution (to place the data within a multidimensional coordinate space) can then be a set of Lagrangian Points (stable point or location within the multidimensional field where the forces are in equilibrium), which can satisfy this differential equation. In this way, the field is an emergent property of the points it positions, and the positions are constrained by the mutual forces of attraction and repulsion. The dimension of the Euclidean Space can be selected by the system processor 128 to minimize error, and a machine-learning theory variant of the Delta Rule can be used to perform the clustering (subscribers, multimedia content, advertising, etc., and any combination thereof including subsets of the groups). An energy function can be calculated from the solution of the differential equation. The energy function can provide a measure of how efficient/complete the clustering is to minimize the energy of the resulting field and allow the clustering to reach equilibrium or a minimum energy. At that point the clustering is optimized for the points contained on the non-linear manifold.

The formed cluster can correspond to a surface of minimum energy as defined by a partial differential equation of order 1 or greater. The concept of minimum energy ensures an optimum solution for a subscriber 105, multimedia content, and advertising content recommendation that can be achieved.

Other methods can be used to develop a distance matrix from the input data contained within the formed clusters, such as Singular Value Decomposition, Lagrange Multipliers, Newton's Method, or any other method that can construct a coordinate system from the data. In an embodiment, an adaptive convergence rate and an annealing schedule can be employed to speed up convergence of the cluster formation.

Using the techniques of information geometry, data mining methods for data visualization, signature extraction, clustering, building classifiers, etc., can be performed in the math model module 1314 and 1324, illustrated in FIG. 13.

The system processor 128 can employ the field-theoretic approach to implement the non-linear manifold clustering to provide a unifying mathematical framework for applications of computational linguistics and semantics. As previously discussed, the computational framework can provide a mathematical framework for automating aspects of encoding and data modeling, for example, operating on unstructured text and representing that unstructured text by numbers. The linear, nonlinear, and/or the nonlinear manifold cluster formation are data agnostic, data-driven, and adaptive with no a priori assumptions about the problem. The problem of determining recommendation of multimedia content can be used to determine a structure of the solution and formation of the non-linear manifold clustering. Data can be initialized by grouping similar inputs to allow the solution of determining recommendation to converge more rapidly.

The system processor 128 can utilize multiple methods for cluster formation that includes tensor analysis, vector analysis, differential geometry, spectral analysis, etc. The examples discussed herein can use the vector analysis approach. The system processor 128 can use linear, nonlinear, and/or nonlinear manifold clustering to produce clusters of subscribers 105, clusters of multimedia content, clusters of advertising content, clusters of subscribers 105 and advertising content, and clusters of subscribers 105 and clusters of multimedia content and advertising in a multidimensional space that is located in linear and nonlinear cluster spaces, as well as along a nonlinear manifold. Other clusters can be produced such as clusters of actors having similar characteristics, clusters of directors having the similar characteristics, clusters of film genre having similar characteristics, clusters of advertising content having similar characteristics, clusters of subscribers 105 having similar profiles, viewing histories and behaviors, etc.

A metric can be defined as a linear metric distance and/or manifold metric distance between each pair of vector elements. This set of vector elements can be comprised of all subscribers 105, all multimedia content, all advertising content, subscriber interaction with the CPE 110, and/or any combination or subsets thereof. This set of elements (or feature vectors) can be represented by multidimensional vectors in linear space, nonlinear space, or on the nonlinear manifold. A norm (or distance) can be determined by the system processor 128 and applied to linear, nonlinear, and/or nonlinear manifold clustering between individual points and/or clusters. The norm can be used to determine distance or metric measurements between subscribers 105, multimedia content, advertising content, and/or any combination or subset thereof. A metric can include a norm of a vector difference and a norm of a weighted vector difference. For example, this norm can include a distance between individual elements and/or clusters of subscribers 105, between multimedia content, between advertising content, and/or any combination or superset and/or subset thereof. Some examples of the distance calculated by a norm can be expressed as the norm of (subscriber 1, subscriber 2), the norm of (multimedia content 1, multimedia content 2), the norm of (subscriber1, multimedia content 2), and the norm of (subscriber1, advertising content 2). Many other clusters and associated norms are possible and can be determined by the system processor 128 as required using any of the parameters of Tables 1-8.

The metric can be used to measure the affinity (similarity, proximity or closeness) of elements to each other. The weighted distance or weighted metric can be inversely proportional to the similarity or affinity between any two points or elements. The smaller the value given by the metric is, the greater the affinity or similarity between elements. Correspondingly, the larger the value given by the metric is, the greater the differences between the elements.

For multimedia content recommendation determined by the system processor 128, the closer a distance or metric between subscriber 105 and multimedia content a greater likelihood that a subscriber 105 will like a particular multimedia content. And, the closer a distance between subscriber 105 and advertising content a greater likelihood that a subscriber 105 will find a particular advertising content compelling.

Also, statistical analysis and mathematical modeling can be performed in the math processor modules 1314 and 1324. Examples of these mathematical modeling can include statistical moments (means, variances, skewness, kurtosis, etc.), single and/or multiple linear and/or nonlinear regression, Maximum Likelihood Ratio (MLR), or any other mathematical modeling that allow for determination, by the system processor 128, of recommendation of multimedia content, advertising content, pricing for multimedia and advertising, delivery optimization, and delivery pricing. For the tracking of trajectories over time, Autoregressive (AR) models, polynomial fit, splines, and Kalman Filtering can be utilized by the system processor 128, which can provide useful properties in a space and can compensate or predict changing, evolving and/or emerging patterns of subscriber 105 behavior (for example, content viewing patterns, content selection, discontinued viewing of content, often-watched and associated time intervals between viewings, not-watched, when watched, etc.).

The system processor 128 can formulate and apply a weighted metric to multimedia content, subscribers, advertising, or any combination thereof, to unify such data. In an embodiment, this weighted metric can be a single weighted metric. The unification can allow the system processor 128 to uniformly treat subscribers 105, multimedia content, pricing, advertising, scheduling and delivery, in one or more dimensional spaces. From this single weighted metric, the system processor 128 can formulate an objective function which can drive the linear and non-linear clustering. In this way, the cluster formation can be recursive, and adaptive. Other metrics can be created and applied to related data representations. For example, the system processor 128 can cluster advertising and subscribers 105 to achieve advertising insertion based on a type of advertising and the associated value of the subscriber 105 to the advertiser 150, value of the advertising to the subscriber 105, and the corresponding subsidy/price. The objective function can be used to derive an Nth-order partial differential equation, for example, having the form of Laplace's Equation, the properties of which can characterize the linear and non-linear clustering. In particular, properties of Laplace's Equation can allow data points, data dimensions, and data classifications to be added, removed, and modified without having to reconstruct the entire linear or nonlinear clustering. The Laplace Equation, together with the use of weights in the metric, can allow the system processor 128 to apply a unified representation to several operations without requiring data refactoring, such as:

1) clustering of subscriber 105 data including the interaction of the subscriber 105 with the CPE 110 (subscriber behavior);

2) clustering of multimedia content, genres, actors, directors, producers, screenwriters, etc. data;

3) clustering of advertising content data;

4) clustering of any combination or aggregation of subscriber 105, advertising, and multimedia content, genres, actors, directors, screenwriters, etc. data in the same, unified space; and 5) computation of numeric measures of vector distances or metrics between any and all of the above in the various unified spaces that can be used by the local 1316 and 1326 and global 1330 adjudication modules The system processor 128 can perform statistical vector operations on any set of distance metrics. These distance metrics can represent affinity between subscribers 105/clusters of subscribers 105, multimedia content/clusters of multimedia content, advertising content/clusters of advertising content, or any combination and/or subset thereof. These operations are performed by the system processor 128 in the math model module 1314 and 1324, illustrated in FIG. 13, and can calculate the means, variances and other statistical moments on a cluster of elements or a group of linear and/or nonlinear clusters, as well as on the nonlinear manifold. These statistical moments of metrics can be used by the system processor 128 to measure the similarity or differences of elements contained within a cluster (intra cluster), between a cluster and other clusters (inter cluster), and/or between clusters of clusters to each other.

The mean of a cluster of subscribers 105, multimedia content, advertising content or an aggregate and/or subset thereof can be represented by a centroid of that cluster in the N-dimensional space. For example, the centroid of a cluster of subscribers can be used to define a representative subscriber for that cluster. Likewise, a representative multimedia content, representative advertising, and/or representative aggregates of any combination of subscribers, multimedia content, and advertising can be defined. The system processor 128 can determine variances of a cluster of subscribers 105, a cluster of multimedia content, a cluster of advertising content, and/or a subset and/or an aggregate thereof using a metric of each member of the cluster relative to the centroid of that cluster. The system processor can use these variances to estimate the similarities between members of a given cluster and determine cluster membership and cluster boundaries. The variances can be used to weight the feature components or vector components, as well. A centroid is a concept and not actually a member of that cluster. However, the system processor 128 can determine a metric, between the centroids, as an indicator of the closeness between clusters and the affinity between those clusters. The system processor 128 can add and/or subtract cluster members without the re-computation of the linear, nonlinear, and nonlinear manifold clusters. The system processor 128 can use the metric, centroids and metric variances, to find the affinity between members of a cluster or between different groups and subsets of clusters. The system processor 128 can also partition a cluster into sub-clusters. The system processor 128 can determine the recommendation of multimedia content based on such affinity between members of a cluster or between different groups of clusters. The system processor 128 can perform at least one statistical operation on at least one metric between at least one point contained in the subscriber cluster and at least one point contained in the multimedia content cluster in linear space to calculate a mean and at least one variance. In an alternate example embodiment, the system processor 128 can perform at least one statistical operation on at least one metric between at least one point contained in the subscriber cluster and at least one point contained in the multimedia content cluster in a nonlinear space to calculate a mean and at least one variance. In another alternate example embodiment, the system processor 128 can perform at least one statistical operation on at least one metric between at least one point contained in the subscriber cluster along the nonlinear manifold and at least one point contained in the multimedia content cluster along the nonlinear manifold to calculate a mean and at least one variance.

The local adjudication modules 1314, 1324 and global adjudication module 1330 can use the linear, nonlinear, and/or nonlinear manifold metrics and associated variances to either select best result of the three inputs or combine the weighted results of the three inputs to provide an accurate composite recommendations metric/score and confidence interval.

The initialization of a new subscriber 105 can be performed as follows:

1. Based on the subscriber 105 profile, preferences, initial surveys, access to internet browser history, social media and other information, a subscriber 105 can be assigned to a cluster of subscribers 105 that best matches their profile, etc. as described previously. Multimedia content recommendation(s) and advertising recommendation(s) can be transferred from a subscriber 105 or representative subscriber 105 to another subscriber 105 (or group) based on a high affinity between the two.

2. Initial recommendations for the subscriber 105 can be made based on their cluster assignment.

3. Based on a viewing history of the subscriber 105, by their interaction with their CPE 110 (subscriber behavior), and items from action 1 above, either the subscriber 105 can be placed in another cluster of subscribers 105 or a sub-cluster of the original cluster placement and the system processor 128 can modify their preferences and update recommended multimedia content accordingly.

4. Based on the accumulation of information and training (currently known as, machine learning), the system processor 128 can improve all subscriber 105 recommendations continuously to achieve greater accuracies and minimize probability of error.

An ordered list of multimedia content and/or advertising content recommendations can be generated in the system processor 128 and transmitted from the system controller 126 to a subscriber 105 and/or a cluster of subscribers 105 and their respective CPEs 110 or the subscriber 105 and/or cluster of subscribers 105 via their respective web interface(s).

Multiple recommendation thresholds can be set based on the inverse distance (or inverse metric) and/or the distance (or metric) between a subscriber 105 (or subscriber cluster centroid) and particular content (multimedia content or advertising content) or cluster of content. Using the inverse metric, closeness or affinity can be defined if the inverse metric is greater than or equal to a threshold. In another example, using the metric, closeness or affinity can be defined if the metric is less than a threshold. The example embodiment described hereafter uses the inverse metric exceeding (or crossing) a threshold floor as a basis for determining a recommendation. Likewise, another equivalent embodiment can use the metric not exceeding (or crossing) a threshold ceiling as a basis for determining a recommendation.

The recommendation thresholds can change as subscribers 105 and multimedia content are added to and/or deleted from subscriber clusters and/or multimedia clusters.

Individual subscriber thresholds can be optimized using the data contained in subscriber history and viewing behavior, Table 5, using machine learning and based on the probability and cost of an missed recommendation (that is, missing the opportunity to recommend particular multimedia content) and the probability and cost of a false recommendation (that is, providing misinformation to the subscriber.)

The value of these recommendation thresholds can be determined by the adjudication modules 1316, 1326, and 1330. The value of these recommendation thresholds can also be set based on content providers, transport providers and advertisers' business objectives, cases, and/or models.

If an inverse metric exceeds a first recommendation threshold, the system processor 128 can add a particular multimedia content recommendation to a rank ordered list for the subscriber 105 and/or a subscriber 105 cluster. This ordered list can be sent, by the system controller 126, to the subscriber 105 and/or subscriber 105 cluster via their respective CPE(s) 110 and/or web interface. The ordered list can be ranked by the inverse distance between subscriber 105 and multimedia content. Other recommendation thresholds, described in the next several paragraphs, can be defined and other actions can be performed based on these recommendation thresholds.

If a subscriber 105 or subscriber 105 cluster has previously viewed a particular multimedia content and/or advertising content in whole or in part, that content can be masked and blocked from transmission to the CPE 110. Additionally, a list can be maintained for each subscriber 105 or cluster of subscribers 105 of viewed content, when watched, frequency of re-watched multimedia content and advertising content (if any), number of times watched and other information to facilitate periodic content watching and pricing. This information can be used by the system processor 128 to calculate both multimedia content fatigue and advertising content retention, fatigue, AQoS, and AIQoS.

A second recommendation threshold can be defined. If the inverse metric is greater than the second defined recommendation threshold, the multimedia content is added to a rank ordered list associated with the recommendation of multimedia content and can be pushed, by the system controller 126, to a CPE 110 of a subscriber 105 and stored without that subscriber's 105 request and/or selection of that multimedia content. Once the multimedia content has been downloaded or a sufficient portion of the multimedia content has been buffered on the CPE 110 to present the multimedia content without disruption, the multimedia content can be placed in the subscriber's available recommended multimedia content list. The price for this pushed multimedia content can be added to a price paid by the subscriber 105 if the subscriber 105 selects the multimedia content for viewing with the CPE 110. This same process can be performed by the system controller 126 for clusters of subscribers 105 and clusters of content, both multimedia content and advertising content.

A third recommendation threshold can be defined. If the inverse metric is greater than the third defined recommendation threshold, the recommended multimedia content can be placed in the subscriber's viewing schedule and/or calendar and pushed to a CPE 110 of the subscriber 105 and stored without that subscriber's 105 request and/or selection. Once the multimedia content has been downloaded to the CPE 110 or a sufficient portion of the recommended multimedia content has been buffered on the CPE 110 to present the recommended multimedia content without disruption, the multimedia content can be shown in the schedule as available on the CPE 110 for viewing. The viewing schedule and/or calendar can be created for and presented to the subscriber105 with the CPE 110, automatically either in response to a subscriber 105 selecting to view the viewing schedule and/or calendar or with pop-up notifications of content that is newly available for immediate viewing. This viewing schedule and/or calendar can be presented to the subscriber 105 and can be based on subscriber viewing habits and behavior. These viewing habits or patterns of life can be derived from the interaction of a subscriber 105 with their CPE 110 and/or web interface. This approach can also be performed with clusters of subscribers 105, multimedia content, advertising content, and/or aggregations and subsets thereof. Each subscriber 105 can modify their viewing schedule and/or ordered list via the CPE 110 and/or web interface. This modification can be manual and/or automatic. If manual, the subscriber 105 can move multimedia content with a pointing device, finger, keyboard, voice command, etc. to achieve desired results. If automatic, the system processor 128 can move multimedia content based on subscriber 105 viewing habits and/or patterns of behavior, as discovered by subscriber 105 interaction with the CPE 110. The multimedia content movement can occur during presentation of the calendar, within a ranked ordered list of multimedia, and/or between the calendar presentation and the rank ordered list. The machine learning aspects of the system processor 128 can discover changes in desired multimedia content and/or changes in viewing habits, etc.

A fourth recommendation threshold can be defined. If the inverse metric is greater than the fourth recommendation threshold, then the delivery address of the individual subscriber's CPE 110 can be added to a queue for multicast delivery of the specific recommended multimedia content if the multimedia content is not already on the CPE 110 storage or if the subscriber 105 has not previously viewed the multimedia content, in whole or in part. In addition, the multimedia content can be added to the queue based on the multimedia content fatigue settings (the number of times the multimedia content has been viewed or the amount of time since last viewed). Seasonal viewing preferences can also be considered.

The system processor 128 further performs aggregation of multimedia content associated with the recommendation of multimedia content to be delivered to a plurality of customer premises equipment 110, and the system controller 126 further delivers the multimedia content to the plurality of customer premises equipment 110. As an example, once a defined number of CPE 110 addresses associated with a specific multimedia content (see previous paragraph) exceeds a multicast push threshold, then the multimedia content can be later scheduled for multicast delivery, if sufficient local storage is available in the subscriber's CPE 110. After the multimedia content has been pushed to the CPE 110 or a sufficient portion of the recommended multimedia content has been buffered on the CPE 110 to present the recommended multimedia content without disruption, the title of the multicast push multimedia content can be added to the subscriber's CPE 110 available recommended multimedia content list, available for immediate viewing. The multicast push threshold can be based on the number of subscribers in the multicast footprint, network congestion, age of multimedia content, the time since the multimedia content became available from the content provider 140, the value and popularity of the multimedia content, viewer multimedia content fatigue and retention settings, and available CPE 110 local storage for each member in the multicast footprint. In addition, the length of time the recommended multimedia content has been in a queue for delivery can be used to trigger the push of the multimedia content, as well as a combination of number in the queue and active time of the queue to trigger the multicast push of the multimedia content. Additionally, a subscriber 105 request(s) for the multimedia content can trigger the push of the queued multicast push delivery of multimedia content to the CPE 110. This technique can be used to enhance intelligent aggregation (defined below) when used in conjunction with delivery lead-time pricing to maximize channel utilization and efficiency. Once the multicast push of content has been delivered for specific CPE (110) addresses, those CPE 110 addresses associated with the delivered content can be removed from the multicast push queue.

In addition, operating in conjunction with the multicast push (fourth recommendation threshold), the second and third recommendation thresholds previously defined can be disabled for pushing of content, however the second and third thresholds can still be used to add to the subscriber's available recommended multimedia content list and viewing schedule or calendar, respectively on the CPE 110.

Similarly, a deletion threshold can be set to intelligently remove multimedia content from CPEs 110 of the subscriber 105 or group of subscribers 105. These deletion thresholds control when content can be deleted or are made available for deletion from CPE 110 storage, allowing an efficient use of CPE 110 storage. These deletion thresholds are derived from the information contained in the Subscriber Account Profile, Table 2 and Subscriber History, Table 5. The recommendation thresholds and deletion thresholds for content can interfere with one another. To ensure a stable operation, hysteresis can be added between the recommendation and deletion thresholds. The amount of hysteresis can be based on the elapsed time since the content was loaded onto the CPE 110, number of times content was watched, and/or any other quantity included in the subscriber viewer history or a combination thereof. The deletion threshold can be used when the available CPE 110 storage, falls below some predefined amount of storage. The deletion threshold can change as subscribers 105 and multimedia content are added to and/or deleted from subscriber clusters and/or multimedia clusters.

The system processor 128 can prioritize a plurality of recommendations of multimedia content based on the metric distance and the various recommendation thresholds and the system controller 126 delivers the prioritized recommendation list(s) to the CPE 110 via transport providers 160.

Every piece, group and/or cluster of multimedia content can have its own lead-time price curve based on popularity and transport type. This curve or index can be presented to the subscriber 105 and can encourage and/or incentivize the subscriber 105 to make the most efficient and effective use of bandwidth for transport type. Using intelligent aggregation, described below, together with optimum delivery lead-time for multimedia content and transport type, marginal transport costs, described below, can be developed and presented to the subscriber 105 and the transport provider 160.

Since there can be a marginal cost for content delivery to an additional subscriber 105, additional thresholds can be defined to determine if additional subscribers 105 can be added to a list of subscribers 105 already scheduled to receive particular content. Marginal cost can be defined as the change in the total cost when one more subscriber 105 is added to the list of subscribers 105 for the delivery of the particular content.

In intelligent aggregation (as defined below) and multicast delivery environment, multimedia content can be priced for streaming delivery based the content popularity and subscriber(s) willingness to pay a premium for the desired content. Thus, the multimedia delivery system 100 can be optimized to maximize revenue for transport providers 160.

The thresholds discussed above can be set and/or tuned for at least one of a particular subscriber 105, a particular subscriber 105 cluster, a particular multimedia content, a particular multimedia content cluster, a particular advertising content, a particular advertising content cluster and a combination and/or subsets thereof. These thresholds can be determined by content providers 140, transport providers 160, a delivery service system operator, and/or in collaboration of such parties.

The system processor 128 can perform intelligent aggregation to group same content for simultaneous delivery to a group or cluster of subscribers 105, including pushed multimedia and advertising content. This content can include both selected and recommended content and can be included with the recommendation of multimedia and advertising content, in one or more of broadcast, multicast and unicast together with the use of the delivery lead-time disclosed herein. This use of the delivery lead-time allows for greater transport efficiencies and correspondingly lower delivery prices. This efficiency is especially valuable for bandwidth constrained systems, such as for example, over-the-air provider, a cable provider, a satellite provider, an Internet provider, a cellular provider, and/or any other bandwidth constrained system. In the case of standard television broadcasting, including over-the-air, cable or satellite, this aggregation can include a general form of aggregation. In this case, the CPE 110 can be instructed to record the selected or recommended multimedia content for subsequent viewing. The record instructions can also mark commercial breaks to allow the CPE 110 to store only the multimedia content without advertisements, thus conserving disk storage space used by the CPE 110. For advertising that can be directed to the subscriber 105 and associated with the CPE 110, the CPE 110 can receive instructions to index and store advertising delivered via broadcast delivery.

One or more of OTA broadcast provider, cable provider, a satellite provider, an Internet provider, and a cellular provider can be used to deliver (for example, push) multimedia content and/or advertising content to the CPE 110 of the subscriber 105, either independently and/or cooperatively.

The accuracy of clustering (for example, linear, nonlinear, and/or nonlinear manifold) performed by the system processor 128 for determination of the recommendation of multimedia content and advertising content can allow subscriber-centric recommendations and the use of intelligent aggregation for both recommended and requested multimedia content. Such accuracy of clustering can be used for pushing of aggregated selected and recommended multimedia and advertising content using the lead-time delivery disclosed herein to further enhance bandwidth efficiency. Such intelligent aggregation can increase bandwidth efficiency and allow for associated transport price reduction and can be initiated by any party, such as the subscriber 105, transport provider 160, or the system controller 126, in the chain of delivery.

In accordance with the principles disclosed herein, clustering (linear, nonlinear, and nonlinear manifold) performed by the system processor 128 can also be used to determine multimedia content pricing by examining distances (or metrics) and associated variances between the subscribers 105 and multimedia content. Since the clustering (linear, nonlinear, and nonlinear manifold) can unify the representation of subscribers 105, advertising content, and multimedia content, the subscribers 105, advertising content, and multimedia content can all be treated the same. Clustering (linear, nonlinear, and nonlinear manifold) can also be used to recommend and determine value/subsidy/pricing of advertising. Therefore, the data conditioning modules 1310 and 1320, the clustering, visualization & data seeding modules 1312 and 1322, and the math model modules 1314 and 1324 of FIG. 13 can be used to recommend advertising, as well as calculate the value of a subscriber 105 or cluster of subscribers 105 to an advertiser 150, the value of an advertisement to a subscriber 105 or a cluster of subscribers 105, and subsidy and pricing of the advertising.

The use of clustering (linear, nonlinear, and nonlinear manifold) performed by the system processor 128 and the metric means, metric variances, and centroids can be used to determine the affinity or closeness between different subscribers. The system processor 128 can use the affinity of one subscriber to another subscriber to transfer the first subscriber's recommendations, in whole or in part, to the second subscriber. The affinity based transfer of recommendations can be between any combination of individual or groups of subscribers to other individual subscribers or groups of subscribers.

The system processor 128 can use affinity of first multimedia content to a second multimedia content, or alternative multimedia content (e.g. movie recommendations results in music recommendations), as a basis to copy the list of subscribers that have that recommendation of the first multimedia content to second multimedia content. The affinity based copy of recommendations can be between any combination of individual multimedia content or groups of multimedia content to other individual multimedia content or groups of multimedia content. Such affinity or nearness may indicate a likelihood that the subscriber that may enjoy the first multimedia content may also enjoy the alternative multimedia content. In another example, affinity can also be used to copy lists of advertising recommendations.

The affinity process discussed herein can be used with representative element(s) (e.g. the centroid of an element cluster or subset of an element cluster). These elements can include unique, mutually exclusive sets of subscribers, multimedia content, and advertising.

Small metric variances can indicate that the potential multimedia content recommendation, multimedia content pricing, advertising content, advertising pricing, and transport pricing are optimized. Large metric variances can indicate scheduling of multimedia content delivery which are not optimized for all members of a cluster of subscribers 105 or groups of clusters of subscribers 105.

The information flow between the local adjudication modules 1316 and 1326 and the global adjudication module 1330 and the other modules in the processing can be bidirectional. The local adjudication modules 1316 and 1326 and the global adjudication module 1330 can provide feedback to one or more of prior processing modules as a basis for controlling the processes performed by the prior modules.

The local adjudication modules 1316 and 1326 and the global adjudication module 1330 can perform computations using the various available metrics (means, variances, higher statistical moments, single and/or multiple linear and/or nonlinear regressions, Maximum Likelihood Ratio (MLR)) and associated thresholds for the purpose of recommending multimedia content, advertising, and other information products for delivery to the subscriber 105. Clustering (for example, linear, nonlinear and/or nonlinear manifold) together with TF.IDF and/or other semantic/linguistic processing can provide an optimized information framework within which adjudication, as determined by local adjudication modules 1316 and 1326 and the global adjudication module 1330, can occur efficiently and with high fidelity. The unified information framework disclosed herein can provide a rich and natural information landscape for making best use of the disparate input data to make decisions.

The principles of the embodiments disclosed herein can be applied to such non-exhaustive examples of multimedia content that include books, music, podcasts, YouTube videos, electronic/video games, software, apps (for example, computers, tablets, and smart phones), websites, articles (for example, news, magazine, literary, short stories, poetry, scientific, etc.) courseware/instructional material including classroom presentations, employment opportunities matching perspective employers with perspective employees, personality matching for potential relationships, service providers (for example: building contractors, Healthcare professionals, Long Term Care Facilities, Healthcare facilities, pharmaceutical/disease research, financial services, car sales and repair, etc.), product sales and rentals, or any other application in which large volumes of data are clustered and matched using the techniques disclosed herein. These types of recommendations can include modification of the input datasets, text feature vectors, the feature vectors, tags, thresholds and actions disclosed herein, accordingly.

The data contained in Tables 1-8, as well as literature pertaining to a product or service, resumes, job descriptions, etc. can be used as input to the system processor 128. These are examples of input data and are not an exhaustive list of input data, with the system processor 128 being able to accept and process any input data available. The system controller 126 can retrieve this data. The system processor 128 can formulate a unified input data set from the retrieved data. The data conditioning modules 1310 and 1320 can process, tag, and encode unstructured text prior to appending other data for input to the clustering, visualization & data seeding modules 1312 and 1322. The clustering, visualization & data seeding modules 1312 and 1322 can perform clustering on this unified input dataset to formulate a linear, nonlinear, and/or nonlinear manifold clusters. The math model modules 1314 and 1324 can determine a metric or distance on the between elements of the unified dataset. The local adjudicators 1316 and 1326 can make decisions using metric means, variances, higher statistical moments, single and/or multiple linear and/or nonlinear regression, Maximum Likelihood Ratio (MLR) calculations for the purpose of determining recommendations. The adjudication process can establish thresholds and subsequent actions taken if these thresholds are crossed, for example, order a ranking of recommended products and/or services.

In one or more example embodiments the recommendations disclosed herein can be determined for non-subscribers. For example, the recommendations disclosed herein can be determined as a basis for providing an example of recommendations to attract non-subscribers 105 to a product and/or service and recommend a perspective non-subscriber to a service provider 160.

FIG. 14 illustrates an example system processor 128, in accordance with one or more possible embodiments. The system processor 128 can be configured as an array of computation units with computation units 1-A thru N-A making up a first column of computation units, computation units 1-B thru N-B making up a second column of computation units, computation units 1-C thru N-C making up a third column of computation units, and computation units 1-M thru N-M making up the Mth column of computation units. Computation units 1-A, 1-B, 1-C, and 1-M can make up a first row of computation units, computation units 2-A, 2-B, 2-C, and 2-M can make up a second row of computation units, computation units 3-A, 3-B, 3-C, and 3-MD can make up a third row of computation units, and computation units N-A, N-B, N-C, and N-M can make up an Nth row of computation units. The system processor 128 can include, for an example, four horizontal high speed switches 1410, 1412, 1414, and 1416 and, for example, five vertical high speed switches 1420, 1422, 1424, 1426, and 1428. The high speed switches 1410, 1412, 1414, 1416, 1420, 1422, 1424, 1426, and 1428 can facilitate rapid reconfiguration of the array of computation units 1-A thru N-M. This design is data-driven, highly parallel and highly scalable. This disclosure describes the architecture and processing performed in the system processor 128, together with a description of each processing element and its interaction with all other processing elements, as well as the implementation and operation of the pricing and content recommendation performed in the system processor 128. A grouping of a set of computational units can form a computational unit from the computational unit 1-A thru 1-M. Although the example system processor 128 is illustrated as being a NX4 processor array, the system processor 128 can be any configuration of any number of processing elements within rows and columns that optimizes the processing of algorithms discussed herein.

The computation units 1-A thru N-M can nominally maintain a ratio of one computation unit to perform each of the following advanced analytic functions: data conditioning, clustering & visualization, math modeling, and local adjudication. Graphics Processing Units (GPUs) can be utilized in the second column to accelerate clustering, visualization & data seeding modules 1312 and 1322 of the advanced analytics method 1300 performed by the system processor 128.

With complex problems including multiple advanced analytics arrays being used, global adjudication performed by global adjudication module 1330 can merge the results produced to provide a more accurate answer than is possible with individual advanced analytics arrays. The advanced analytics method 1300 takes advantage of, e.g., array processing architecture, where all or any subsets of the input datasets can be automatically, simultaneously and/or independently processed. The advanced analytics method 1300 also makes use of an adjudication process to automatically select "the best results". The adjudication process may be applied both locally within the system processor 128 and/or globally with a collection of multiple, parallel system processors 128.

The global adjudication processing module 1300 can evaluate different types of clustering (for example, linear, nonlinear, linear manifold, and/or nonlinear manifold) and select the best results or best weighted combination of results. As an example, the global adjudication module 1330 can compare the nonlinear manifold clustering with a linear manifold clustering (for example, using Local Linear Embedding (LLE) and/or Isomap techniques) to ensure the optimum performance and computational efficiencies. In addition, the global adjudication processing module 1300 can use the previously listed semantic/linguistic/bag of word processing techniques in the TF.IDF to ensure optimal performance and computational efficiencies.

The data sourced in Tables 1 through 8 contains examples of data to be used as a basis for performing pricing and recommendation, preferably represented in a digital format. Examples of data types include, but are not limited to, alphanumeric, images, text, symbols, maps, locations, graphics, video, metadata and domain expertise or knowledge bases. This digital data can reside locally (that is, collocated with the processing) or can be distributed in multiple locations, which are not collocated with processing. Previously measured or derived data may exist in databases and be input to the system processor 128. Data measured or derived in or near real-time can also be input to this processing system. Other examples of multimedia content metadata inputs include IMDB, Rotten Tomatoes, movie reviewer(s) input, and similar sources. Additional items will be added to any of Tables 1-8 as needed.

The applications discussed in the following section are ideally suited to the system processor 128 given the disparate data types and an ability of the system processor 128 to uncover multi-factor, connections among disparate datasets to support analysis and prediction. The advanced analytics method 1300 disclosed herein can also discern critical patterns and relationships within disparate datasets. The array architecture disclosed for the system processor 128 can provide a worldview of all data sources and problem spaces, and use global adjudication executed by the global adjudication module 1330 to select the "best" answer and make the "best" use of information. The use of both local adjudication executed by the local adjudication modules 1316 and 1326 and global adjudication executed by the global adjudication module 1330 to control the input of all data and data aggregates into individual or clusters in the system processor 128 for metric and confidence interval formation for recommendation determination.

The multimedia content price to the subscriber 105 can be determined by the system processor 128 and may be expressed as:

Subscriber Content Price=Content Provider Price+
Content Delivery Price−Advertising Subsidy+
Commissions on all Pricing transactions Thus, the subscriber 105 content price can be expressed as a function of at least one of the content provider 140 price, the content delivery price, the advertising subsidy, and the commissions. The commissions can be associated with at least one of selecting the multimedia content, scheduling delivery of the multimedia content, pricing of delivery of the multimedia content, and inserting an advertisement into the multimedia content. The system processor 128 can calculate each of the terms on the right side of this equation. The system processor 128 can compute these quantities simultaneously and in parallel using various mathematical methods and techniques. The system processor 128 can process all price/demand models simultaneously. An adjudication process can be executed by the system processor 128 that can select the optimized content provider 140 pricing, which can increase content demand and maximize the content provider's 140 revenue/profit. Initially, parameters for the adjudication process may be set by the content provider(s) 140 and refined by actual CPE 110 measurements and test marketing, or focus group data, within the system processor 128. The system processor 128 can use the collected data to predict the Start Price 875 on the content provider 140 price curve 810, the Tail Price 880 on the content provider 140 price curve 810, and Pi being an exponential decay parameter that can be for specific multimedia content or clusters of multimedia content. Then, the predicted parameters can be used to calculate the content provider 140 price for particular multimedia. The goal is to maximize the content providers' 140 revenue by increasing multimedia content demand by decreasing the multimedia content's price, which in turn can stimulate demand by the subscribers 105. The multimedia content provider's 140 revenue requirements and investment payoff schedule can be considered in these calculations. The system processor 128 can simultaneously perform this pricing function with advertiser 150, transport, and subscriber 105 pricing data considered. The local and global adjudication process performed by the local adjudication modules 1316 and 1326 and the global adjudication module 1330 and the computation units 1-M thru N-M, respectively, perform their functions together synergistically, to select the "best" or optimum solution for given datasets.

The equation to determine the Subscriber Content Price can be a first order equation. That is, the components of this equation are treated as independent. There can be dependencies and interactions between the terms on the right side of the equation. Using the system processor 128 with both local and global adjudication performed by the local adjudication modules 1316 and 1326 and the global adjudication module 1330, respectively, and the computation units 1-M thru N-M, respectively, these dependencies and interactions can become apparent, thereby allowing the system processor 128 to determine more accurate pricing information for the subscribers 105.

In addition, the disclosed parallel architecture of the system processor 128, with local and global adjudication, can allow data to be processed simultaneously and without cross contaminating input and/or output data and/or datasets. Proprietary data and/or datasets can be used without cross contamination. In the system processor 128, all input data used in the process can be coordinated with a system controller 126, and status & data routing capabilities to distribute control, data, status, as well as, actionable information to all components of the multimedia delivery system 100, including one or more of the archive gateways 122, one or more of the distribution gateways 130, one or more of the content providers 140, one or more of the advertisers 150, one or more of the transport providers 160, and/or one or more of the customer premises equipment 110 of the subscribers 105.

The system processor 128 architecture, including the local and global adjudication performed by the local adjudication modules 1316 and 1326 and the global adjudication module 1330 and the computation units 1-M thru N-M, respectively, can simultaneously compute the interdependence of multimedia content pricing and demand, advertising pricing, demand and placement, multimedia content delivery prices, and multimedia content recommendation, and can optimize the interactions of other components across the multimedia delivery system 100.

Figure 15:
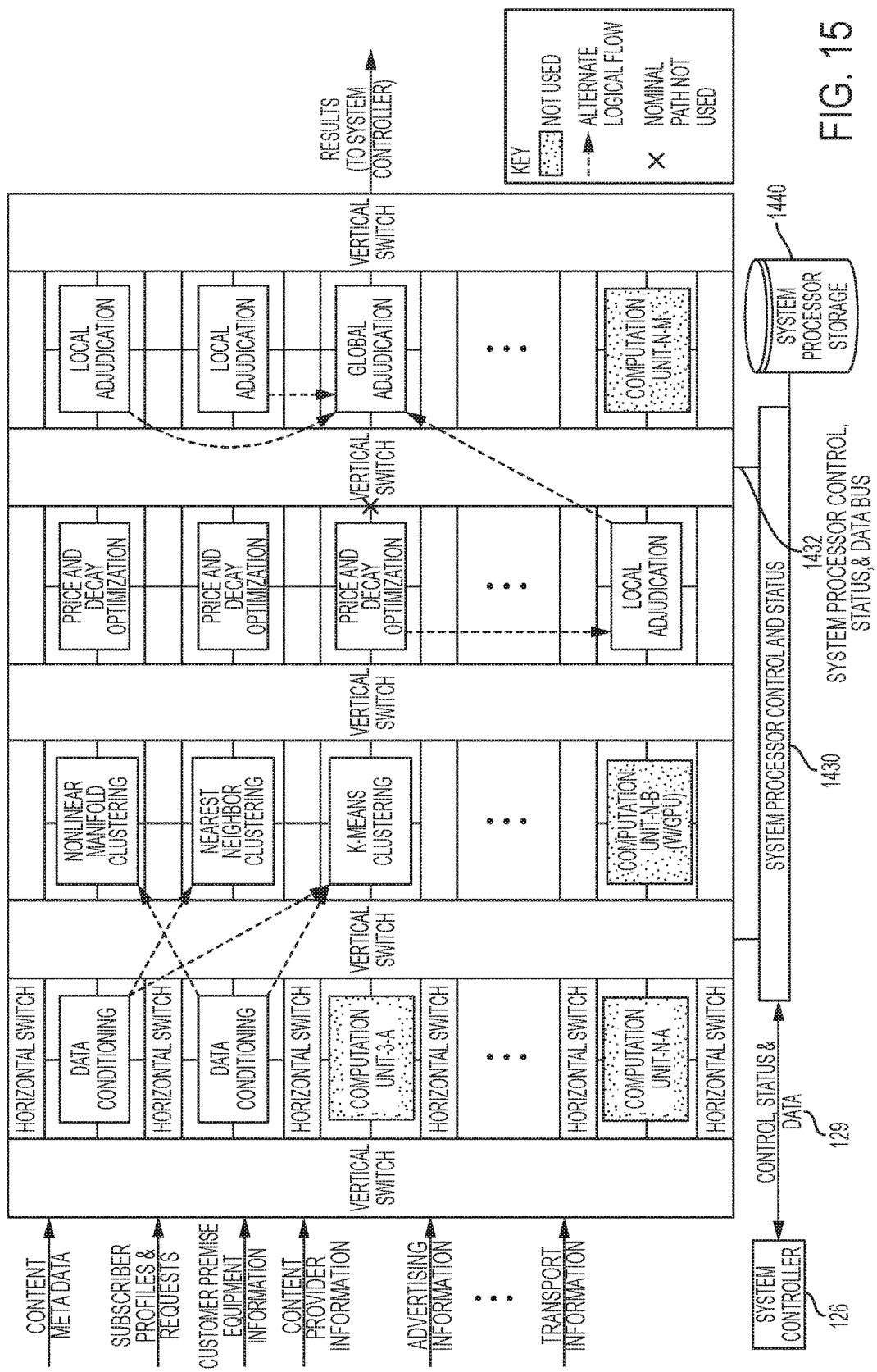
FIG. 15 illustrates an example of multimedia content pricing performed by the system processor, in accordance with one or more possible embodiments.

FIG. 15 illustrates an example of multimedia content pricing performed by the system processor 128, in accordance with one or more possible embodiments. FIG. 15 illustrates the pricing performed within the system processor 128 which can automatically price personalized programming of multimedia content for the subscriber 105 based on the a willingness of the subscriber 105 to modify viewing choices and preferences. Another available option can include the subscriber 105 paying for the multimedia content to be advertisement-free or with selected number of advertisements added to the multimedia content.

In the examples shown in FIGS. 15-18 illustrating examples of the system processor 128 operation, the dashed arrows show the alternate logical flow of information in the array structure of the system processor 128.

Figure 16:
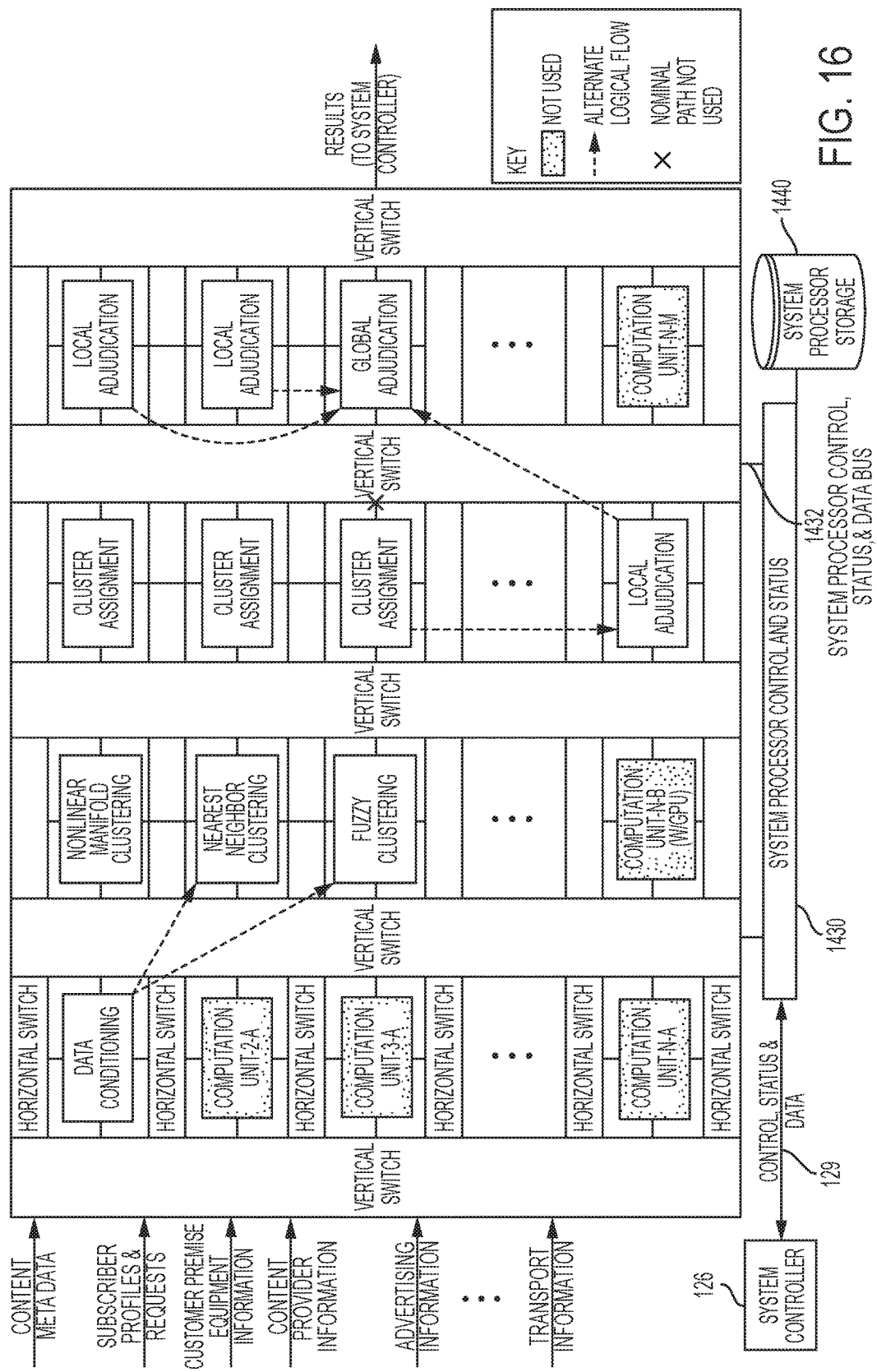
FIG. 16 illustrates an example of content recommendation performed by the system processor, in accordance with one or more possible embodiments.

FIG. 16 illustrates an example of content recommendation performed by the system processor, in accordance with one or more possible embodiments. Multimedia content recommendation can be performed in the system processor 128. Subscriber 105 profiles and viewing histories can be used as input data into the system processor 128 together with multimedia content data from IMDB and/or other entertainment databases. The math model as executed by math model modules 1314 and 1324 examines the unified data set of subscriber 105 viewing choices, preferences and viewing histories; and the multimedia content of the entertainment databases based on entertainment genre, actors, directors, production companies, screen writers, award winners (foreign and/or domestic), screenplay/screenplay key words or concepts, price of content, and/or any other criteria designated by the subscriber 105. The math model as executed by math model modules 1314 and 1324 can establish a multi-dimensional region of the subscriber's 105 tastes. The multi-dimensional region contains both decision boundaries and distance metrics used by the adjudication process as executed by the local and global adjudication modules 1316, 1326, and 1330 to predict multimedia content the subscriber 105 may enjoy and a likelihood of subscriber enjoyment. This information is provided to the subscriber's 105 CPE 110 via the system and services gateway 120 and the distribution gateways 130.

The system processor 128 and the advanced analytics method 1300 in this disclosure can allow for the insertion of different advertisements prior to display and/or redisplay of the subscriber's 105 personalized programming. Advertisements can be processed the same as multimedia content and can be transmitted and stored independent of multimedia content for the CPE 110. Advertising instructions can be used to insert in any preplanned multimedia content on the CPE 110 of the subscriber 110 and can replace previously used and stored advertisements. Only different advertisement instructions and reassembly instructions need to be transmitted to the CPE 110 of the subscriber 105 minimizing bandwidth, in bandwidth constrained transport. In another embodiment, advertisements can be updated as a module or individually stored on the CPE 110 of the subscriber 105. Preferably, individual advertisements will remain in active storage until deleted.

The system processor 128 can use advanced analytics techniques to discover and place advertising into subscriber 105 demographics or direct placement to a specific subscriber 105 or group of subscribers 105 with prioritization (for example, Direct Marketing Areas (DMA)). This prioritization can be based on the value the subscriber 105 places on an advertisement and/or the value of a subscriber 105 to an advertiser 150. This includes the placement of the advertising in the multimedia content for maximum impact. These advertising values can be independent of multimedia content in which an advertisement is placed. The advertiser 150 can provide additional specificity of advertising insertion instructions to further tailor the targeting of their advertisements.

Typically advertising instructions are generated by the system processor 128 based on a subscriber 105 and/or subscriber 105 cluster tastes and preferences. One or more of the embodiments allow for advertising instructions to be passed directly to an individual subscriber 105 profile when requested. The embodiments can be used when an advertiser 150 has already performed their own demographic assignment for subscriber 105 requested advertising. All advertiser 150 demographic information can be treated as proprietary and can be kept separate within from multimedia delivery system 100 data/information and purged after processing from the system processor 128 without affecting other information within it.

Pricing and arbitrage can be used among advertisers 150 to lower the subscriber's 105 multimedia content cost while satisfying the subscribers' 105 viewing preferences (tolerance to commercials/advertisements.) This pricing and arbitrage can occur within the system processor 128 for multimedia content and advertisers 150, simultaneously.

Subscribers 105 can achieve discounts on their service fees (for example, monthly bill), CPE 110 prices (for example, rental fees), and distribution prices (for example, ISP bill), through subsidies provided indirectly by advertisers 150. Such discounts can be applied if the subscriber 105 accepts the same number of targeted advertisements that normally would be included in a live broadcast version of content. The advertising subsidy allows subscribers 105 to further reduce their multimedia content and distribution prices, while providing additional revenue for content providers 140 and transport providers 160.

Determining the impact of advertising on subscribers 105 is difficult. Quantifying the impact of advertising requires large datasets and sophisticated techniques for analyzing that data. The embodiments disclosed herein provide both the large dataset and the techniques required for such quantifying and analyzing. In addition, the price/subsidies/placement of advertising can be optimized with the system processor 128, while maximizing the impact of advertisements.

The system processor 128 can optimize subscriber 105 pricing, advertiser 150 subsidies, advertising placement, and Advertising Quality of Service (AQoS) (or Service Level Agreements). The system processor 128 architecture can compute these quantities simultaneously and in parallel using various mathematical methods and techniques. The local and global adjudication processes performed by the local adjudication modules 1316 and 1326 and the global adjudication module 1330 can work together to select the optimum solution for the given datasets as determined by the system processor 128.

Figure 17:
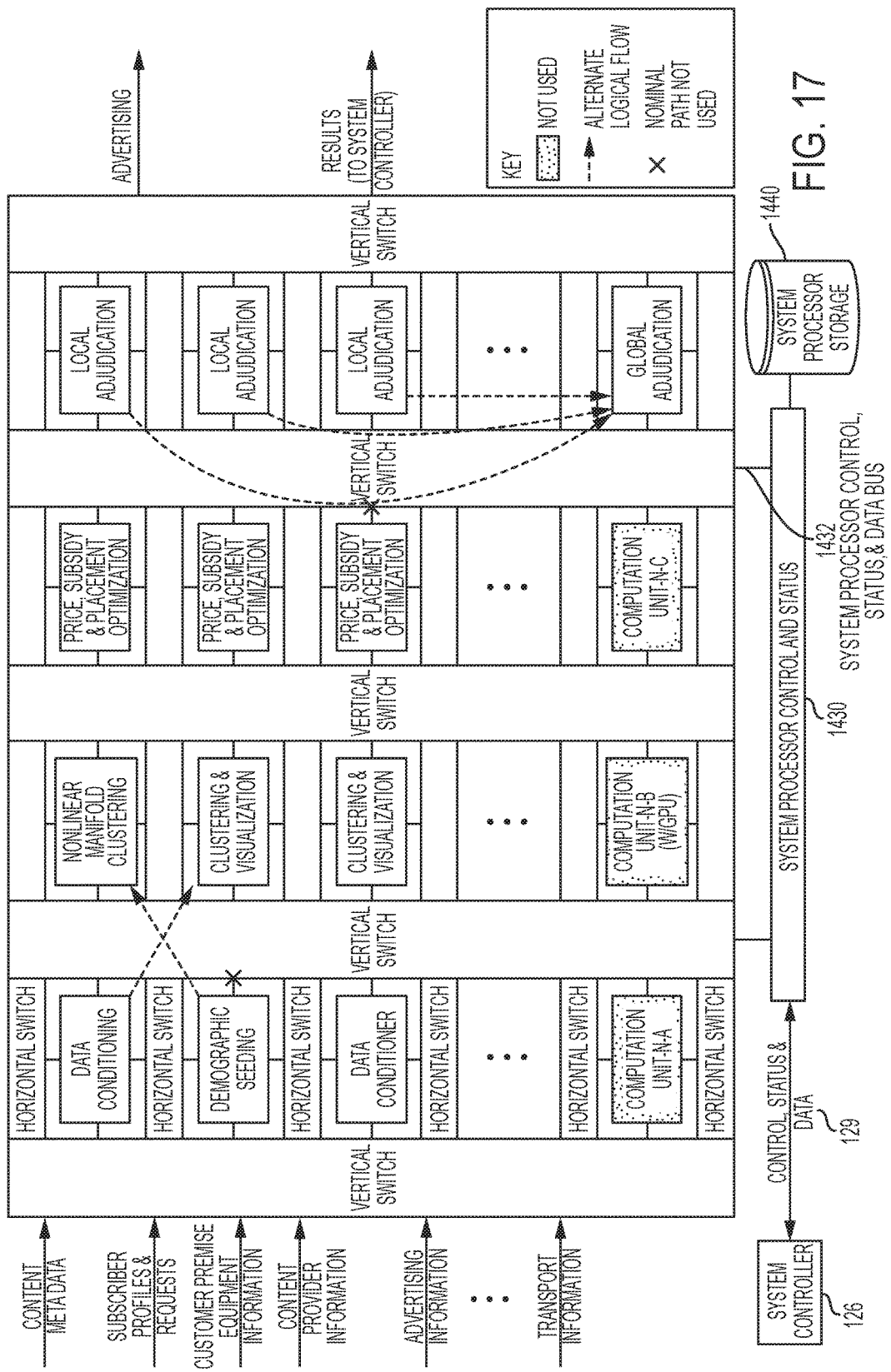
FIG. 17 illustrates an example of advertising pricing performed by the system processor, in accordance with one or more possible embodiments.

FIG. 17 illustrates an example of advertising pricing performed by the system processor 128, in accordance with one or more possible embodiments. For simplicity, three system processor 128 logical paths are shown in FIG. 17. In the top connection processing path the subscriber profiles and the subscriber viewing histories can be input for data conditioning with the computation units 1-A and 2-A. The conditioned profiles of the subscribers 105 and subscriber histories together with the advertiser's 150 instructions and demographics of interest seeds are input into the clustering, visualization & seeding module 1312 and processed by computation units 1-B, 2-B, and 3-B. The clustering process output is pruned and/or aggregated by the math model module 1314 and processed by computation units 1-C, 2-C, and 3-C. The clustering process can be under the control of the local adjudication as processed by computation units N-C, 1-D, and 2-D. Different clustering and optimization algorithms can be evaluated by the local adjudication modules 1316 and 1326 and the best pricing/subsidy/commercial insertion instructions can be produced as a result of the global adjudication module 1330 as processed by computation unit 3-D. The best pricing/subsidy/commercial insertion instructions can be passed to the system controller 126 for further processing. A second system processor 128 logical path can process the same subscriber 105 profiles viewing histories and advertiser instructions without the DOI seeding. Global adjudication module 1330 as processed by computation unit 3-D can evaluate the results with and without seeding, and can select the best approach.

A third system processor 128 logical path can provide an independent processing element using different data conditioning, clustering, modeling and local adjudication to control all processing modules and select optimal results.

There can be three types of advertisements: (1) generic (non-targeted), (2) subscriber 105 targeted and (3) subscriber 105 requested. Also, advertising campaigns are further categorized as either national (for example, across all distribution gateways 130) or regional (for example, that can be performed in areas serviced by one or more distribution gateways 150). The system processor 128 can generate an advertising insertion instruction priority for each of these types of advertising using linear, nonlinear, and/or nonlinear manifold clustering algorithms of the subscriber 105 profiles, and where applicable, all other available information in Tables 1 through 8 when needed.

Generic cluster-specific advertisements can be either national or regional. Such generic cluster-specific advertisements can be based only on subscriber 105 profile(s), that is they are cluster based using only the demographics provided by the subscriber 105 profile(s). All subscribers 105 in a cluster can receive the same commercials in the multimedia content they view. The resulting clusters are used to calculate the value of the subscriber 105 to the advertiser 150 in the math model modules 1316 and 3126 and adjudication modules.

Advertisements can be based on subscriber 105 profile(s), that is they are cluster based using the demographics provided by the subscriber 105 profile(s) and the subscriber's 105 location (for example, as provided by ISP determined location and/or Global Positioning System (GPS)), together with advertiser 105 specific demographics. Cluster seeding of the clustering algorithms can be used with the advertiser's 150 subscriber 105 demographics and/or focus group demographics. The resulting seeded/masked clusters can be used to calculate the value of the subscriber 105 to the advertiser 150. Again, the resulting clusters can be used to calculate the value of the subscriber 105 to the advertiser 150 in the math model modules 1314 and 3124 and the both local and global adjudication modules 1316, 1326, and 1330.

Direct advertising insertion, including subscriber 105 requested advertisements, can be either national or regional. Such direct advertising insertion can be based on profile(s) of the subscriber 105 (that is they are cluster based using the demographics provided by the subscriber 105 profile(s)) together with advertiser 150 specific demographics. Again, cluster seeding can be used with the advertiser's 150 customer demographics and/or focus group demographics to more accurately target advertising, as well as refine advertising subsidy/price. Direct advertising insertion commercials can allow for delivery of specific advertising to subscribers 105 who have requested specific commercials.

In general, the direct advertising insertion for a subscriber 105 is the most valuable to an advertiser 150, followed by the advertiser-specific clusters of subscribers 105 and the generic delivery of advertising to subscribers 105, respectively. In general, a higher value subscriber 105 translates to an advertising placement within the multimedia content that is higher in priority, impact, effectiveness and price.

The advanced analytics method 1300 disclosed herein can allow an advertiser 150 to specify an AQoS for a given commercial or set of commercials. AQoS can be a minimum percentage of distinct subscribers 105 that have a specified commercial displayed a minimum number of times for an multimedia delivery system 100 or advertiser 150 specified demographic cluster. The advanced analytics method 1300 can use the system processor 128 to calculate the AQoS and to prioritize ads to achieve a specified AQoS. This process can use the information contained Subscriber Profiles (Table 1, 2 and 3), subscriber 105 viewing histories, and advertiser 150 Demographics of Interest. Advertisers 150 can also purchase exclusivity or limited exclusivity during the viewing of a specified multimedia content by their selected or multimedia delivery system 100 selected cluster demographic profiles.

Figure 18:
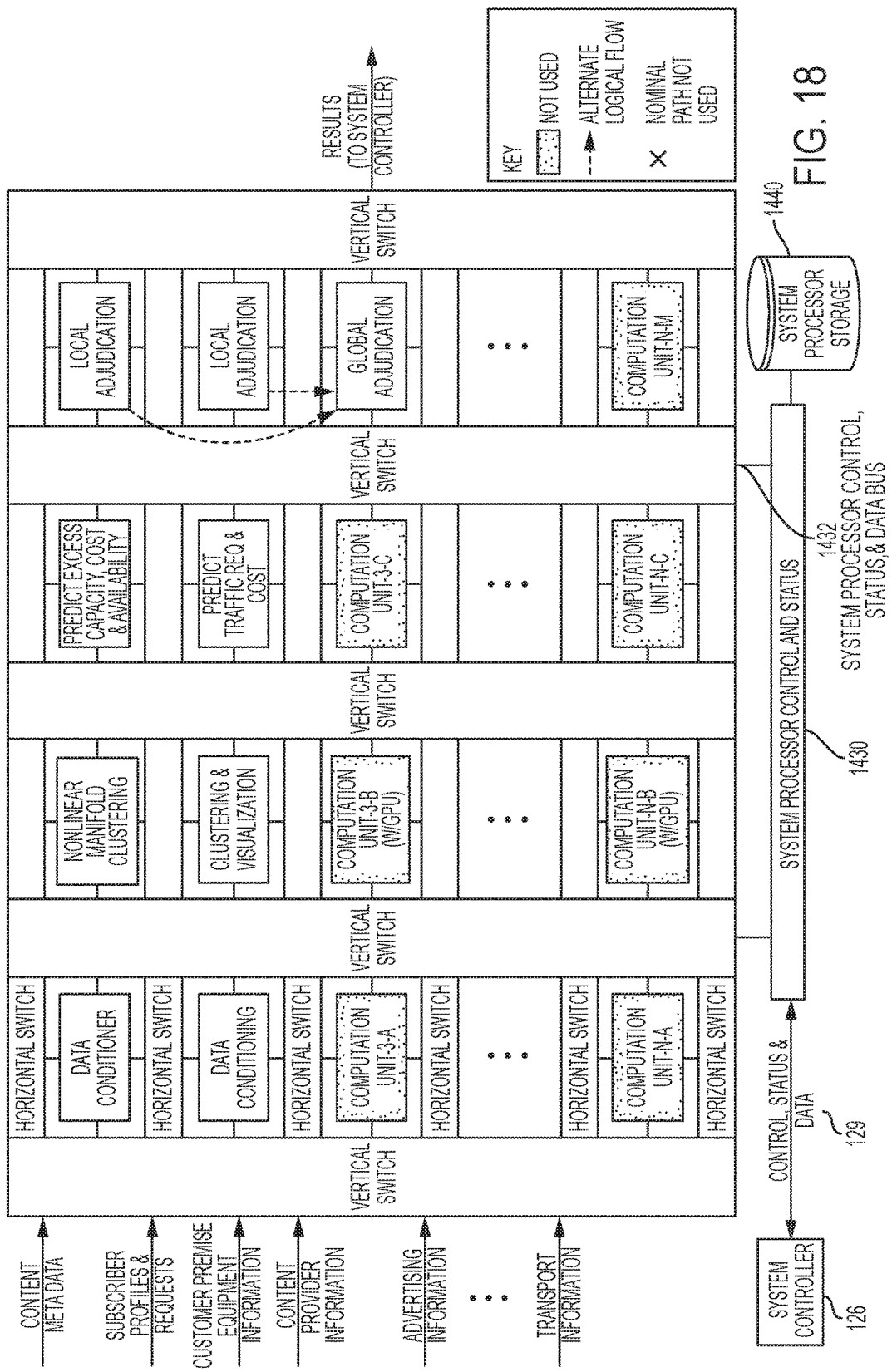
FIG. 18 illustrates an example of electronic delivery pricing performed by the system processor, in accordance with one or more possible embodiments.

FIG. 18 illustrates an example of electronic delivery pricing performed by the system processor 128, in accordance with one or more possible embodiments.

Also, the system processor executing the advanced analytics method 1300 can measure and predict the excess marginal capacity as a function of time for each data transport provider 160 within a given region and the wholesale price of that excess capacity as shown in FIG. 18. The best transport provider 160/method(s) can be automatically selected, and a contract can be negotiated with the selected transport provider(s) 160 to purchase excess capacity at a wholesale price. An additional revenue source can be provided for the transport provider(s) 160 using unused, but available distribution resources.

Figure 19:
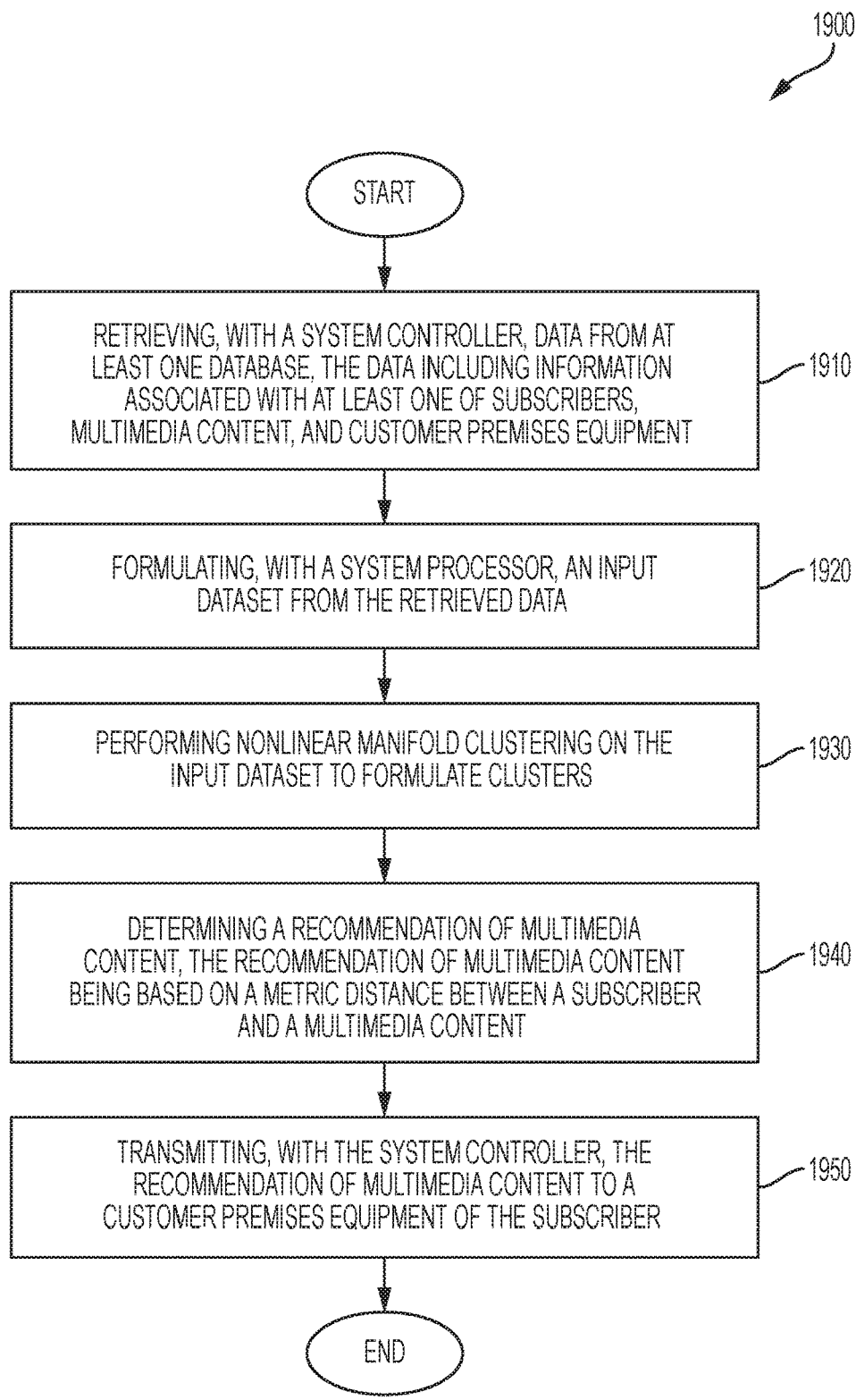
FIG. 19 illustrates an example method of determining a recommendation of multimedia content, in accordance with one or more possible embodiments.

FIG. 19 illustrates another example method 1900 of determining a recommendation of multimedia content, in accordance with one or more possible embodiments. The method 1900 can be performed by the system and services gateway 120 and/or performed, either partially or entirely, by any of the other hardware components of the multimedia system 101, as discussed above. The method 1900 is not limited to the example blocks shown and can include any of the processes performed by the multimedia delivery system 100.

The method 1900 of determining a recommendation of multimedia content can begin at block 1910. The system controller 126 of the system and services gateway 120 can retrieve from at least one database, such as the data shown in Tables 1-8. The data can include information associated with at least one of subscribers 105, multimedia content, and customer premises equipment 110. Block 1910 can proceed to block 1920.

At block 1920, the method 1900 can formulate an input dataset. The system processor 128 of the system and services gateway 120 can formulate the input dataset from the data retrieved in block 1910. Block 1920 can proceed to block 1930.

At block 1930, the method 1900 can formulate perform linear, nonlinear, and/or nonlinear manifold clustering. The linear, nonlinear, and/or nonlinear manifold clustering can be performed on the input dataset to formulate clusters. Block 1930 can proceed to block 1940.

At block 1940, the method 1900 can determine a recommendation of multimedia content. The determination of the recommendation of multimedia content can be based on a metric distance between a subscriber and a multimedia content. Block 1940 can proceed to block 1950.

At block 1950, the method 1900 can transmit the recommendation of multimedia content. The system controller 126 can transmit the recommendation of multimedia content determined in block 1940 to a customer premises equipment 110 of the subscriber 105 detailed in block 1940.

Figure 20:
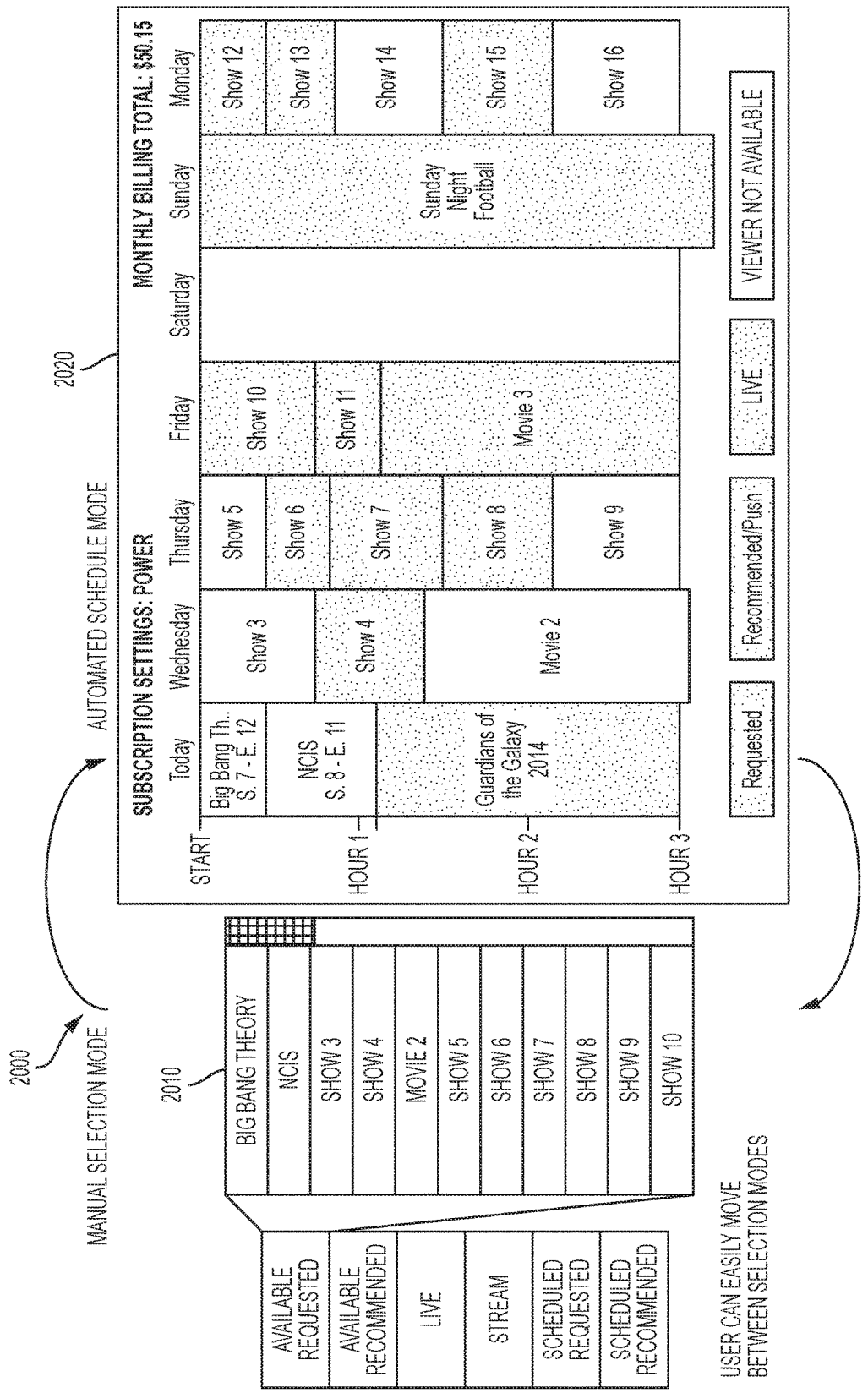
FIG. 20 illustrates an example scheduling interface, in accordance with one or more possible embodiments.

FIG. 20 illustrates an example scheduling interface 2000, in accordance with one or more possible embodiments. The example scheduling interface 2000 can include two different types of modes for scheduling multimedia content for delivery to the customer premises equipment 110, a list of multimedia content interface 2010 and a calendar interface 2020.

The list of multimedia content interface 2010 can include a list of multimedia content. The list of multimedia content can include shows, movies, and any other programming that the subscriber 105 may desire to view. The list of multimedia content can be filtered based on any number of criteria, for example, multimedia content that is requested, multimedia content that is recommended, live content, multimedia content available for streaming, multimedia content that is scheduled for delivery to the customer premises equipment 110 and requested by the subscriber 105, and multimedia content that is scheduled for delivery to the customer premises equipment 110 and recommended for the subscriber 105. The list of multimedia content can be ordered based on popularity, alphabetically, in accordance with subscriber 105 defined preferences, and any other order that assist the subscriber 110 in scheduling multimedia content.

The calendar interface 2020 can include a calendar showing particular multimedia content available on various days and at various times. Multimedia content available at these various days and at these various times can be coded to allow the subscriber 110 to more easily identify and differentiate requested, recommended/push, live and viewer not available multimedia content. Such coding can include use of different colors, hash marks and/or any other type of designation that allows the subscriber 105 to identify and differentiate such different types of multimedia content.

The subscriber 105 can manually move and/or change programming content on the list of multimedia content interface 2010 and the calendar interface 2020. Such a move and/or change can result in changes to the multimedia content list, viewing schedule, price, monthly billing total, etc., accordingly. The subscriber 105 can make modifications to list of multimedia content interface 2010 and the calendar interface 2020 as a basis for determining how such changes will modify their monthly billing total and allow the subscriber 105 to determine whether monthly budgetary targets are being met.

Figure 21:
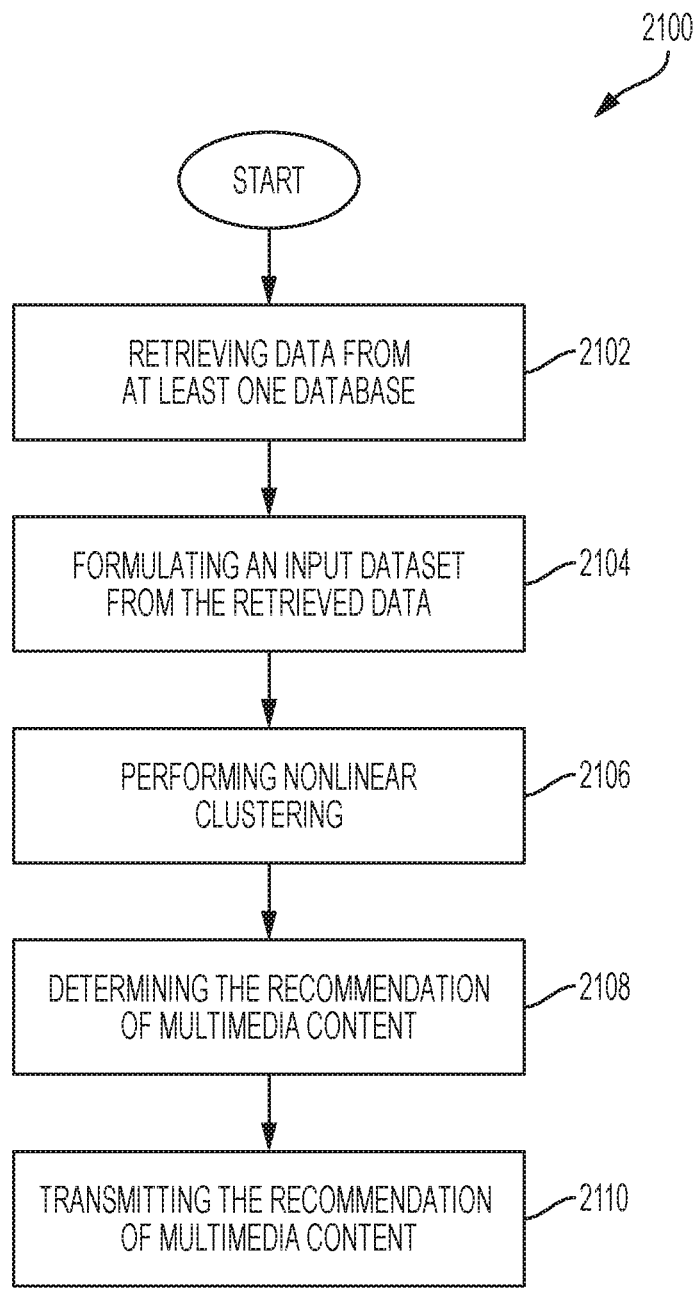
FIG. 21 illustrates another example method of determining a recommendation of multimedia content, in accordance with one or more possible embodiments.

FIG. 21 illustrates another example method 2100 of determining a recommendation of multimedia content, in accordance with one or more possible embodiments. The method 2100 can be performed by the system and services gateway 120 and/or performed, either partially or entirely, by any of the other hardware components of the multimedia system 101, as discussed above. The method 2100 is not limited to the example blocks shown and can include any of the processes performed by the multimedia delivery system 100.

The method 2100 of determining a recommendation of multimedia content can begin a block 2102. The system controller 126, for example of the system and services gateway 120, can retrieve data from at least one database. For example, the system controller 126 can retrieve data from at least one database, such as the data shown in Tables 1-8, the data including information associated with at least one of subscribers, multimedia content, and subscriber interaction with customer premises equipment, and transmit, to a customer premises equipment of a subscriber, a recommendation of multimedia content. Block 2100 can proceed to block 2104.

At block 2104, the method 2100 can formulate an input dataset from the retrieved data. The system processor 128, for example of the system and services gateway 120, can formulate the input dataset from the data retrieved in block 2102. Block 2104 can proceed to block 2106.

At block 2106, the method 2100 can perform linear, nonlinear, and/or nonlinear manifold clustering. The system processor 128, for example of the system and services gateway 120, can perform the linear, nonlinear, and/or nonlinear manifold clustering on the input dataset to formulate subscriber and multimedia content clusters having similarities between elements therein. Block 2106 can proceed to block 2108.

At block 2108, the method 2100 can determine the recommendation of multimedia content. The system processor 128, for example of the system and services gateway 120, can determine the recommendation of multimedia content based on a metric distance between vector elements of the formulated subscriber and multimedia content clusters and the metric distance crossing a threshold. In addition, the system processor 128 can adjudicate the linear, nonlinear, and/or nonlinear manifold metric distances with a weighted combination of one or more of these metric distances to derive an adjudication recommendation score from the formulated subscriber 105 and multimedia content clusters and a recommendation threshold(s).

At block 2110, the method 2100 can transmit the recommendation of multimedia content. The system controller 126, for example of the system and services gateway 120, can transmit, to the CPE 110 of the subscriber, the recommendation of multimedia content.

Although the embodiments are directed toward the delivery of multimedia content, the teachings of the embodiments can be applied to any electronic paid content being served over a network or encrypted broadcast. The embodiments can be extended to traditional print media, on-line training, etc. One or more of the embodiments can use a micropayment system.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different processing elements or in a single processing element of the disclosed embodiments.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the processing elements of each figure may not be necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus, comprising:
a system controller to retrieve data from at least one database, the data including information associated with at least one of subscribers, multimedia content, and subscriber interaction with customer premises equipment, and transmit, to a customer premises equipment of a subscriber, a recommendation of multimedia content; and
a system processor to formulate an input dataset from the retrieved data, perform nonlinear manifold clustering on the input dataset to formulate a multi-dimensional subscriber cluster and a multi-dimensional multimedia content cluster having similarities between elements therein, determine a nonlinear manifold metric distance between multi-dimensional vector elements of the formulated multi-dimensional subscriber cluster and the multi-dimensional multimedia content cluster, and determine the recommendation of multimedia content based on the nonlinear manifold metric distance between multi-dimensional vector elements of the formulated multi-dimensional subscriber cluster and the multi-dimensional multimedia content cluster crossing a threshold.

2. The apparatus according to claim 1, wherein the system processor further prioritizes a plurality of recommendations of multimedia content based on the nonlinear manifold metric distance and the threshold and the system controller delivers the prioritized list to the subscriber's customer premise equipment via at least one transport provider.

3. The apparatus according to claim 1, wherein the system processor formulates the multi-dimensional clusters based on similarities that control the attraction and dissimilarities that control the repulsion between the multi-dimensional vector elements.

4. The apparatus according to claim 1, wherein the system processor determines the nonlinear manifold metric distance via at least one of tensor analysis, vector analysis, differential geometry, and spectral analysis.

5. The apparatus according to claim 1, wherein the nonlinear manifold metric distance is determined along a nonlinear manifold.

6. The apparatus according to claim 1, wherein the system processor further determines a nearness of the recommendation of multimedia content to alternative multimedia content, the nearness providing an indication as a likelihood that the subscriber will enjoy the alternative multimedia content.

7. The apparatus according to claim 1, wherein the system processor further determines a nearness of a given subscriber to another subscriber or a representative subscriber as a basis to transfer the recommendation of multimedia content to the another subscriber or the representative subscriber.

8. The apparatus according to claim 1, wherein the system processor further arbitrates between recommendations of multimedia content via a semantic process comprising at least one of a distributional semantics, latent semantic indexing, text mining, statistical semantics, Principal Component Analysis, and Factor, histogram generation, and neural network processing.

9. The apparatus according to claim 1, wherein the system processor further pre-processes the input dataset prior to formation of the multi-dimensional cluster, the pre-processing including performing Term Frequency, Inverse Document Frequency (TF.IDF) methodology to extract numerically encoded text features from at least one of unstructured text, structured text, and a combination thereof, of the input dataset.

10. The apparatus according to claim 1, wherein based on one or more recommendation thresholds being crossed, one or more of the following actions are performed:
  (1) the system processor adds the recommendation of multimedia content recommendation to a ranked ordered list of recommended multimedia content to the subscriber,
  (2) the system processor schedules the push delivery of multimedia content to the customer premises equipment and, once the multimedia content is available for viewing on the customer premises equipment, the multimedia content is added to the subscriber's ranked ordered list of available recommended multimedia content,
  (3) the system processor adds the multimedia content to the subscriber's viewing schedule and schedules the push delivery of multimedia content associated with the recommendation of multimedia content to the customer premises equipment, and
  (4) the system processor adds the delivery address of the customer premise equipment to a queue for multicast delivery of multimedia content associated with the recommendation of multimedia content.

11. The apparatus according to claim 1, wherein the system processor further performs aggregation of multimedia content associated with the recommendation of multimedia content to be delivered to a plurality of customer premises equipment, and the system controller further delivers the multimedia content to the plurality of customer premises equipment.

12. The apparatus according to claim 1, wherein the system processor further performs at least one of local and global adjudication to optimize the recommendation of multimedia content determined by the system processor for the customer premises equipment of the subscriber.

13. The apparatus according to claim 1, wherein at least one of the system processor and system controller are at least partially implemented in at least one of a local computing, distributed computing, mobile computing, cloud-based, Field Programmable Gate Arrays (FPGA), Application Specific Integrated Circuits (ASIC), and a software program.

14. The apparatus according to claim 1, wherein the customer premises equipment is at least partially implemented by a set top box, an internet service provider and/or television service supplied customer premise equipment, a digital video recorder, a video extender, a smart television, a streaming set top box, a personal computer, a tablet computer, a smart phone, with a software program.

15. The apparatus according to claim 1, wherein the system processor further performs at least one of local and global adjudication to formulate the input dataset to be processed to optimize the recommendation of multimedia content determined by the system processor based on the retrieved data from the at least one database.

16. A method, comprising:
  retrieving, with a system controller, data from at least one database, the data including information associated with at least one of subscribers, multimedia content, and subscriber interaction with customer premises equipment; and
  formulating, with a system processor, an input dataset from the retrieved data;
  performing, with the system processor, nonlinear manifold clustering on the input dataset to formulate a multi-dimensional subscriber cluster and a multi-dimensional multimedia content cluster having similarities between elements therein;
  determining a nonlinear manifold metric distance between multi-dimensional vector elements of the formulated multi-dimensional subscriber cluster and the multi-dimensional multimedia content cluster;
  determining, with the system processor, the recommendation of multimedia content based on the nonlinear manifold metric distance between multi-dimensional vector elements of the formulated multi-dimensional subscriber cluster and the multi-dimensional multimedia content cluster crossing a threshold; and
  transmitting, to a customer premises equipment of a subscriber, a recommendation of multimedia content.

17. The method according to claim 16, further comprising:
  prioritizing, with the system processor, a plurality of recommendations of multimedia content based on the nonlinear manifold metric distance and the threshold; and
  delivering, with the system controller, the prioritized list to the subscriber's customer premise equipment via at least one transport provider.

18. The method according to claim 16, further comprising formulating, with the system processor, the multi-dimensional cluster based on similarities that control the attraction and dissimilarities that control the repulsion between the multi-dimensional vector elements.

19. The method according to claim 16, further comprising:
determining the nonlinear manifold metric distance via at least one of tensor analysis, vector analysis, differential geometry, and spectral analysis.

20. The method according to claim 16, further comprising determining the nonlinear manifold metric distance along a nonlinear manifold.

21. The method according to claim 16, further comprising determining, with the system processor, a nearness of the recommendation of multimedia content to alternative multimedia content, the nearness providing an indication as a likelihood that the subscriber will enjoy the alternative multimedia content.

22. The method according to claim 16, further comprising determining, with the system processor, a nearness of a given subscriber to another subscriber or a representative subscriber as a basis to transfer the recommendation of multimedia content to the another subscriber or representative subscriber.

23. The method according to claim 16, further comprising arbitrating, with the system processor, between recommendations of multimedia content via a semantic process comprising at least one of a distributional semantics, latent semantic indexing, text mining, statistical semantics, Principal Component Analysis, and Factor, histogram generation, and neural network processing.

24. The method according to claim 16, further comprising pre-processing, with the system processor, the input dataset prior to formation of the multi-dimensional cluster, the pre-processing including performing Term Frequency, Inverse Document Frequency (TF.IDF) methodology to extract numerically encoded text features from at least one of unstructured text, structured text, and a combination thereof, of the input dataset.

25. The method according to claim 16, further comprising, based on one or more recommendation thresholds being crossed, one or more of the following actions are performed:
(1) adding, with the system processor, the recommendation of multimedia content recommendation to a ranked ordered list of recommended multimedia content to the subscriber,
(2) scheduling, with the system processor, the push delivery of multimedia content to the customer premises equipment and, once the multimedia content is available for viewing on the customer premises equipment, the multimedia content is added to the subscriber's ranked ordered list of available recommended multimedia content,
(3) adding, with the system processor, the multimedia content to the subscriber's viewing schedule and schedules the push delivery of multimedia content associated with the recommendation of multimedia content to the customer premises equipment, and
(4) adding, with the system processor, the delivery address of the customer premise equipment to a queue for multicast delivery of multimedia content associated with the recommendation of multimedia content.

26. The method according to claim 16, further comprising:
aggregating, with the system processor, multimedia content associated with the recommendation of multimedia content to be delivered to a plurality of customer premises equipment; and
delivering, with the system controller, the multimedia content to the plurality of customer premises equipment.

27. The method according to claim 16, further comprising performing, with the system processor, at least one of local and global adjudication to optimize the recommendation of multimedia content for the customer premises equipment of the subscriber.

28. The method according to claim 16, wherein the system processor is at least partially implemented in at least one of a local computing, distributed computing, mobile computing, cloud-based computing architectures, Field Programmable Gate Arrays (FPGA), Application Specific Integrated Circuits (ASIC), a software program, and a software application.

29. The method according to claim 16, wherein the customer premises equipment is at least partially implemented by a set top box, an internet service provider and/or television service supplied customer premise equipment, a digital video recorder, a video extender, a smart television, a streaming set top box, a personal computer, a tablet computer, a smart phone, with a software program.

30. The method according to claim 16, further comprising:
performing at least one of local and global adjudication to formulate the input dataset; and
processing the input dataset to optimize the recommendation of multimedia content determined by the system processor based on the retrieved data from the at least one database.

* * * * *